United States Patent
Ozaki et al.

(10) Patent No.: US 9,312,924 B2
(45) Date of Patent: Apr. 12, 2016

(54) SYSTEMS AND METHODS RELATING TO MULTI-DIMENSIONAL WIRELESS CHARGING

(75) Inventors: Ernest T. Ozaki, Poway, CA (US); Rinat Burdo, San Diego, CA (US); Shahin Farahani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 451 days.

(21) Appl. No.: 12/567,339

(22) Filed: Sep. 25, 2009

(65) Prior Publication Data

US 2010/0289341 A1     Nov. 18, 2010

Related U.S. Application Data

(60) Provisional application No. 61/151,290, filed on Feb. 10, 2009, provisional application No. 61/244,391, filed on Sep. 21, 2009.

(51) Int. Cl.
*H02J 7/00*     (2006.01)
*H04B 5/00*     (2006.01)
*H02J 17/00*     (2006.01)
(Continued)

(52) U.S. Cl.
CPC ............. *H04B 5/0037* (2013.01); *H02J 5/005* (2013.01); *H02J 7/025* (2013.01); *H02J 17/00* (2013.01); *H04B 5/0075* (2013.01); *H04B 5/0087* (2013.01); *H04B 5/0093* (2013.01); *H02J 7/0027* (2013.01)

(58) Field of Classification Search
CPC ........... H02J 7/025; H02J 5/005; H02J 17/00; H04B 5/0093; H04B 5/0075; H04B 5/0087
USPC .......................................... 320/108; 307/104
See application file for complete search history.

(56) References Cited

U.S. PATENT DOCUMENTS

| | | |
|---|---|---|
| 3,633,109 A | 1/1972 | Schulz |
| 4,684,869 A | 8/1987 | Kobayashi et al. |
| 4,802,080 A | 1/1989 | Bossi et al. |

(Continued)

FOREIGN PATENT DOCUMENTS

| | | |
|---|---|---|
| CN | 1119774 A | 4/1996 |
| CN | 1202754 A | 12/1998 |

(Continued)

OTHER PUBLICATIONS

International Search Report and Written Opinion—PCT/US2010/023786, International Search Authority—European Patent Office—Jul. 8, 2010.

(Continued)

*Primary Examiner* — Yalkew Fantu
*Assistant Examiner* — Manuel Hernandez
(74) *Attorney, Agent, or Firm* — Knobbe Martens Olson & Bear LLP

(57) ABSTRACT

Exemplary methods and systems related to wireless charging are disclosed. In an exemplary embodiment, a plurality of transmit antennas are used, wherein at least one transmit antenna of the plurality of transmit antennas is configured to be oriented in a different plane than at least one other transmit antenna of the plurality of transmit antennas. Furthermore, each transmit antenna of the plurality of transmit antennas is configured for transmitting power within an associated near-field.

34 Claims, 24 Drawing Sheets

(51) Int. Cl.
*H02J 5/00* (2006.01)
*H02J 7/02* (2006.01)

(56) References Cited

U.S. PATENT DOCUMENTS

| | | | |
|---|---|---|---|
| 5,201,066 A | 4/1993 | Kim | |
| 5,287,112 A | 2/1994 | Schuermann | |
| 5,311,198 A | 5/1994 | Sutton | |
| 5,520,892 A | 5/1996 | Bowen | |
| 5,539,394 A | 7/1996 | Cato et al. | |
| 5,619,530 A | 4/1997 | Cadd et al. | |
| 5,790,080 A | 8/1998 | Apostolos | |
| 5,956,626 A | 9/1999 | Kaschke et al. | |
| 5,963,144 A | 10/1999 | Kruest | |
| 6,151,500 A | 11/2000 | Cardina et al. | |
| 6,195,562 B1 | 2/2001 | Pirhonen et al. | |
| 6,263,247 B1 | 7/2001 | Mueller et al. | |
| 6,344,828 B1 | 2/2002 | Grantz et al. | |
| 6,388,628 B1* | 5/2002 | Dettloff | G06K 7/0008 343/742 |
| 6,489,745 B1 | 12/2002 | Koreis | |
| 6,570,541 B2* | 5/2003 | Dettloff | 343/742 |
| 6,600,931 B2 | 7/2003 | Sutton et al. | |
| 6,608,550 B2 | 8/2003 | Hayashi et al. | |
| 6,664,770 B1 | 12/2003 | Bartels | |
| 6,683,438 B2 | 1/2004 | Park et al. | |
| 6,690,264 B2 | 2/2004 | Dalglish | |
| 6,760,578 B2 | 7/2004 | Rotzoll | |
| 6,809,498 B2 | 10/2004 | Nakamura et al. | |
| 6,839,035 B1 | 1/2005 | Addonisio et al. | |
| 6,853,629 B2 | 2/2005 | Alamouti et al. | |
| 6,906,495 B2 | 6/2005 | Cheng et al. | |
| 6,967,462 B1 | 11/2005 | Landis | |
| 6,970,142 B1 | 11/2005 | Pleva et al. | |
| 6,975,198 B2 | 12/2005 | Baarman et al. | |
| 7,069,086 B2 | 6/2006 | Von Arx | |
| 7,142,811 B2 | 11/2006 | Terranova et al. | |
| 7,146,139 B2 | 12/2006 | Nevermann | |
| 7,193,578 B1 | 3/2007 | Harris et al. | |
| 7,233,137 B2 | 6/2007 | Nakamura et al. | |
| 7,239,110 B2 | 7/2007 | Cheng et al. | |
| 7,243,855 B2 | 7/2007 | Matsumoto et al. | |
| 7,248,841 B2 | 7/2007 | Agee et al. | |
| 7,356,588 B2 | 4/2008 | Stineman, Jr. et al. | |
| 7,375,492 B2 | 5/2008 | Calhoon et al. | |
| 7,378,817 B2 | 5/2008 | Calhoon et al. | |
| 7,382,260 B2 | 6/2008 | Agarwal et al. | |
| 7,382,636 B2 | 6/2008 | Baarman et al. | |
| 7,428,438 B2 | 9/2008 | Parramon et al. | |
| 7,478,108 B2 | 1/2009 | Townsend et al. | |
| 7,480,907 B1 | 1/2009 | Marolia et al. | |
| 7,499,722 B2 | 3/2009 | McDowell et al. | |
| 7,521,890 B2 | 4/2009 | Lee et al. | |
| 7,522,878 B2 | 4/2009 | Baarman | |
| 7,538,666 B2 | 5/2009 | Campman | |
| 7,539,465 B2 | 5/2009 | Quan | |
| 7,554,316 B2 | 6/2009 | Stevens et al. | |
| 7,561,050 B2 | 7/2009 | Bhogal et al. | |
| 7,565,108 B2 | 7/2009 | Kotola et al. | |
| 7,576,514 B2 | 8/2009 | Hui | |
| 7,576,657 B2 | 8/2009 | Duron et al. | |
| 7,579,913 B1 | 8/2009 | Cheng et al. | |
| 7,598,704 B2 | 10/2009 | Taniguchi et al. | |
| 7,605,496 B2 | 10/2009 | Stevens et al. | |
| 7,609,157 B2 | 10/2009 | McFarland | |
| 7,626,544 B2 | 12/2009 | Smith et al. | |
| 7,629,886 B2 | 12/2009 | Steeves | |
| 7,642,918 B2 | 1/2010 | Kippelen et al. | |
| 7,646,343 B2 | 1/2010 | Shtrom et al. | |
| 7,663,490 B2 | 2/2010 | Dishongh | |
| 7,675,403 B2 | 3/2010 | Quan et al. | |
| 7,741,734 B2 | 6/2010 | Joannopoulos et al. | |
| 7,778,224 B2 | 8/2010 | Hayashi et al. | |
| 7,792,553 B2 | 9/2010 | Fukui et al. | |
| 7,793,121 B2 | 9/2010 | Lawther et al. | |
| 7,812,481 B2 | 10/2010 | Iisaka et al. | |
| 7,825,543 B2 | 11/2010 | Karalis et al. | |
| 7,831,757 B2 | 11/2010 | Habuto et al. | |
| 7,844,306 B2 | 11/2010 | Shearer et al. | |
| 7,868,837 B2 | 1/2011 | Yun et al. | |
| 7,893,564 B2* | 2/2011 | Bennett | 307/104 |
| 7,924,751 B2 | 4/2011 | Dean | |
| 7,994,880 B2 | 8/2011 | Chen et al. | |
| 8,004,118 B2 | 8/2011 | Kamijo et al. | |
| 8,035,255 B2 | 10/2011 | Kurs et al. | |
| 8,073,387 B2 | 12/2011 | Maslennikov et al. | |
| 8,115,448 B2 | 2/2012 | John | |
| 8,183,827 B2 | 5/2012 | Lyon | |
| 8,301,080 B2 | 10/2012 | Baarman | |
| 8,432,293 B2 | 4/2013 | Symons | |
| 8,487,478 B2 | 7/2013 | Kirby et al. | |
| 8,611,815 B2 | 12/2013 | Mohammadian et al. | |
| 8,614,526 B2 | 12/2013 | Cook et al. | |
| 8,629,650 B2 | 1/2014 | Mohammadian et al. | |
| 8,854,224 B2 | 10/2014 | Kirby et al. | |
| 8,878,393 B2 | 11/2014 | Kirby et al. | |
| 8,892,035 B2 | 11/2014 | Mohammadian et al. | |
| 8,965,461 B2 | 2/2015 | Toncich et al. | |
| 2001/0046205 A1 | 11/2001 | Easton et al. | |
| 2002/0041624 A1 | 4/2002 | Kim et al. | |
| 2002/0154705 A1 | 10/2002 | Walton et al. | |
| 2002/0158512 A1 | 10/2002 | Mizutani et al. | |
| 2003/0048254 A1 | 3/2003 | Huang | |
| 2003/0078634 A1 | 4/2003 | Schulman et al. | |
| 2004/0002835 A1 | 1/2004 | Nelson | |
| 2004/0041669 A1 | 3/2004 | Kawai | |
| 2004/0116952 A1 | 6/2004 | Sakurai et al. | |
| 2004/0130425 A1 | 7/2004 | Dayan et al. | |
| 2004/0130916 A1 | 7/2004 | Baarman | |
| 2004/0154652 A1 | 8/2004 | Karapetyan | |
| 2004/0166869 A1 | 8/2004 | Laroia et al. | |
| 2004/0180637 A1 | 9/2004 | Nagai et al. | |
| 2004/0227057 A1 | 11/2004 | Tuominen et al. | |
| 2004/0245473 A1 | 12/2004 | Takayama et al. | |
| 2004/0248523 A1 | 12/2004 | Nishimura et al. | |
| 2005/0068009 A1 | 3/2005 | Aoki | |
| 2005/0083881 A1 | 4/2005 | Ohwada | |
| 2005/0110641 A1 | 5/2005 | Mendolia et al. | |
| 2005/0116683 A1 | 6/2005 | Cheng et al. | |
| 2005/0135122 A1* | 6/2005 | Cheng et al. | 363/24 |
| 2005/0151511 A1 | 7/2005 | Chary | |
| 2005/0156560 A1 | 7/2005 | Shimaoka et al. | |
| 2005/0189910 A1 | 9/2005 | Hui | |
| 2005/0205679 A1 | 9/2005 | Alihodzic | |
| 2005/0219132 A1 | 10/2005 | Charrat | |
| 2005/0220057 A1 | 10/2005 | Monsen | |
| 2005/0225437 A1 | 10/2005 | Shiotsu et al. | |
| 2005/0239018 A1 | 10/2005 | Green et al. | |
| 2005/0242183 A1 | 11/2005 | Bremer | |
| 2006/0084392 A1 | 4/2006 | Marholev et al. | |
| 2006/0113955 A1* | 6/2006 | Nunally | 320/108 |
| 2006/0114102 A1 | 6/2006 | Chang et al. | |
| 2006/0131193 A1 | 6/2006 | Sherman | |
| 2006/0184705 A1 | 8/2006 | Nakajima | |
| 2006/0197652 A1 | 9/2006 | Hild et al. | |
| 2006/0202665 A1 | 9/2006 | Hsu | |
| 2006/0220863 A1 | 10/2006 | Koyama | |
| 2006/0238365 A1* | 10/2006 | Vecchione et al. | 340/657 |
| 2006/0244568 A1 | 11/2006 | Tong et al. | |
| 2007/0001816 A1 | 1/2007 | Lindley et al. | |
| 2007/0004456 A1 | 1/2007 | Shimada | |
| 2007/0004466 A1 | 1/2007 | Haartsen | |
| 2007/0017804 A1 | 1/2007 | Myrtveit et al. | |
| 2007/0021140 A1 | 1/2007 | Keyes et al. | |
| 2007/0026799 A1 | 2/2007 | Wang et al. | |
| 2007/0029965 A1 | 2/2007 | Hui et al. | |
| 2007/0072474 A1 | 3/2007 | Beasley et al. | |
| 2007/0080804 A1 | 4/2007 | Hirahara et al. | |
| 2007/0091006 A1 | 4/2007 | Thober et al. | |
| 2007/0109708 A1 | 5/2007 | Hussman et al. | |
| 2007/0158438 A1 | 7/2007 | Fukuda et al. | |
| 2007/0165475 A1 | 7/2007 | Choi et al. | |
| 2007/0171811 A1 | 7/2007 | Lee et al. | |
| 2007/0182367 A1* | 8/2007 | Partovi | 320/108 |

(56) References Cited

U.S. PATENT DOCUMENTS

| | | |
|---|---|---|
| 2007/0222681 A1 | 9/2007 | Greene et al. |
| 2007/0279002 A1 | 12/2007 | Partovi |
| 2007/0287508 A1 | 12/2007 | Telefus |
| 2007/0290654 A1 | 12/2007 | Govari et al. |
| 2007/0296393 A1 | 12/2007 | Malpas et al. |
| 2008/0014897 A1 | 1/2008 | Cook et al. |
| 2008/0030324 A1 | 2/2008 | Bekritsky et al. |
| 2008/0049372 A1* | 2/2008 | Loke ............................. 361/143 |
| 2008/0054638 A1 | 3/2008 | Greene et al. |
| 2008/0058029 A1 | 3/2008 | Sato et al. |
| 2008/0066979 A1 | 3/2008 | Carter |
| 2008/0067874 A1 | 3/2008 | Tseng |
| 2008/0079396 A1 | 4/2008 | Yamazaki et al. |
| 2008/0091350 A1 | 4/2008 | Smith et al. |
| 2008/0114255 A1 | 5/2008 | Schwartz et al. |
| 2008/0116847 A1* | 5/2008 | Loke et al. .................... 320/108 |
| 2008/0122297 A1 | 5/2008 | Arai |
| 2008/0157711 A1 | 7/2008 | Chiang et al. |
| 2008/0165074 A1 | 7/2008 | Terry |
| 2008/0174266 A1 | 7/2008 | Tamura |
| 2008/0174267 A1 | 7/2008 | Onishi et al. |
| 2008/0203815 A1 | 8/2008 | Ozawa et al. |
| 2008/0211320 A1 | 9/2008 | Cook et al. |
| 2008/0242337 A1 | 10/2008 | Sampath et al. |
| 2008/0252254 A1 | 10/2008 | Osada |
| 2008/0258679 A1 | 10/2008 | Manico et al. |
| 2008/0261519 A1 | 10/2008 | DeMarco et al. |
| 2008/0266748 A1 | 10/2008 | Lee |
| 2008/0315826 A1* | 12/2008 | Alberth et al. ................ 320/101 |
| 2009/0015075 A1 | 1/2009 | Cook et al. |
| 2009/0021374 A1 | 1/2009 | Stagg |
| 2009/0031069 A1 | 1/2009 | Habuto et al. |
| 2009/0045772 A1 | 2/2009 | Cook et al. |
| 2009/0058189 A1 | 3/2009 | Cook et al. |
| 2009/0061784 A1 | 3/2009 | Cordeiro |
| 2009/0072629 A1 | 3/2009 | Cook et al. |
| 2009/0072782 A1 | 3/2009 | Randall |
| 2009/0075704 A1 | 3/2009 | Wang |
| 2009/0096413 A1* | 4/2009 | Partovi et al. .................. 320/108 |
| 2009/0127937 A1 | 5/2009 | Widmer et al. |
| 2009/0134712 A1 | 5/2009 | Cook et al. |
| 2009/0174258 A1 | 7/2009 | Liu et al. |
| 2009/0212636 A1 | 8/2009 | Cook et al. |
| 2009/0224609 A1 | 9/2009 | Cook et al. |
| 2009/0243397 A1 | 10/2009 | Cook et al. |
| 2009/0284082 A1 | 11/2009 | Mohammadian |
| 2009/0284220 A1 | 11/2009 | Toncich et al. |
| 2009/0284227 A1 | 11/2009 | Mohammadian et al. |
| 2009/0284369 A1 | 11/2009 | Toncich et al. |
| 2009/0286475 A1 | 11/2009 | Toncich et al. |
| 2010/0023092 A1 | 1/2010 | Govari et al. |
| 2010/0038970 A1 | 2/2010 | Cook et al. |
| 2010/0039066 A1 | 2/2010 | Yuan et al. |
| 2010/0081378 A1 | 4/2010 | Kawamura |
| 2010/0148939 A1 | 6/2010 | Yamada et al. |
| 2010/0181841 A1 | 7/2010 | Azancot et al. |
| 2010/0201201 A1 | 8/2010 | Mobarhan et al. |
| 2010/0201202 A1 | 8/2010 | Kirby et al. |
| 2010/0201310 A1 | 8/2010 | Vorenkamp et al. |
| 2010/0201311 A1 | 8/2010 | Lyell et al. |
| 2010/0201312 A1 | 8/2010 | Kirby et al. |
| 2010/0213896 A1 | 8/2010 | Ishii et al. |
| 2010/0219693 A1* | 9/2010 | Azancot et al. ................ 307/104 |
| 2010/0225272 A1* | 9/2010 | Kirby ....................... H04B 5/00 320/108 |
| 2010/0323642 A1 | 12/2010 | Morita |
| 2010/0328044 A1 | 12/2010 | Waffenschmidt et al. |
| 2011/0057606 A1 | 3/2011 | Saunamaeki |
| 2011/0074347 A1 | 3/2011 | Karalis et al. |
| 2011/0133569 A1 | 6/2011 | Cheon et al. |
| 2011/0176251 A1 | 7/2011 | Lee |
| 2012/0007437 A1 | 1/2012 | Fells et al. |
| 2013/0147428 A1 | 6/2013 | Kirby et al. |
| 2013/0147429 A1 | 6/2013 | Kirby et al. |
| 2013/0300358 A1 | 11/2013 | Kirby et al. |
| 2015/0171636 A1 | 6/2015 | Toncich et al. |

FOREIGN PATENT DOCUMENTS

| | | | |
|---|---|---|---|
| CN | 1242092 | A | 1/2000 |
| CN | 1426170 | A | 6/2003 |
| CN | 1460226 | A | 12/2003 |
| CN | 2681368 | Y | 2/2005 |
| CN | 1604426 | A | 4/2005 |
| CN | 1717879 | A | 1/2006 |
| CN | 1722521 | A | 1/2006 |
| CN | 1723643 | A | 1/2006 |
| CN | 1726656 | A | 1/2006 |
| CN | 1768462 | A | 5/2006 |
| CN | 1768467 | A | 5/2006 |
| CN | 1808473 | A | 7/2006 |
| CN | 1829037 | A | 9/2006 |
| CN | 1836953 | A | 9/2006 |
| CN | 1881733 | A | 12/2006 |
| CN | 1906863 | A | 1/2007 |
| CN | 1912786 | A | 2/2007 |
| CN | 1941541 | A | 4/2007 |
| CN | 1965324 | A | 5/2007 |
| CN | 1977294 | A | 6/2007 |
| CN | 1996352 | A | 7/2007 |
| CN | 101023600 | A | 8/2007 |
| CN | 101123318 | A | 2/2008 |
| CN | 101136561 | A | 3/2008 |
| CN | 101154823 | A | 4/2008 |
| CN | 201044047 | Y | 4/2008 |
| CN | 101233666 | A | 7/2008 |
| CN | 101291268 | A | 10/2008 |
| DE | 4004196 | | 4/1991 |
| DE | 29710675 | U1 | 8/1997 |
| DE | 10104019 | | 1/2002 |
| EP | 0444416 | A1 | 9/1991 |
| EP | 0689149 | | 12/1995 |
| EP | 0831411 | | 3/1998 |
| EP | 0878891 | A2 | 11/1998 |
| EP | 0962407 | A1 | 12/1999 |
| EP | 0977304 | A1 | 2/2000 |
| EP | 1022677 | A1 | 7/2000 |
| EP | 1050839 | | 11/2000 |
| EP | 1298578 | A1 | 4/2003 |
| EP | 1420357 | A1 | 5/2004 |
| EP | 1454769 | A1 | 9/2004 |
| EP | 1502543 | A1 | 2/2005 |
| EP | 1538726 | A1 | 6/2005 |
| EP | 1575184 | A1 | 9/2005 |
| EP | 1585268 | A2 | 10/2005 |
| EP | 1602160 | A1 | 12/2005 |
| EP | 1703435 | | 9/2006 |
| EP | 1713145 | | 10/2006 |
| EP | 1914663 | A1 | 4/2008 |
| EP | 1919091 | | 5/2008 |
| EP | 2093860 | A1 | 8/2009 |
| GB | 2307379 | | 5/1997 |
| GB | 2380359 | | 4/2003 |
| GB | 2394843 | A | 5/2004 |
| GB | 2395627 | | 5/2004 |
| GB | 2416633 | | 2/2006 |
| GB | 2433178 | | 6/2007 |
| GB | 2440571 | A | 2/2008 |
| JP | 59031054 | U | 2/1984 |
| JP | S62203526 | A | 9/1987 |
| JP | H05291991 | A | 11/1993 |
| JP | 6112720 | | 4/1994 |
| JP | H06133476 | A | 5/1994 |
| JP | H0711035 | U | 2/1995 |
| JP | H0739077 | A | 2/1995 |
| JP | H0771769 | A | 3/1995 |
| JP | H07131376 | A | 5/1995 |
| JP | 9103037 | A | 4/1997 |
| JP | 9147070 | A | 6/1997 |
| JP | H09172743 | A | 6/1997 |
| JP | 10145987 | A | 5/1998 |
| JP | H10210751 | A | 8/1998 |

(56) References Cited

FOREIGN PATENT DOCUMENTS

| | | |
|---|---|---|
| JP | H10225020 A | 8/1998 |
| JP | 10240880 A | 9/1998 |
| JP | 10295043 A | 11/1998 |
| JP | H10293826 A | 11/1998 |
| JP | 11025238 A | 1/1999 |
| JP | 11069640 | 3/1999 |
| JP | 11098706 | 4/1999 |
| JP | 11122832 | 4/1999 |
| JP | H11134566 A | 5/1999 |
| JP | H11155245 A | 6/1999 |
| JP | 11188113 A | 7/1999 |
| JP | 11338983 A | 12/1999 |
| JP | H11341711 A | 12/1999 |
| JP | 2000037046 A | 2/2000 |
| JP | 2000050534 A | 2/2000 |
| JP | 2000057450 A | 2/2000 |
| JP | 2000501263 A | 2/2000 |
| JP | 2000067195 A | 3/2000 |
| JP | 2000076008 A | 3/2000 |
| JP | 2000113127 A | 4/2000 |
| JP | 2000138621 A | 5/2000 |
| JP | 2000172795 A | 6/2000 |
| JP | 2001238372 A | 8/2001 |
| JP | 2001511574 A | 8/2001 |
| JP | 2001291080 A | 10/2001 |
| JP | 2001309579 A | 11/2001 |
| JP | 2001339327 A | 12/2001 |
| JP | 2002034169 A | 1/2002 |
| JP | 2002050534 A | 2/2002 |
| JP | 2002506259 A | 2/2002 |
| JP | 2002513490 A | 5/2002 |
| JP | 2002529982 A | 9/2002 |
| JP | 2003011734 A | 1/2003 |
| JP | 2003047178 A | 2/2003 |
| JP | 2003224937 A | 8/2003 |
| JP | 2004007851 A | 1/2004 |
| JP | 2004096589 A | 3/2004 |
| JP | 2004135455 A | 4/2004 |
| JP | 2004159456 A | 6/2004 |
| JP | 2004166384 A | 6/2004 |
| JP | 2004526236 A | 8/2004 |
| JP | 2004274972 A | 9/2004 |
| JP | 2004297779 A | 10/2004 |
| JP | 2004306558 A | 11/2004 |
| JP | 2004336742 A | 11/2004 |
| JP | 2004355212 A | 12/2004 |
| JP | 2005110399 A | 4/2005 |
| JP | 2005110412 A | 4/2005 |
| JP | 2005135455 A | 5/2005 |
| JP | 2005159607 A | 6/2005 |
| JP | 2005204493 A | 7/2005 |
| JP | 2005520428 A | 7/2005 |
| JP | 2005208754 A | 8/2005 |
| JP | 2005224045 A | 8/2005 |
| JP | 2005525705 A | 8/2005 |
| JP | 2005261187 A | 9/2005 |
| JP | 2005267643 A | 9/2005 |
| JP | 2005303697 A | 10/2005 |
| JP | 2006060909 A | 3/2006 |
| JP | 2006081249 A | 3/2006 |
| JP | 2006510101 A | 3/2006 |
| JP | 2006141170 A | 6/2006 |
| JP | 2006149168 A | 6/2006 |
| JP | 2006174676 A | 6/2006 |
| JP | 2006217731 A | 8/2006 |
| JP | 2006230129 A | 8/2006 |
| JP | 2006238548 A | 9/2006 |
| JP | 2006254678 A | 9/2006 |
| JP | 2006295905 A | 10/2006 |
| JP | 2006296123 A | 10/2006 |
| JP | 2006314181 A | 11/2006 |
| JP | 2007006029 A | 1/2007 |
| JP | 2007043773 A | 2/2007 |
| JP | 2007089341 A | 4/2007 |
| JP | 2007104868 A | 4/2007 |
| JP | 2007109301 A | 4/2007 |
| JP | 2007514400 A | 5/2007 |
| JP | 2007166379 A | 6/2007 |
| JP | 2007221584 A | 8/2007 |
| JP | 3995724 B2 | 10/2007 |
| JP | 2007336717 A | 12/2007 |
| JP | 2007537688 A | 12/2007 |
| JP | 2008054424 A | 3/2008 |
| JP | 2008508842 A | 3/2008 |
| JP | 2008104295 A | 5/2008 |
| JP | 2008109646 A | 5/2008 |
| JP | 2008120357 A | 5/2008 |
| JP | 2008199857 A | 8/2008 |
| JP | 2008199882 A | 8/2008 |
| JP | 2008283789 A | 11/2008 |
| JP | 2008543255 A | 11/2008 |
| JP | 2008295191 A | 12/2008 |
| JP | 2009523402 A | 6/2009 |
| JP | 2009527147 A | 7/2009 |
| JP | 2010508007 A | 3/2010 |
| JP | 2010508008 A | 3/2010 |
| JP | 2010527226 A | 8/2010 |
| JP | 2011030418 A | 2/2011 |
| KR | 1019980024391 | 7/1998 |
| KR | 20000011967 A | 2/2000 |
| KR | 20040026318 A | 3/2004 |
| KR | 20040072581 A | 8/2004 |
| KR | 20050105200 A | 11/2005 |
| KR | 20070017804 A | 2/2007 |
| KR | 20070032271 A | 3/2007 |
| KR | 20080036702 A | 4/2008 |
| TW | 546960 B | 8/2003 |
| TW | 200306048 A | 11/2003 |
| TW | 200512964 | 4/2005 |
| TW | 200614626 | 5/2006 |
| TW | M294779 U | 7/2006 |
| TW | 200717963 A | 5/2007 |
| TW | M319367 U | 8/2007 |
| TW | 200820537 A | 5/2008 |
| TW | 200824215 A | 6/2008 |
| TW | M334559 U | 6/2008 |
| TW | 200830663 A | 7/2008 |
| TW | M336621 U | 7/2008 |
| TW | 200843282 A | 11/2008 |
| TW | 200901597 A | 1/2009 |
| TW | M349639 U | 1/2009 |
| TW | I347724 | 8/2011 |
| TW | I366320 | 6/2012 |
| WO | WO-9829969 | 7/1998 |
| WO | WO-9854912 | 12/1998 |
| WO | WO-9905658 A1 | 2/1999 |
| WO | WO-0027137 A1 | 5/2000 |
| WO | WO-0227682 | 4/2002 |
| WO | WO-0262077 A1 | 8/2002 |
| WO | WO-03044970 A2 | 5/2003 |
| WO | WO-03079524 A2 | 9/2003 |
| WO | WO-2004025805 A1 | 3/2004 |
| WO | WO-2004032349 | 4/2004 |
| WO | WO-2004055654 A2 | 7/2004 |
| WO | WO-2004068726 A2 | 8/2004 |
| WO | WO-2004073150 A1 | 8/2004 |
| WO | WO-2004073166 A2 | 8/2004 |
| WO | WO-2004096023 A1 | 11/2004 |
| WO | WO-2005104022 | 11/2005 |
| WO | WO-2006011769 A1 | 2/2006 |
| WO | WO-2006031133 A1 | 3/2006 |
| WO | WO-2006068416 A1 | 6/2006 |
| WO | WO-2006101285 A1 | 9/2006 |
| WO | WO-2006127624 A2 | 11/2006 |
| WO | WO-2007000055 A1 | 1/2007 |
| WO | WO-2007015599 | 2/2007 |
| WO | WO-2007044144 | 4/2007 |
| WO | WO-2007068974 A2 | 6/2007 |
| WO | WO-2007081971 A2 | 7/2007 |
| WO | WO-2007084717 A2 | 7/2007 |
| WO | WO-2007089086 A1 | 8/2007 |
| WO | WO-2007095267 A2 | 8/2007 |
| WO | WO-2007138690 A1 | 12/2007 |
| WO | WO-2008011769 A1 | 1/2008 |

(56) References Cited

FOREIGN PATENT DOCUMENTS

| WO | WO-2008050260 A1 | 5/2008 |
|---|---|---|
| WO | WO-2008050292 A2 | 5/2008 |
| WO | WO-2008072628 A1 | 6/2008 |
| WO | WO-2008109489 A2 | 9/2008 |
| WO | WO-2008109691 A2 | 9/2008 |
| WO | WO-2009140221 | 11/2009 |
| WO | WO-2009140222 A1 | 11/2009 |
| WO | WO-2009140223 | 11/2009 |

OTHER PUBLICATIONS

Roy Want: "The Magic of RFID"Queue, vol. 2, No. 7, Oct. 2004, pp. 41-48, XP002585314Internet ISSN: 1542-7730 DOI: http://doi.acm.org/10.1145/1035594.1035619.

Want R: "An introduction to RFID technology"IEEE Pervasive Computing, IEEE Service Center, Los Alamitos, CA, US LNKD—DOI:10.1109/MPRV.2006.2. vol. 5, No. 1, Jan. 1, 2006 , pp. 25-33, XP002510139ISSN: 1536-1268.

Fan Z., et al., "Bandwidth allocation in UWB WPANs with ECMA-368 MAC", Computer Communications, Elsevier Science Publishers BV, Amsterdam, NL, vol. 32, No. 5, Mar. 27, 2009 , pp. 954-960, XP026001994.

Nikitin P.V., et al., "Theory and Measurement of Backscattering from RFID Tags", Antennas and Propagation Magazine, Dec. 2006, pp. 8. URL: http://www.ee.washington.edu/people/faculty/nikitin_pavel/papers/APmag_2006.pdf.

Turner C., et al., "Backscatter modulation of Impedance Modulated RFID tags", Feb. 2003, pp. 5. URL: http://www.rfip.eu/downloads/backscatter_tag_link_budget_and_modulation_at_reader_receiver.pdf.

Yates et al., "Optimal transmission frequency for ultralow-power short-range radio links", Source: IEEE Transactions on Circuits and Systems I: Fundamental Theory and Applications,, vol. 51, No. 7, Jul. 2004, pp. 1405-1413, ISSN: 1057-7122; DOI: 10.1109/TCSI.2004.830696; Publisher: IEEE, USA Author affiliation: Dept. of Electr. & Electron. Eng., Imperial Coll. London, UK.

* cited by examiner

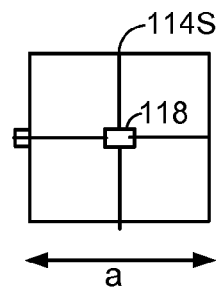
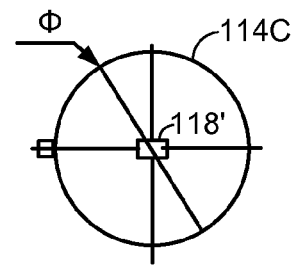
*FIG. 5A*  *FIG. 5B*
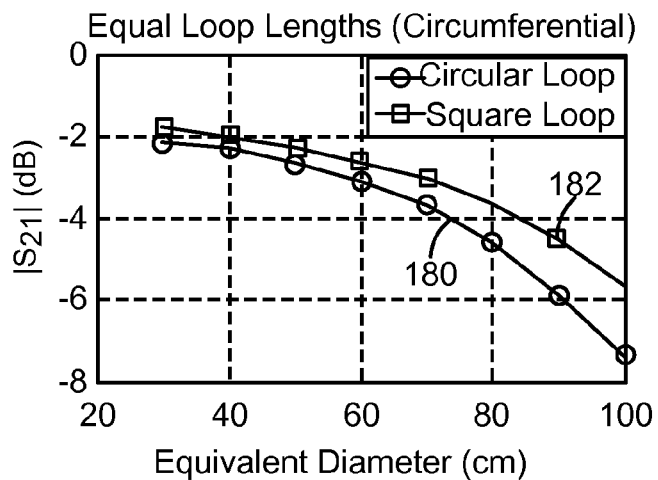
*FIG. 6*
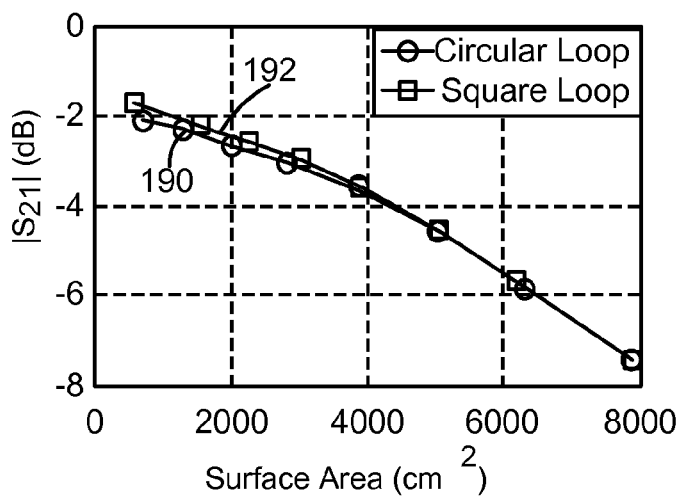
*FIG. 7*

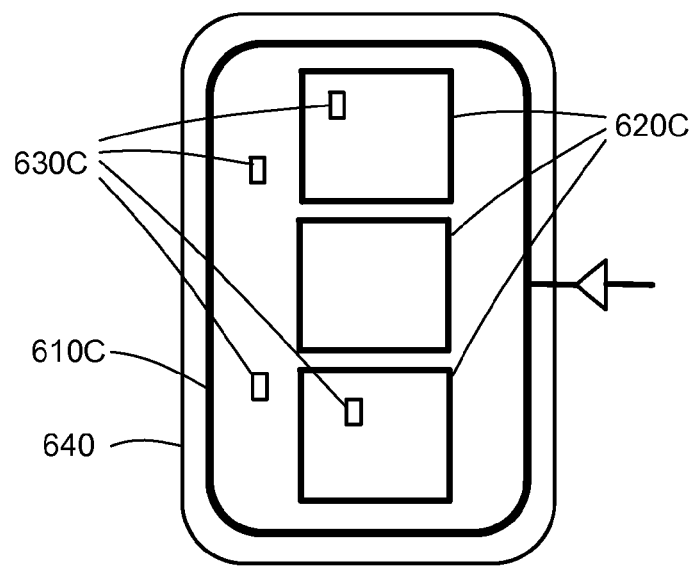
FIG. 16A
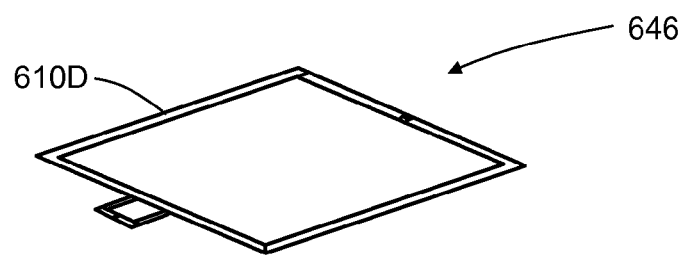
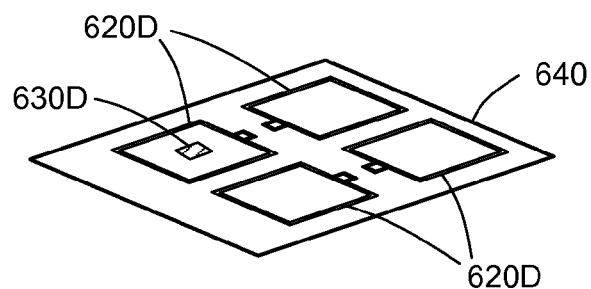
FIG. 16B

SYSTEMS AND METHODS RELATING TO MULTI-DIMENSIONAL WIRELESS CHARGING

CLAIM OF PRIORITY UNDER 35 U.S.C. §119

This application claims priority under 35 U.S.C. §119(e) to:

U.S. Provisional Patent Application No. 61/151,290 entitled "MULTI-DIMENSIONAL WIRELESS CHARGING" filed on Feb. 10, 2009, the disclosure of which is hereby incorporated by reference in its entirety; and U.S. Provisional Patent Application No. 61/244,391 entitled "MULTI-ANTENNA TRANSMITTER FOR WIRELESS CHARGING" filed on Sep. 21, 2009, the disclosure of which is hereby incorporated by reference in its entirety.

BACKGROUND

1. Field

The present invention relates generally to wireless charging, and more specifically to devices, systems, and methods related to multi-dimensional wireless charging.

2. Background

Typically, each battery powered device requires its own charger and power source, which is usually an AC power outlet. This becomes unwieldy when many devices need charging.

Approaches are being developed that use over the air power transmission between a transmitter and the device to be charged. These generally fall into two categories. One is based on the coupling of plane wave radiation (also called far-field radiation) between a transmit antenna and receive antenna on the device to be charged which collects the radiated power and rectifies it for charging the battery. Antennas are generally of resonant length in order to improve the coupling efficiency. This approach suffers from the fact that the power coupling falls off quickly with distance between the antennas. So charging over reasonable distances (e.g., >1-2 m) becomes difficult. Additionally, since the system radiates plane waves, unintentional radiation can interfere with other systems if not properly controlled through filtering.

Other approaches are based on inductive coupling between a transmit antenna embedded, for example, in a "charging" mat or surface and a receive antenna plus rectifying circuit embedded in the host device to be charged. This approach has the disadvantage that the spacing between transmit and receive antennas must be very close (e.g. mms). Though this approach does have the capability to simultaneously charge multiple devices in the same area, this area is typically small, hence the user must locate the devices to a specific area.

When placing one or more devices in a wireless charger (e.g. near-field magnetic resonance, inductive coupling, etc.) the orientation between the receiver and the charger may vary. For example, when charging a medical device while disinfecting it in a solution bath or when charging tools while working under water. When a device is dropped into a container with fluid inside, the angle in which the device lands on the bottom of the container would depend on the way its mass is distributed. As another non-limiting example, when the charger takes the form of a box or a bowl, carelessly throwing the device into it, which is very convenient to the user, does not guarantee the position the device will end up in. The charger may also be integrated into a large container or cabinet that can hold many devices, such as a tool storage chest, a toy chest, or an enclosure designed specifically for wireless charging. The receiver integration into these devices may be inconsistent because the devices have different form factors and may be placed in different orientations relative to the wireless power transmitter.

Existing designs of wireless chargers may perform best under a predefined orientation and deliver lower power levels if the orientation between the charger and the receiver is different. In addition, when the charged device is placed in a position where only a portion of the wireless power can be delivered to it, charging times may increase. Some solutions design the charger in a way that the user have to place the device in a special cradle or holder that positions the device to be charged in an advantageous orientation, which is less convenient than placing it in the charger without thought, or one that cannot hold multiple devices.

Therefore, there is a need to provide systems and methods relating to multi-dimensional wireless charging.

BRIEF DESCRIPTION OF THE DRAWINGS

FIGS. 5A and 5B show layouts of loop antennas for transmit and receive antennas according to exemplary embodiments of the present invention.

FIG. 6 shows simulation results indicating coupling strength between transmit and receive antennas relative to various circumference sizes for the square and circular transmit antennas illustrated in FIGS. 5A and 5B.

FIG. 7 shows simulation results indicating coupling strength between transmit and receive antennas relative to various surface areas for the square and circular transmit antennas illustrated in FIGS. 5A and 5B.

FIG. 16A illustrates a large transmit antenna with a three different smaller repeater antennas disposed coplanar with, and within a perimeter of, the transmit antenna.

FIG. 16B illustrates a large transmit antenna with smaller repeater antennas with offset coaxial placements and offset coplanar placements relative to the transmit antenna.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

The words "wireless power" is used herein to mean any form of energy associated with electric fields, magnetic fields, electromagnetic fields, or otherwise that is transmitted between from a transmitter to a receiver without the use of physical electromagnetic conductors.

Figure 1:
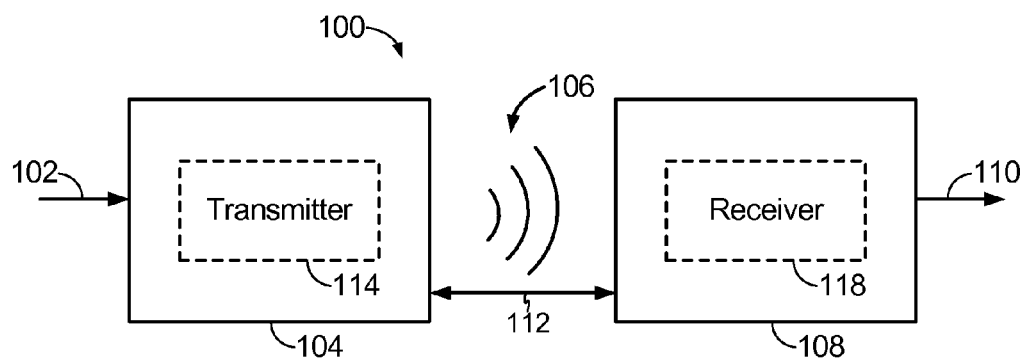
FIG. 1 shows a simplified block diagram of a wireless power transfer system.

FIG. 1 illustrates wireless transmission or charging system 100, in accordance with various exemplary embodiments of the present invention. Input power 102 is provided to a transmitter 104 for generating a radiated field 106 for providing energy transfer. A receiver 108 couples to the radiated field 106 and generates an output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship and when the resonant frequency of receiver 108 and the resonant frequency of transmitter 104 are exactly identical, transmission losses between the transmitter 104 and the receiver 108 are minimal when the receiver 108 is located in the "near-field" of the radiated field 106.

Transmitter 104 further includes a transmit antenna 114 for providing a means for energy transmission and receiver 108 further includes a receive antenna 118 for providing a means for energy reception. The transmit and receive antennas are sized according to applications and devices to be associated therewith. As stated, an efficient energy transfer occurs by coupling a large portion of the energy in the near-field of the transmitting antenna to a receiving antenna rather than propagating most of the energy in an electromagnetic wave to the far field. When in this near-field a coupling mode may be developed between the transmit antenna 114 and the receive antenna 118. The area around the antennas 114 and 118 where this near-field coupling may occur is referred to herein as a coupling-mode region.

Figure 2:
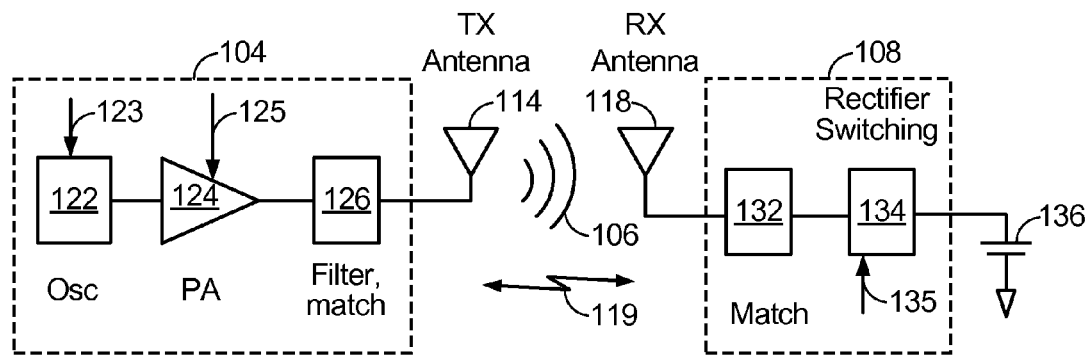
FIG. 2 shows a simplified schematic diagram of a wireless power transfer system.

FIG. 2 shows a simplified schematic diagram of a wireless power transfer system. The transmitter 104 includes an oscillator 122, a power amplifier 124 and a filter and matching circuit 126. The oscillator is configured to generate at a desired frequency, which may be adjusted in response to adjustment signal 123. The oscillator signal may be amplified by the power amplifier 124 with an amplification amount responsive to control signal 125. The filter and matching circuit 126 may be included to filter out harmonics or other unwanted frequencies and match the impedance of the transmitter 104 to the transmit antenna 114.

The receiver may include a matching circuit 132 and a rectifier and switching circuit to generate a DC power output to charge a battery 136 as shown in FIG. 2 or power a device coupled to the receiver (not shown). The matching circuit 132 may be included to match the impedance of the receiver 108 to the receive antenna 118.

Figure 3:
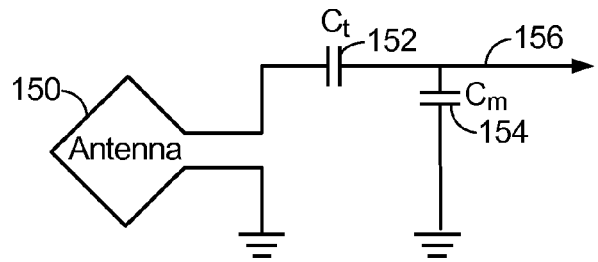
FIG. 3 shows a schematic diagram of a loop antenna for use in exemplary embodiments of the present invention.

As illustrated in FIG. 3, antennas used in exemplary embodiments may be configured as a "loop" antenna 150, which may also be referred to herein as a "magnetic" antenna. Loop antennas may be configured to include an air core or a physical core such as a ferrite core. Air core loop antennas may be more tolerable to extraneous physical devices placed in the vicinity of the core. Furthermore, an air core loop antenna allows the placement of other components within the core area. In addition, an air core loop may more readily enable placement of the receive antenna 118 (FIG. 2) within a plane of the transmit antenna 114 (FIG. 2) where the coupled-mode region of the transmit antenna 114 (FIG. 2) may be more powerful.

As stated, efficient transfer of energy between the transmitter 104 and receiver 108 occurs during matched or nearly matched resonance between the transmitter 104 and the receiver 108. However, even when resonance between the transmitter 104 and receiver 108 are not matched, energy may be transferred at a lower efficiency. Transfer of energy occurs by coupling energy from the near-field of the transmitting antenna to the receiving antenna residing in the neighborhood where this near-field is established rather than propagating the energy from the transmitting antenna into free space.

The resonant frequency of the loop or magnetic antennas is based on the inductance and capacitance. Inductance in a loop antenna is generally simply the inductance created by the loop, whereas, capacitance is generally added to the loop antenna's inductance to create a resonant structure at a desired resonant frequency. As a non-limiting example, capacitor 152 and capacitor 154 may be added to the antenna to create a resonant circuit that generates resonant signal 156. Accordingly, for larger diameter loop antennas, the size of capacitance needed to induce resonance decreases as the diameter or inductance of the loop increases. Furthermore, as the diameter of the loop or magnetic antenna increases, the efficient energy transfer area of the near-field increases. Of course, other resonant circuits are possible. As another non-limiting example, a capacitor may be placed in parallel between the two terminals of the loop antenna. In addition, those of ordinary skill in the art will recognize that for transmit antennas the resonant signal 156 may be an input to the loop antenna 150.

Exemplary embodiments of the invention include coupling power between two antennas that are in the near-fields of each other. As stated, the near-field is an area around the antenna in which electromagnetic fields exist but may not propagate or radiate away from the antenna. They are typically confined to a volume that is near the physical volume of the antenna. In the exemplary embodiments of the invention, magnetic type antennas such as single and multi-turn loop antennas are used for both transmit (Tx) and receive (Rx) antenna systems since magnetic near-field amplitudes tend to be higher for magnetic type antennas in comparison to the electric near-fields of an electric-type antenna (e.g., a small dipole). This allows for potentially higher coupling between the pair. Furthermore, "electric" antennas (e.g., dipoles and monopoles) or a combination of magnetic and electric antennas is also contemplated.

The Tx antenna can be operated at a frequency that is low enough and with an antenna size that is large enough to achieve good coupling (e.g., >−4 dB) to a small Rx antenna at significantly larger distances than allowed by far field and inductive approaches mentioned earlier. If the Tx antenna is sized correctly, high coupling levels (e.g., −2 to −4 dB) can be achieved when the Rx antenna on a host device is placed within a coupling-mode region (i.e., in the near-field) of the driven Tx loop antenna.

Figure 4:
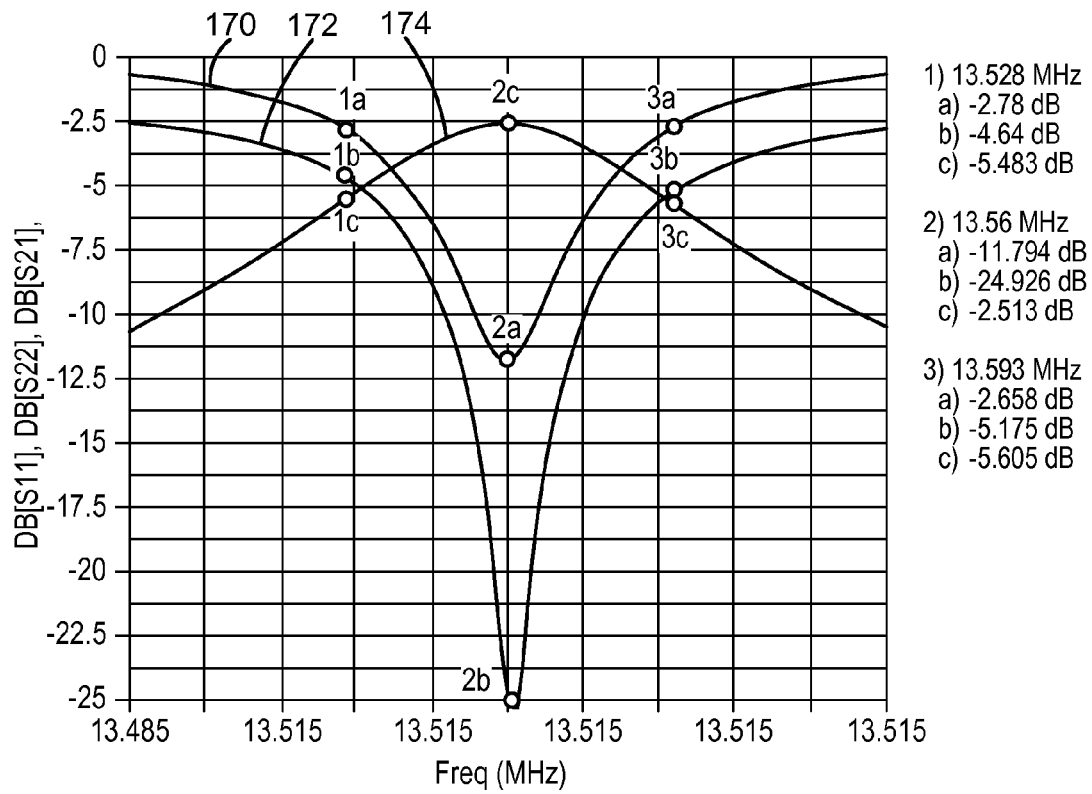
FIG. 4 shows simulation results indicating coupling strength between transmit and receive antennas.

FIG. 4 shows simulation results indicating coupling strength between transmit and receive antennas. Curves 170 and 172 indicate a measure of acceptance of power by the transmit and receive antennas, respectively. In other words, with a large negative number there is a very close impedance match and most of the power is accepted and, as a result, radiated by the transmit antenna. Conversely, a small negative number indicates that much of the power is reflected back from the antenna because there is not a close impedance match at the given frequency. In FIG. 4, the transmit antenna and the receive antenna are tuned to have a resonant frequency of about 13.56 MHz.

Curve 170 illustrates the amount of power transmitted from the transmit antenna at various frequencies. Thus, at points 1a and 3a, corresponding to about 13.528 MHz and 13.593 MHz, much of the power is reflected and not transmitted out of the transmit antenna. However, at point 2a, corresponding to about 13.56 MHz, it can be seen that a large amount of the power is accepted and transmitted out of the antenna.

Similarly, curve 172 illustrates the amount of power received by the receive antenna at various frequencies. Thus, at points 1b and 3b, corresponding to about 13.528 MHz and 13.593 MHz, much of the power is reflected and not conveyed through the receive antenna and into the receiver. However, at point 2b corresponding to about 13.56 MHz, it can be seen that a large amount of the power is accepted by the receive antenna and conveyed into the receiver.

Curve 174 indicates the amount of power received at the receiver after being sent from the transmitter through the transmit antenna, received through the receive antenna and conveyed to the receiver. Thus, at points 1c and 3c, corresponding to about 13.528 MHz and 13.593 MHz, much of the power sent out of the transmitter is not available at the receiver because (1) the transmit antenna rejects much of the power sent to it from the transmitter and (2) the coupling between the transmit antenna and the receive antenna is less efficient as the frequencies move away from the resonant frequency. However, at point 2c corresponding to about 13.56 MHz, it can be seen that a large amount of the power sent from the transmitter is available at the receiver, indicating a high degree of coupling between the transmit antenna and the receive antenna.

FIGS. 5A and 5B show layouts of loop antennas for transmit and receive antennas according to exemplary embodiments of the present invention. Loop antennas may be configured in a number of different ways, with single loops or multiple loops at wide variety of sizes. In addition, the loops may be a number of different shapes, such as, for example only, circular, elliptical, square, and rectangular. FIG. 5A illustrates a large square loop transmit antenna 114S and a small square loop receive antenna 118 placed in the same plane as the transmit antenna 114S and near the center of the transmit antenna 114S. FIG. 5B illustrates a large circular loop transmit antenna 114C and a small square loop receive antenna 118' placed in the same plane as the transmit antenna 114C and near the center of the transmit antenna 114C. The square loop transmit antenna 114S has side lengths of "a" while the circular loop transmit antenna 114C has a diameter of "." For a square loop, it can be shown that there is an equivalent circular loop whose diameter may be defined as: $\Phi_{eq} = 4a/\pi$.

FIG. 6 shows simulation results indicating coupling strength between transmit and receive antennas relative to various circumferences for the square and circular transmit antennas illustrated in FIGS. 4A and 4B. Thus, curve 180 shows coupling strength between the circular loop transmit antennas 114C and the receive antenna 118 at various circumference sizes for the circular loop transmit antenna 114C. Similarly, curve 182 shows coupling strength between the square loop transmit antennas 114S and the receive antenna 118' at various equivalent circumference sizes for the transmit loop transmit antenna 114S.

FIG. 7 shows simulation results indicating coupling strength between transmit and receive antennas relative to various surface areas for the square and circular transmit antennas illustrated in FIGS. 5A and 5B. Thus, curve 190 shows coupling strength between the circular loop transmit antennas 114C and the receive antenna 118 at various surface areas for the circular loop transmit antenna 114C. Similarly, curve 192 shows coupling strength between the square loop transmit antennas 114S and the receive antenna 118' at various surface areas for the transmit loop transmit antenna 114S.

Figure 8:
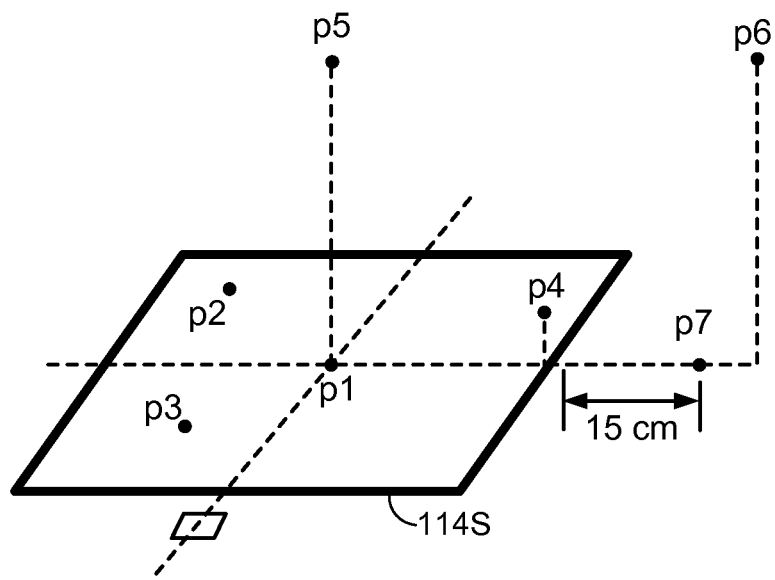
FIG. 8 shows various placement points for a receive antenna relative to a transmit antenna to illustrate coupling strengths in coplanar and coaxial placements.

FIG. 8 shows various placement points for a receive antenna relative to a transmit antenna to illustrate coupling strengths in coplanar and coaxial placements. "Coplanar," as used herein, means that the transmit antenna and receive antenna have planes that are substantially aligned (i.e., have surface normals pointing in substantially the same direction) and with no distance (or a small distance) between the planes of the transmit antenna and the receive antenna. "Coaxial," as used herein, means that the transmit antenna and receive antenna have planes that are substantially aligned (i.e., have surface normals pointing in substantially the same direction) and the distance between the two planes is not trivial and furthermore, the surface normal of the transmit antenna and the receive antenna lie substantially along the same vector, or the two normals are in echelon.

As examples, points p1, p2, p3, and p7 are all coplanar placement points for a receive antenna relative to a transmit antenna. As another example, point p5 and p6 are coaxial placement points for a receive antenna relative to a transmit antenna. The table below shows coupling strength (S21) and coupling efficiency (expressed as a percentage of power transmitted from the transmit antenna that reached the receive antenna) at the various placement points (p1-p7) illustrated in FIG. 8.

TABLE 1

| Position | Distance from plane (cm) | S21 efficiency (%) | Efficiency (TX DC power in to RX DC power out) |
|---|---|---|---|
| p1 | 0 | 46.8 | 28 |
| p2 | 0 | 55.0 | 36 |
| p3 | 0 | 57.5 | 35 |
| p4 | 2.5 | 49.0 | 30 |
| p5 | 17.5 | 24.5 | 15 |
| p6 | 17.5 | 0.3 | 0.2 |
| p7 | 0 | 5.9 | 3.4 |

As can be seen, the coplanar placement points p1, p2, and p3, all show relatively high coupling efficiencies. Placement point p7 is also a coplanar placement point, but is outside of the transmit loop antenna. While placement point p7 does not have a high coupling efficiency, it is clear that there is some coupling and the coupling-mode region extends beyond the perimeter of the transmit loop antenna.

Placement point p5 is coaxial with the transmit antenna and shows substantial coupling efficiency. The coupling efficiency for placement point p5 is not as high as the coupling efficiencies for the coplanar placement points. However, the coupling efficiency for placement point p5 is high enough that substantial power can be conveyed between the transmit antenna and a receive antenna in a coaxial placement.

Placement point p4 is within the circumference of the transmit antenna but at a slight distance above the plane of the transmit antenna in a position that may be referred to as an offset coaxial placement (i.e., with surface normals in substantially the same direction but at different locations) or offset coplanar (i.e., with surface normals in substantially the same direction but with planes that are offset relative to each other). From the table it can be seen that with an offset distance of 2.5 cm, placement point p4 still has relatively good coupling efficiency.

Placement point p6 illustrates a placement point outside the circumference of the transmit antenna and at a substantial distance above the plane of the transmit antenna. As can be seen from the table, placement point p7 shows little coupling efficiency between the transmit and receive antennas.

Figure 9:
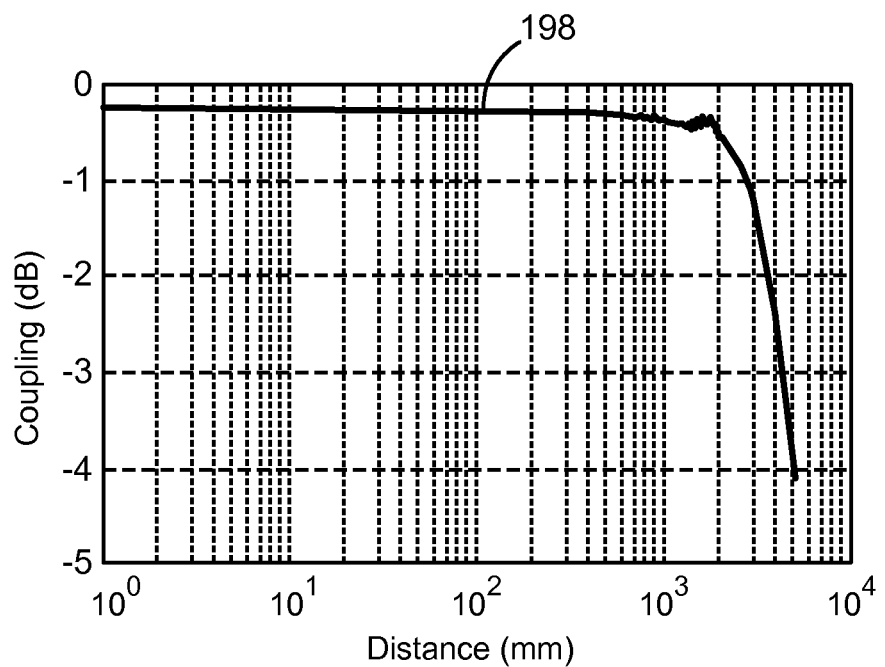
FIG. 9 shows simulation results indicating coupling strength for coaxial placement at various distances between the transmit and receive antennas.

FIG. 9 shows simulation results indicating coupling strength for coaxial placement at various distances between the transmit and receive antennas. The simulations for FIG. 9 are for square transmit and receive antennas in a coaxial placement, both with sides of about 1.2 meters and at a transmit frequency of 10 MHz. It can be seen that the coupling strength remains quite high and uniform at distances of less than about 0.5 meters.

Figure 10:
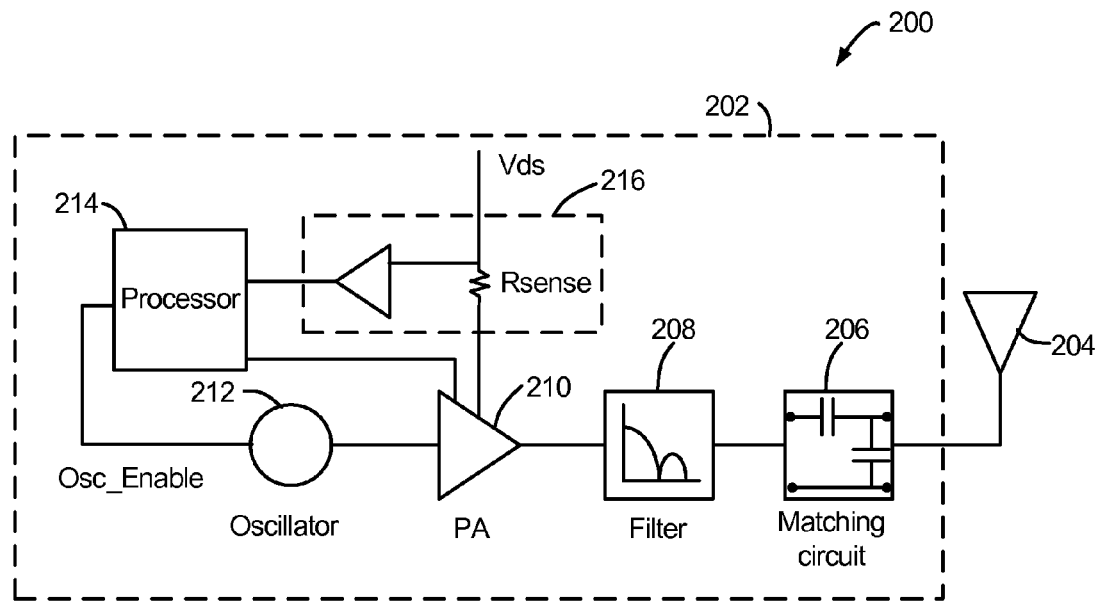
FIG. 10 is a simplified block diagram of a transmitter, in accordance with an exemplary embodiment of the present invention.

FIG. 10 is a simplified block diagram of a transmitter, in accordance with an exemplary embodiment of the present invention. A transmitter 200 includes transmit circuitry 202 and a transmit antenna 204. Generally, transmit circuitry 202 provides RF power to the transmit antenna 204 by providing an oscillating signal resulting in generation of near-field energy about the transmit antenna 204. By way of example, transmitter 200 may operate at the 13.56 MHz ISM band.

Exemplary transmit circuitry 202 includes a fixed impedance matching circuit 206 for matching the impedance of the transmit circuitry 202 (e.g., 50 ohms) to the transmit antenna 204 and a low pass filter (LPF) 208 configured to reduce harmonic emissions to levels to prevent self-jamming of devices coupled to receivers 108 (FIG. 1). Other exemplary embodiments may include different filter topologies, including but not limited to, notch filters that attenuate specific frequencies while passing others and may include an adaptive impedance match, that can be varied based on measurable transmit metrics, such as output power to the antenna or DC current draw by the power amplifier. Transmit circuitry 202 further includes a power amplifier 210 configured to drive an RF signal as determined by an oscillator 212. The transmit circuitry may be comprised of discrete devices or circuits, or alternately, may be comprised of an integrated assembly. An exemplary RF power output from transmit antenna 204 may be on the order of 2.5 Watts.

Transmit circuitry 202 further includes a processor 214 for enabling the oscillator 212 during transmit phases (or duty cycles) for specific receivers, for adjusting the frequency of the oscillator, and for adjusting the output power level for implementing a communication protocol for interacting with neighboring devices through their attached receivers.

The transmit circuitry 202 may further include a load sensing circuit 216 for detecting the presence or absence of active receivers in the vicinity of the near-field generated by transmit antenna 204. By way of example, a load sensing circuit 216 monitors the current flowing to the power amplifier 210, which is affected by the presence or absence of active receivers in the vicinity of the near-field generated by transmit antenna 204. Detection of changes to the loading on the power amplifier 210 are monitored by processor 214 for use in determining whether to enable the oscillator 212 for transmitting energy to communicate with an active receiver.

Transmit antenna 204 may be implemented as an antenna strip with the thickness, width and metal type selected to keep resistive losses low. In a conventional implementation, the transmit antenna 204 can generally be configured for association with a larger structure such as a table, mat, lamp or other less portable configuration. Accordingly, the transmit antenna 204 generally will not need "turns" in order to be of a practical dimension. An exemplary implementation of a transmit antenna 204 may be "electrically small" (i.e., fraction of the wavelength) and tuned to resonate at lower usable frequencies by using capacitors to define the resonant frequency. In an exemplary application where the transmit antenna 204 may be larger in diameter, or length of side if a square loop, (e.g., 0.50 meters) relative to the receive antenna, the transmit antenna 204 will not necessarily need a large number of turns to obtain a reasonable capacitance.

Figure 11:
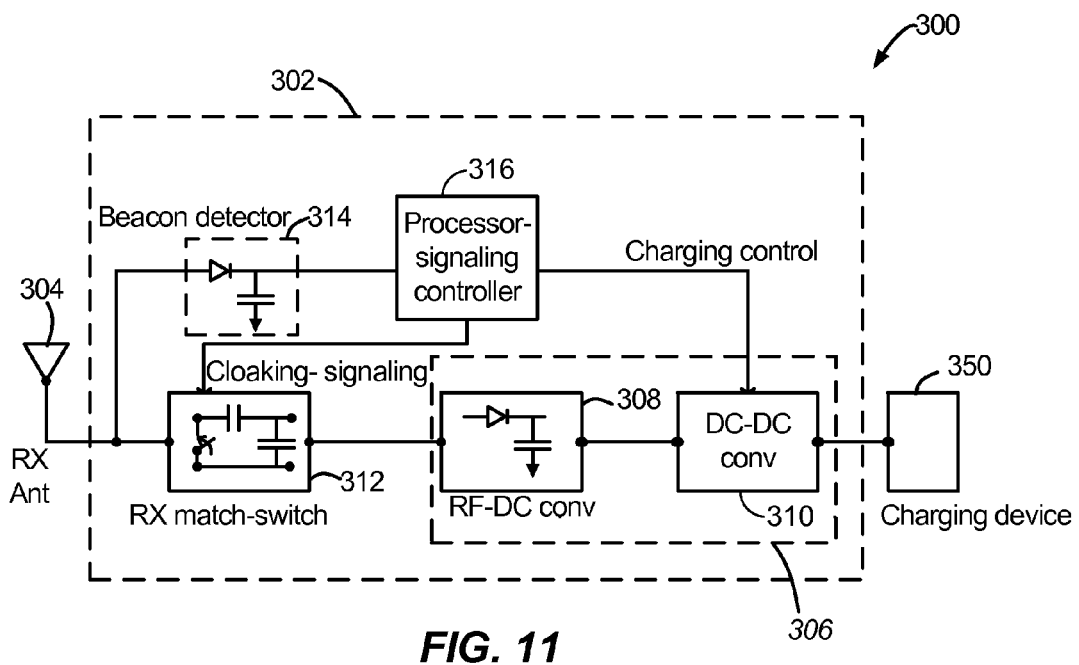
FIG. 11 is a simplified block diagram of a receiver, in accordance with an exemplary embodiment of the present invention.

FIG. 11 is a block diagram of a receiver, in accordance with an exemplary embodiment of the present invention. A receiver 300 includes receive circuitry 302 and a receive antenna 304. Receiver 300 further couples to device 350 for providing received power thereto. It should be noted that receiver 300 is illustrated as being external to device 350 but may be integrated into device 350. Generally, energy is propagated wirelessly to receive antenna 304 and then coupled through receive circuitry 302 to device 350.

Receive antenna 304 is tuned to resonate at the same frequency, or near the same frequency, as transmit antenna 204 (FIG. 10). Receive antenna 304 may be similarly dimensioned with transmit antenna 204 or may be differently sized based upon the dimensions of an associated device 350. By way of example, device 350 may be a portable electronic device having diametric or length dimension smaller that the diameter of length of transmit antenna 204. In such an example, receive antenna 304 may be implemented as a multi-turn antenna in order to reduce the capacitance value of a tuning capacitor (not shown) and increase the receive antenna's impedance. By way of example, receive antenna 304 may be placed around the substantial circumference of device 350 in order to maximize the antenna diameter and reduce the number of loop turns (i.e., windings) of the receive antenna and the inter-winding capacitance.

Receive circuitry 302 provides an impedance match to the receive antenna 304. Receive circuitry 302 includes power conversion circuitry 306 for converting a received RF energy source into charging power for use by device 350. Power conversion circuitry 306 includes an RF-to-DC converter 308 and may also in include a DC-to-DC converter 310. RF-to-DC converter 308 rectifies the RF energy signal received at receive antenna 304 into a non-alternating power while DC-to-DC converter 310 converts the rectified RF energy signal into an energy potential (e.g., voltage) that is compatible with device 350. Various RF-to-DC converters are contemplated including partial and full rectifiers, regulators, bridges, doublers, as well as linear and switching converters.

Receive circuitry 302 may further include switching circuitry 312 for connecting receive antenna 304 to the power conversion circuitry 306 or alternatively for disconnecting the power conversion circuitry 306. Disconnecting receive antenna 304 from power conversion circuitry 306 not only suspends charging of device 350, but also changes the "load" as "seen" by the transmitter 200 (FIG. 2) as is explained more fully below. As disclosed above, transmitter 200 includes load sensing circuit 216 which detects fluctuations in the bias current provided to transmitter power amplifier 210. Accordingly, transmitter 200 has a mechanism for determining when receivers are present in the transmitter's near-field.

When multiple receivers 300 are present in a transmitter's near-field, it may be desirable to time-multiplex the loading and unloading of one or more receivers to enable other receivers to more efficiently couple to the transmitter. A receiver may also be cloaked in order to eliminate coupling to other nearby receivers or to reduce loading on nearby transmitters. This "unloading" of a receiver is also known herein as a "cloaking" Furthermore, this switching between unloading and loading controlled by receiver 300 and detected by transmitter 200 provides a communication mechanism from receiver 300 to transmitter 200 as is explained more fully below. Additionally, a protocol can be associated with the switching which enables the sending of a message from receiver 300 to transmitter 200. By way of example, a switching speed may be on the order of 100 µsec.

In an exemplary embodiment, communication between the transmitter and the receiver refers to a Device Sensing and Charging Control Mechanism, rather than conventional two-way communication. In other words, the transmitter uses on/off keying of the transmitted signal to adjust whether energy is available in the near-filed. The receivers interpret these changes in energy as a message from the transmitter. From the receiver side, the receiver uses tuning and de-tuning of the receive antenna to adjust how much power is being accepted from the near-field. The transmitter can detect this difference in power used from the near-field and interpret these changes as a message from the receiver.

Receive circuitry 302 may further include signaling detector and beacon circuitry 314 used to identify received energy fluctuations, which may correspond to informational signaling from the transmitter to the receiver. Furthermore, signaling and beacon circuitry 314 may also be used to detect the transmission of a reduced RF signal energy (i.e., a beacon signal) and to rectify the reduced RF signal energy into a nominal power for awakening either un-powered or power-depleted circuits within receive circuitry 302 in order to configure receive circuitry 302 for wireless charging.

Receive circuitry 302 further includes processor 316 for coordinating the processes of receiver 300 described herein including the control of switching circuitry 312 described herein. Cloaking of receiver 300 may also occur upon the occurrence of other events including detection of an external wired charging source (e.g., wall/USB power) providing charging power to device 350. Processor 316, in addition to controlling the cloaking of the receiver, may also monitor beacon circuitry 314 to determine a beacon state and extract messages sent from the transmitter. Processor 316 may also adjust DC-to-DC converter 310 for improved performance.

Figure 12:
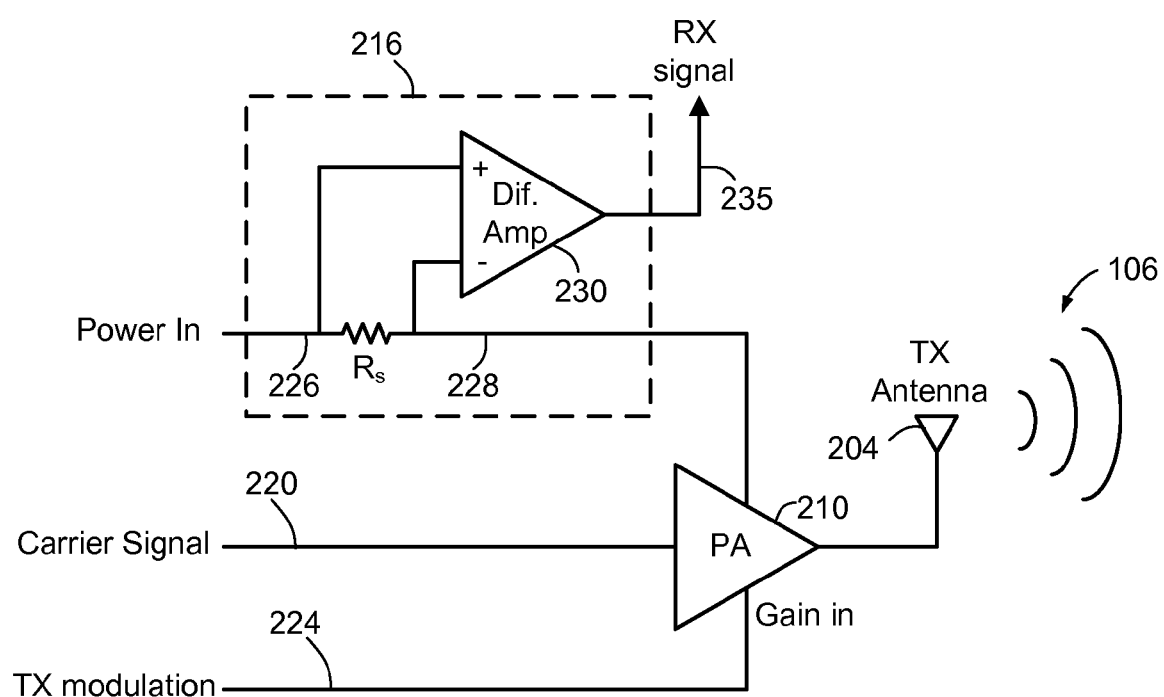
FIG. 12 shows a simplified schematic of a portion of transmit circuitry for carrying out messaging between a transmitter and a receiver.

FIG. 12 shows a simplified schematic of a portion of transmit circuitry for carrying out messaging between a transmitter and a receiver. In some exemplary embodiments of the present invention, a means for communication may be enabled between the transmitter and the receiver. In FIG. 12 a power amplifier 210 drives the transmit antenna 204 to generate the radiated field. The power amplifier is driven by a carrier signal 220 that is oscillating at a desired frequency for the transmit antenna 204. A transmit modulation signal 224 is used to control the output of the power amplifier 210.

The transmit circuitry can send signals to receivers by using an ON/OFF keying process on the power amplifier 210. In other words, when the transmit modulation signal 224 is asserted, the power amplifier 210 will drive the frequency of the carrier signal 220 out on the transmit antenna 204. When the transmit modulation signal 224 is negated, the power amplifier will not drive out any frequency on the transmit antenna 204.

The transmit circuitry of FIG. 12 also includes a load sensing circuit 216 that supplies power to the power amplifier 210 and generates a receive signal 235 output. In the load sensing circuit 216 a voltage drop across resistor $R_s$ develops between the power in signal 226 and the power supply 228 to the power amplifier 210. Any change in the power consumed by the power amplifier 210 will cause a change in the voltage drop that will be amplified by differential amplifier 230. When the transmit antenna is in coupled mode with a receive antenna in a receiver (not shown in FIG. 12) the amount of current drawn by the power amplifier 210 will change. In other words, if no coupled mode resonance exist for the transmit antenna 210, the power required to drive the radiated field will be first amount. If a coupled mode resonance exists, the amount of power consumed by the power amplifier 210 will go up because much of the power is being coupled into the receive antenna. Thus, the receive signal 235 can indicate the presence of a receive antenna coupled to the transmit antenna 235 and can also detect signals sent from the receive antenna, as explained below. Additionally, a change in receiver current draw will be observable in the transmitter's power amplifier current draw, and this change can be used to detect signals from the receive antennas, as explained below.

Figure 13A:
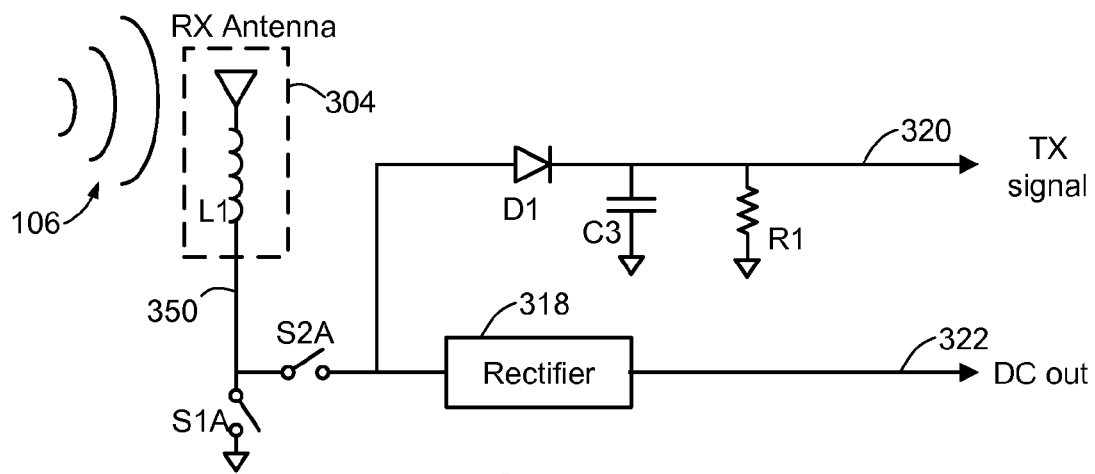
FIGS. 13A-13C shows a simplified schematic of a portion of receive circuitry in various states to illustrate messaging between a receiver and a transmitter.
Figure 13B:
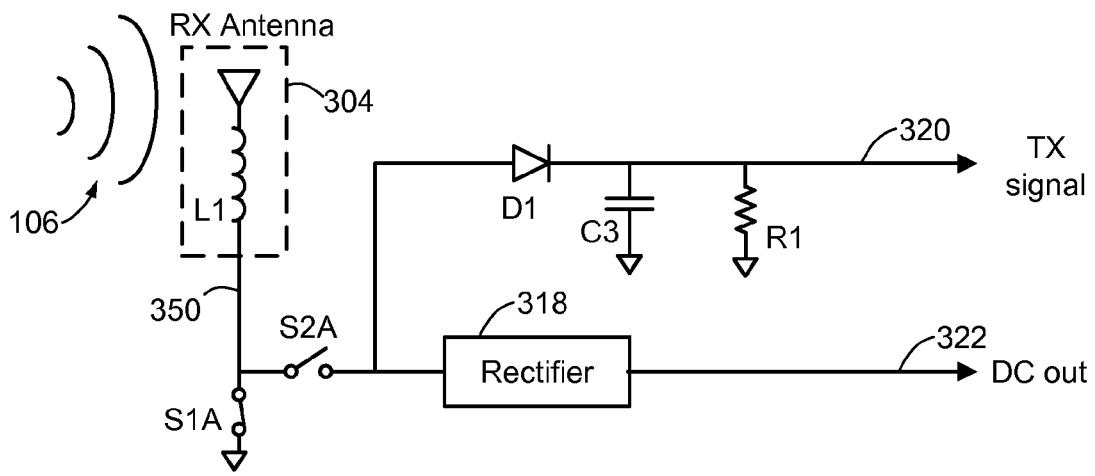
Figure 13C:
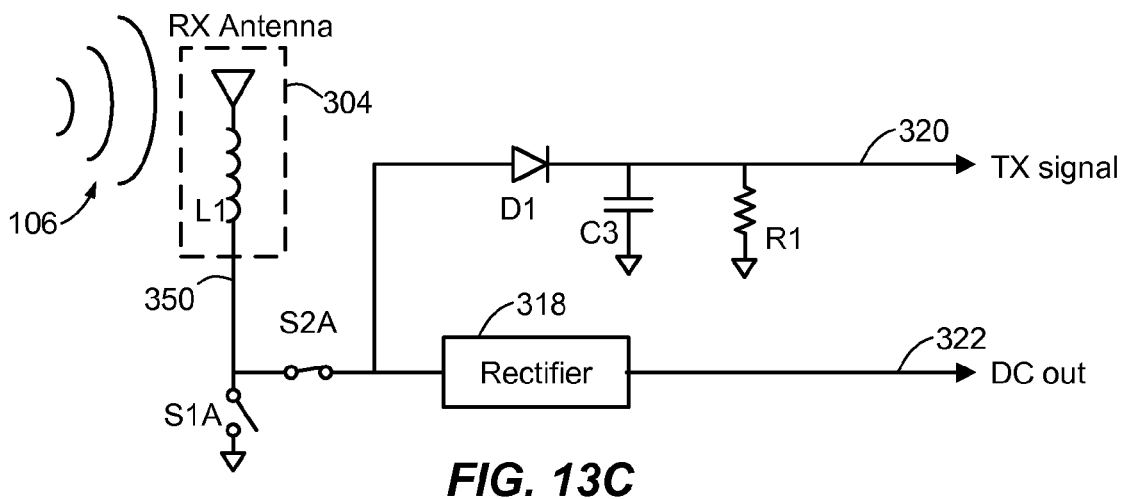

FIGS. 13A-13C shows a simplified schematic of a portion of receive circuitry in various states to illustrate messaging between a receiver and a transmitter. All of FIGS. 13A-13C show the same circuit elements with the difference being state of the various switches. A receive antenna 304 includes a characteristic inductance L1, which drives node 350. Node 350 is selectively coupled to ground through switch S1A. Node 350 is also selectively coupled to diode D1 and rectifier 318 through switch S1B. The rectifier 318 supplies a DC power signal 322 to a receive device (not shown) to power the receive device, charge a battery, or a combination thereof. The diode D1 is coupled to a transmit signal 320 which is filtered to remove harmonics and unwanted frequencies with capacitor C3 and resistor R1. Thus the combination of D1, C3, and R1 can generate a signal on the transmit signal 320 that mimics the transmit modulation generated by the transmit modulation signal 224 discussed above with reference to the transmitter in FIG. 12.

Exemplary embodiments of the invention includes modulation of the receive device's current draw and modulation of the receive antenna's impedance to accomplish reverse link signaling. With reference to both FIG. 13A and FIG. 12, as the power draw of the receive device changes, the load sensing circuit 216 detects the resulting power changes on the transmit antenna and from these changes can generate the receive signal 235.

In the exemplary embodiments of FIGS. 13A-13C, the current draw through the transmitter can be changed by modifying the state of switches S1A and S2A. In FIG. 13A, switch S1A and switch S2A are both open creating a "DC open state" and essentially removing the load from the transmit antenna 204. This reduces the current seen by the transmitter.

In FIG. 13B, switch S1A is closed and switch S2A is open creating a "DC short state" for the receive antenna 304. Thus the state in FIG. 13B can be used to increase the current seen in the transmitter.

In FIG. 13C, switch S1A is open and switch S2A is closed creating a normal receive mode (also referred to herein as a "DC operating state") wherein power can be supplied by the DC out signal 322 and a transmit signal 320 can be detected. In the state shown in FIG. 13C the receiver receives a normal amount of power, thus consuming more or less power from the transmit antenna than the DC open state or the DC short state.

Reverse link signaling may be accomplished by switching between the DC operating state (FIG. 13C) and the DC short state (FIG. 13B). Reverse link signaling also may be accomplished by switching between the DC operating state (FIG. 13C) and the DC open state (FIG. 13A).

Figure 14A:
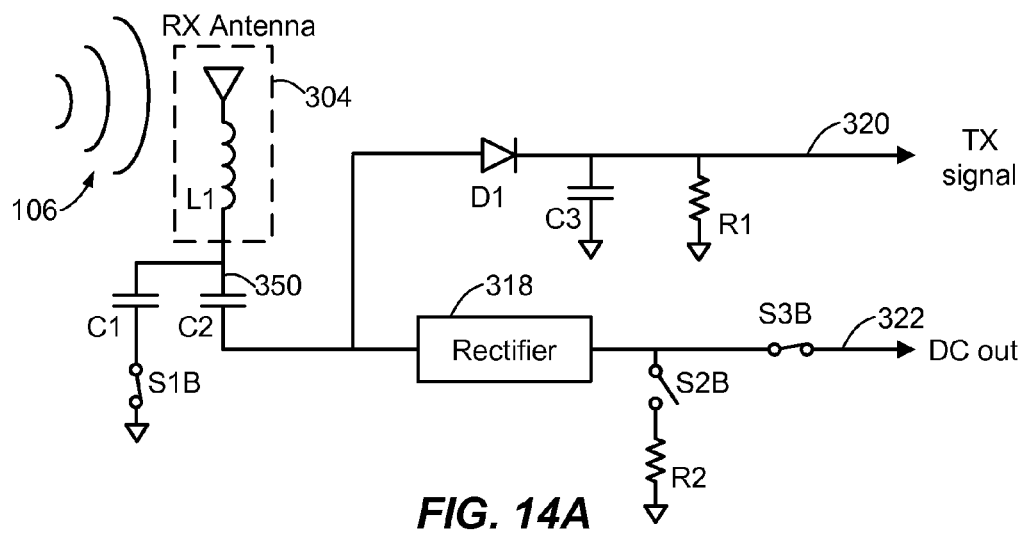
FIGS. 14A-14C shows a simplified schematic of a portion of alternative receive circuitry in various states to illustrate messaging between a receiver and a transmitter.
Figure 14B:
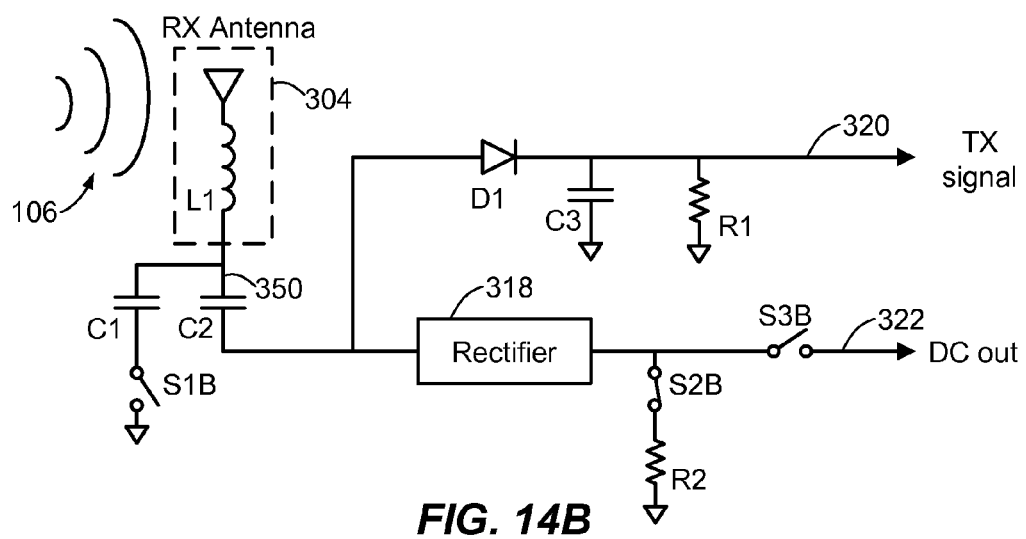
Figure 14C:
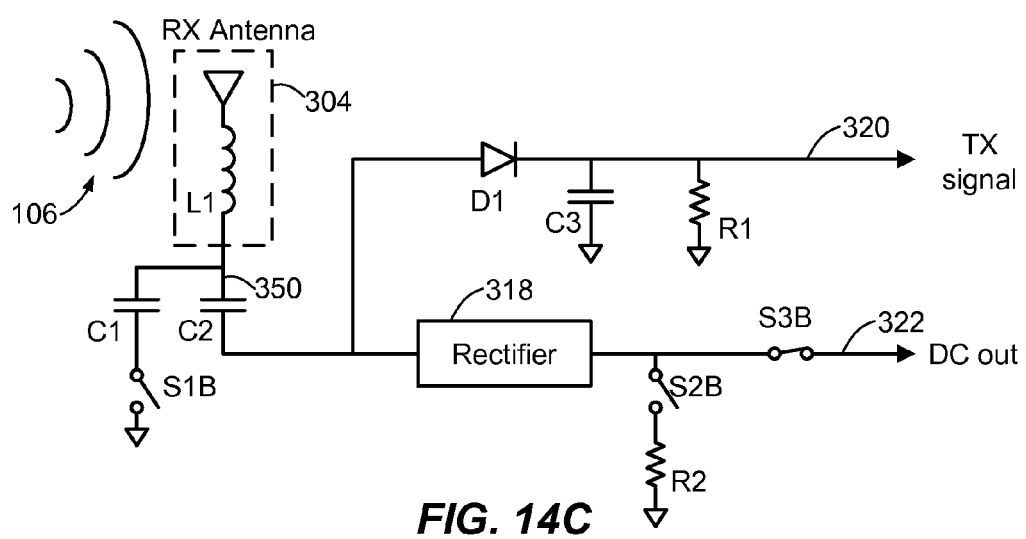

FIGS. 14A-14C shows a simplified schematic of a portion of alternative receive circuitry in various states to illustrate messaging between a receiver and a transmitter.

All of FIGS. 14A-14C show the same circuit elements with the difference being state of the various switches. A receive antenna 304 includes a characteristic inductance L1, which drives node 350. Node 350 is selectively coupled to ground through capacitor C1 and switch S1B. Node 350 is also AC coupled to diode D1 and rectifier 318 through capacitor C2. The diode D1 is coupled to a transmit signal 320 which is filtered to remove harmonics and unwanted frequencies with capacitor C3 and resistor R1. Thus the combination of D1, C3, and R1 can generate a signal on the transmit signal 320 that mimics the transmit modulation generated by the transmit modulation signal 224 discussed above with reference to the transmitter in FIG. 12.

The rectifier 318 is connected to switch S2B, which is connected in series with resistor R2 and ground. The rectifier 318 also is connected to switch S3B. The other side of switch S3B supplies a DC power signal 322 to a receive device (not shown) to power the receive device, charge a battery, or a combination thereof.

In FIGS. 13A-13C the DC impedance of the receive antenna 304 is changed by selectively coupling the receive antenna to ground through switch S1B. In contrast, in the exemplary embodiments of FIGS. 14A-14C, the impedance of the antenna can be modified to generate the reverse link signaling by modifying the state of switches S1B, S2B, and S3B to change the AC impedance of the receive antenna 304. In FIGS. 14A-14C the resonant frequency of the receive antenna 304 may be tuned with capacitor C2. Thus, the AC impedance of the receive antenna 304 may be changed by selectively coupling the receive antenna 304 through capacitor C1 using switch S1B, essentially changing the resonance circuit to a different frequency that will be outside of a range that will optimally couple with the transmit antenna. If the resonance frequency of the receive antenna 304 is near the resonant frequency of the transmit antenna, and the receive antenna 304 is in the near-field of the transmit antenna, a coupling mode may develop wherein the receiver can draw significant power from the radiated field 106.

In FIG. 14A, switch S1B is closed, which de-tunes the antenna and creates an "AC cloaking state," essentially "cloaking" the receive antenna 304 from detection by the transmit antenna 204 because the receive antenna does not resonate at the transmit antenna's frequency. Since the receive antenna will not be in a coupled mode, the state of switches S2B and S3B are not particularly important to the present discussion.

In FIG. 14B, switch S1B is open, switch S2B is closed, and switch S3B is open, creating a "tuned dummy-load state" for the receive antenna 304. Because switch S1B is open, capacitor C1 does not contribute to the resonance circuit and the receive antenna 304 in combination with capacitor C2 will be in a resonance frequency that may match with the resonant frequency of the transmit antenna. The combination of switch S3B open and switch S2B closed creates a relatively high current dummy load for the rectifier, which will draw more power through the receive antenna 304, which can be sensed by the transmit antenna. In addition, the transmit signal 320 can be detected since the receive antenna is in a state to receive power from the transmit antenna.

In FIG. 14C, switch S1B is open, switch S2B is open, and switch S3B is closed, creating a "tuned operating state" for the receive antenna 304. Because switch S1B is open, capacitor C1 does not contribute to the resonance circuit and the receive antenna 304 in combination with capacitor C2 will be in a resonance frequency that may match with the resonant frequency of the transmit antenna. The combination of switch S2B open and switch S3B closed creates a normal operating state wherein power can be supplied by the DC out signal 322 and a transmit signal 320 can be detected.

Reverse link signaling may be accomplished by switching between the tuned operating state (FIG. 14C) and the AC cloaking state (FIG. 14A). Reverse link signaling also may be accomplished by switching between the tuned dummy-load state (FIG. 14B) and the AC cloaking state (FIG. 14A). Reverse link signaling also may be accomplished by switching between the tuned operating state (FIG. 14C) and the tuned dummy-load state (FIG. 14B) because there will be a difference in the amount of power consumed by the receiver, which can be detected by the load sensing circuit in the transmitter.

Of course, those of ordinary skill in the art will recognize that other combinations of switches S1B, S2B, and S3B may be used to create cloaking, generate reverse link signaling and supplying power to the receive device. In addition, the switches S1A and S1B may be added to the circuits of FIGS. 14A-14C to create other possible combinations for cloaking, reverse link signaling, and supplying power to the receive device.

Thus, when in a coupled mode signals may be sent from the transmitter to the receiver, as discussed above with reference to FIG. 12. In addition, when in a coupled mode signals may be sent from the receiver to the transmitter, as discussed above with reference to FIGS. 13A-13C and 14A-14C.

Figure 15A:
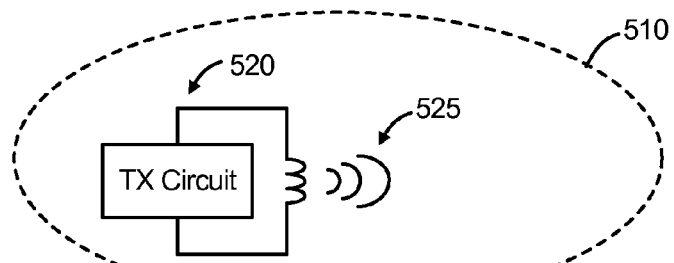
FIGS. 15A-15D are simplified block diagrams illustrating a beacon power mode for transmitting power between a transmitter and a receiver.

FIGS. 15A-15D are simplified block diagrams illustrating a beacon power mode for transmitting power between a transmitter and a one or more receivers. FIG. 15A illustrates a transmitter 520 having a low power "beacon" signal 525 when there are no receive devices in the beacon coupling-mode region 510. The beacon signal 525 may be, as a non-limiting example, such as in the range of ~10 to ~20 mW RF. This signal may be adequate to provide initial power to a device to be charged when it is placed in the coupling-mode region.

Figure 15B:
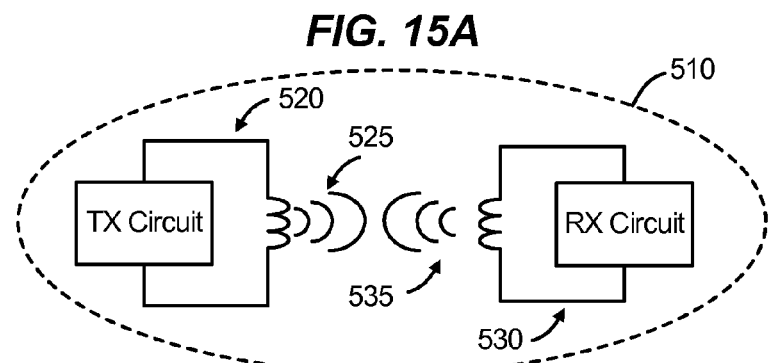

FIG. 15B illustrates a receive device 530 placed within the beacon coupling-mode region 510 of the transmitter 520 transmitting the beacon signal 525. If the receive device 530 is on and develops a coupling with the transmitter it will generate a reverse link coupling 535, which is really just the receiver accepting power from the beacon signal 525. This additional power, may be sensed by the load sensing circuit 216 (FIG. 12) of the transmitter. As a result, the transmitter may go into a high power mode.

Figure 15C:
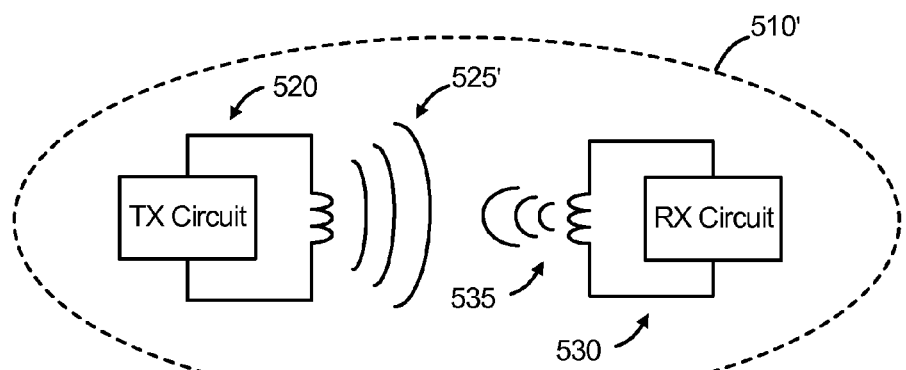

FIG. 15C illustrates the transmitter 520 generating a high power signal 525' resulting in a high power coupling-mode region 510'. As long as the receive device 530 is accepting power and, as a result, generating the reverse link coupling 535, the transmitter will remain in the high power state. While only one receive device 530 is illustrated, multiple receive devices 530 may be present in the coupling-mode region 510. If there are multiple receive device 530 they will share the amount of power transmitted by the transmitter based on how well each receive device 530 is coupled. For example, the coupling efficiency may be different for each receive device 530 depending on where the device is placed within the coupling-mode region 510 as was explained above with reference to FIGS. 8 and 9.

Figure 15D:
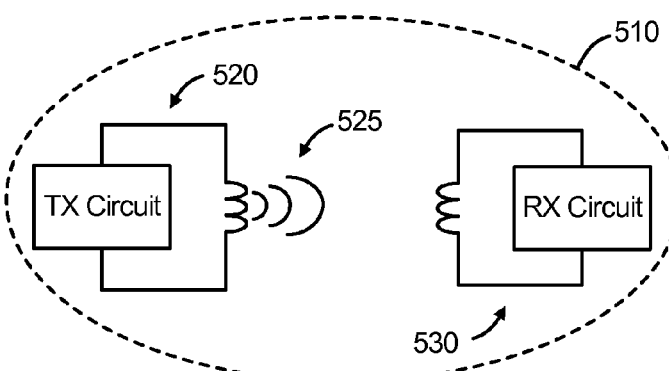

FIG. 15D illustrates the transmitter 520 generating the beacon signal 525 even when a receive device 530 is in the beacon coupling-mode region 510. This state may occur when the receive device 530 is shut off, or the device cloaks itself, perhaps because it does not need any more power.

The receiver and transmitter may communicate on a separate communication channel (e.g., Bluetooth, zigbee, etc). With a separate communication channel, the transmitter may determine when to switch between beacon mode and high power mode, or create multiple power levels, based on the number of receive devices in the coupling-mode region 510 and their respective power requirements.

Exemplary embodiments of the invention include enhancing the coupling between a relatively large transmit antenna and a small receive antenna in the near-field power transfer between two antennas through introduction of additional antennas into the system of coupled antennas that will act as repeaters and will enhance the flow of power from the transmitting antenna toward the receiving antenna.

In exemplary embodiments, one or more extra antennas are used that couple to the transmit antenna and receive antenna in the system. These extra antennas comprise repeater antennas, such as active or passive antennas. A passive antenna may include simply the antenna loop and a capacitive element for tuning a resonant frequency of the antenna. An active element may include, in addition to the antenna loop and one or more tuning capacitors, an amplifier for increasing the strength of a repeated near-field radiation.

The combination of the transmit antenna and the repeater antennas in the power transfer system may be optimized such that coupling of power to very small receive antennas is enhanced based on factors such as termination loads, tuning components, resonant frequencies, and placement of the repeater antennas relative to the transmit antenna.

A single transmit antenna exhibits a finite near-field coupling mode region. Accordingly, a user of a device charging through a receiver in the transmit antenna's near-field coupling mode region may require a considerable user access space that would be prohibitive or at least inconvenient. Furthermore, the coupling mode region may diminish quickly as a receive antenna moves away from the transmit antenna.

A repeater antenna may refocus and reshape a coupling mode region from a transmit antenna to create a second coupling mode region around the repeater antenna, which may be better suited for coupling energy to a receive antenna. Discussed below in FIGS. 16A-18B are some non-limiting examples of embodiments including repeater antennas.

FIG. 16A illustrates a large transmit antenna 610C with three smaller repeater antennas 620C disposed coplanar with, and within a perimeter of, the transmit antenna 610C. The transmit antenna 610C and repeater antennas 620C are formed on a table 640. Various devices including receive antennas 630C are placed at various locations within the transmit antenna 610C and repeater antennas 620C. The exemplary embodiment of FIG. 16A may be able to refocus the coupling mode region generated by the transmit antenna 610C into smaller and stronger repeated coupling mode regions around each of the repeater antennas 620C. As a result, a relatively strong repeated near-field radiation is available for the receive antennas 630C. Some of the receive antennas are placed outside of any repeater antennas 620C. Recall that the coupled mode region may extend somewhat outside the perimeter of an antenna. Therefore, receive antennas 630C may be able to receive power from the near-field radiation of the transmit antenna 610C as well as any nearby repeater antennas 620C. As a result, receive antennas placed outside of any repeater antennas 620C, may be still be able to receive power from the near-field radiation of the transmit antenna 610C as well as any nearby repeater antennas 620C.

FIG. 16B illustrates a large transmit antenna 610D with smaller repeater antennas 620D with offset coaxial placements and offset coplanar placements relative to the transmit antenna 610D. A device including a receive antenna 630D is placed within the perimeter of one of the repeater antennas 620D. As a non-limiting example, the transmit antenna 610D may be disposed on a ceiling 646, while the repeater antennas 620D may be disposed on a table 640. The repeater antennas 620D in an offset coaxial placement may be able to reshape and enhance the near-field radiation from the transmitter antenna 610D to repeated near-field radiation around the repeater antennas 620D. As a result, a relatively strong repeated near-field radiation is available for the receive antenna 630D placed coplanar with the repeater antennas 620D.

Figure 17:
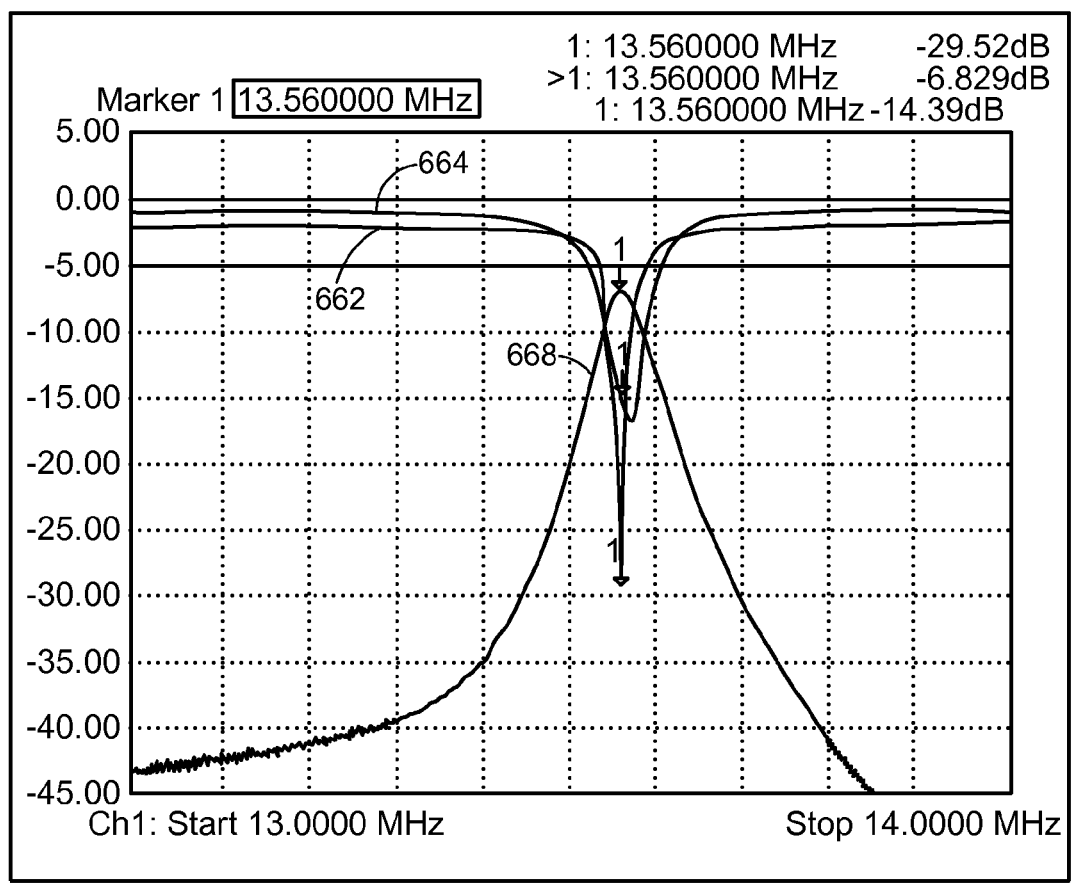
FIG. 17 shows simulation results indicating coupling strength between a transmit antenna, a repeater antenna and a receive antenna.

FIG. 17 shows simulation results indicating coupling strength between a transmit antenna, a repeater antenna and a receive antenna. The transmit antenna, the repeater antenna, and the receive antenna are tuned to have a resonant frequency of about 13.56 MHz.

Curve 662 illustrates a measure for the amount of power transmitted from the transmit antenna out of the total power fed to the transmit antenna at various frequencies. Similarly, curve 664 illustrates a measure for the amount of power received by the receive antenna through the repeater antenna out of the total power available in the vicinity of its terminals at various frequencies. Finally, Curve 668 illustrates the amount of power actually coupled between the transmit antenna, through the repeater antenna and into the receive antenna at various frequencies.

At the peak of curve 668, corresponding to about 13.56 MHz, it can be seen that a large amount of the power sent from the transmitter is available at the receiver, indicating a high degree of coupling between the combination of the transmit antenna, the repeater antenna and the receive antenna.

Figure 18A:
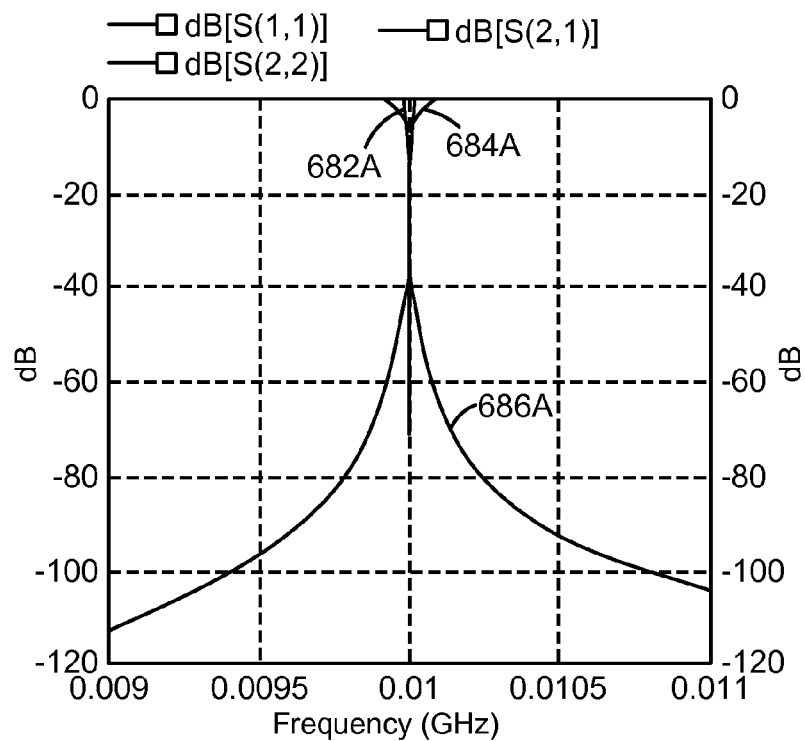
FIG. 18A shows simulation results indicating coupling strength between a transmit antenna and receive antenna with no repeater antennas.

FIG. 18A show simulation results indicating coupling strength between a transmit antenna and receive antenna disposed in a coaxial placement relative to the transmit antenna with no repeater antennas. The transmit antenna and the receive antenna are tuned to have a resonant frequency of about 10 MHz. The transmit antenna in this simulation is about 1.3 meters on a side and the receive antenna is a multi-loop antenna at about 30 mm on a side. The receive antenna is placed at about 2 meters away from the plane of the transmit antenna. Curve 682A illustrates a measure for the amount of power transmitted from the transmit antenna out of the total power fed to its terminals at various frequencies. Similarly, curve 684A illustrates a measure of the amount of power received by the receive antenna out of the total power available in the vicinity of its terminals at various frequencies. Finally, Curve 686A illustrates the amount of power actually coupled between the transmit antenna and the receive antenna at various frequencies.

Figure 18B:
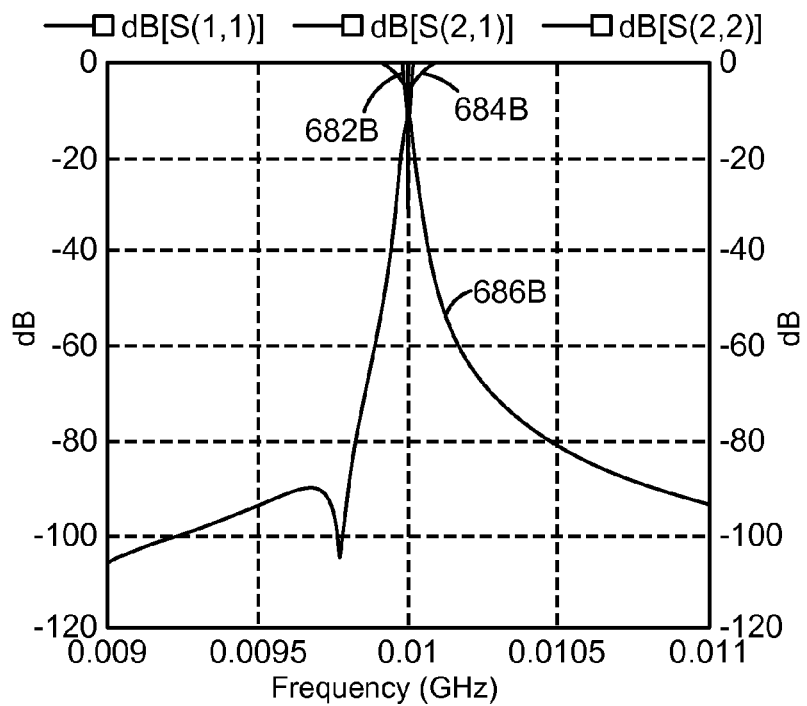
FIG. 18B shows simulation results indicating coupling strength between a transmit antenna and receive antenna with a repeater antenna.

FIG. 18B show simulation results indicating coupling strength between the transmit and receive antennas of FIG. 18A when a repeater antenna is included in the system. The transmit antenna and receive antenna are the same size and placement as in FIG. 18A. The repeater antenna is about 28 cm on a side and placed coplanar with the receive antenna (i.e., about 0.1 meters away from the plane of the transmit antenna). In FIG. 18B, Curve 682B illustrates a measure of the amount of power transmitted from the transmit antenna out of the total power fed to its terminals at various frequencies. Curve 684B illustrates the amount of power received by the receive antenna through the repeater antenna out of the total power available in the vicinity of its terminals at various frequencies. Finally, Curve 686B illustrates the amount of power actually coupled between the transmit antenna, through the repeater antenna and into the receive antenna at various frequencies.

When comparing the coupled power (686A and 686B) from FIGS. 18A and 18B it can be seen that without a repeater antenna the coupled power 686A peaks at about −36 dB. Whereas, with a repeater antenna the coupled power 686B peaks at about −5 dB. Thus, near the resonant frequency, there is a significant increase in the amount of power available to the receive antenna due to the inclusion of a repeater antenna.

Exemplary embodiments of the invention include low cost unobtrusive ways to properly manage how the transmitter radiates to single and multiple devices and device types in order to optimize the efficiency by which the transmitter conveys charging power to the individual devices.

Figure 19:
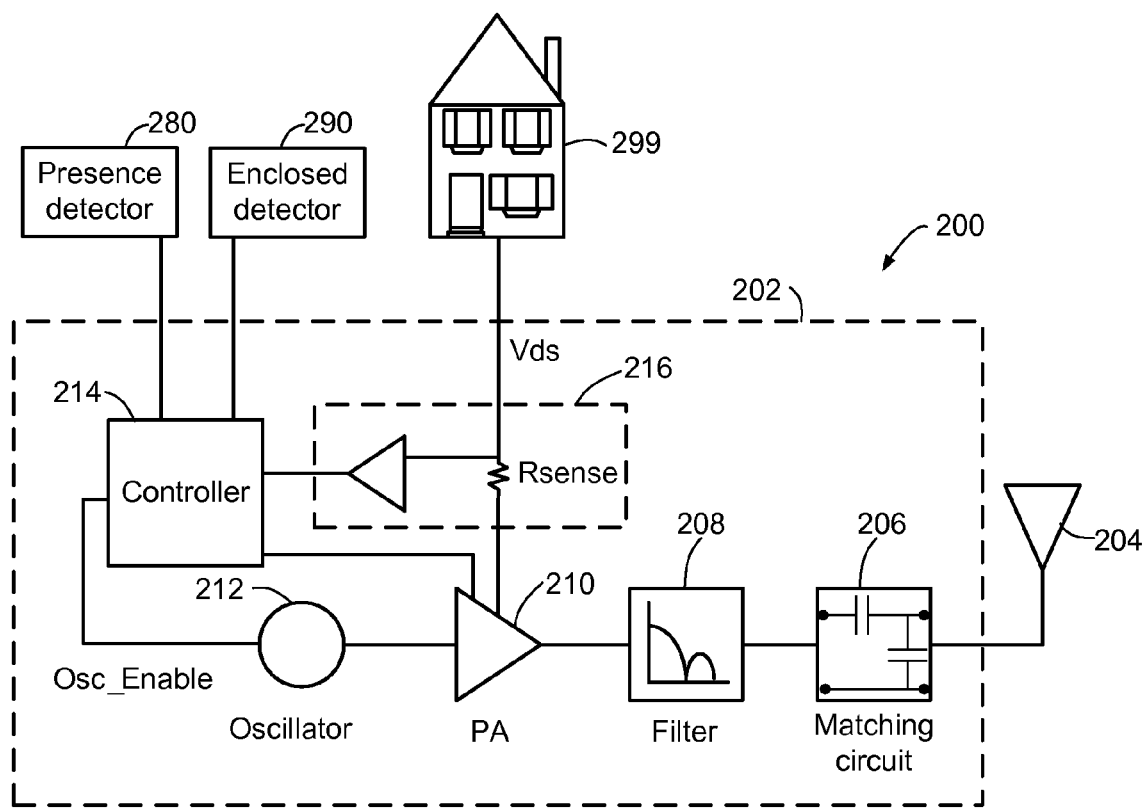
FIG. 19 is a simplified block diagram of a transmitter according to one or more exemplary embodiments of the present invention.

FIG. 19 is a simplified block diagram of a transmitter 200 including a presence detector 280. The transmitter is similar to that of FIG. 10 and, therefore, does not need to be explained again. However, in FIG. 19 the transmitter 200 may include presence detector 280, and enclosed detector 290, or a combination thereof, connected to the controller 214 (also referred to as a processor herein). The controller 214 can adjust an amount of power delivered by the amplifier 210 in response to presence signals from the presence detector 280 and enclosed detector 290. The transmitter may receive power through an AC-DC converter (not shown) to convert conventional AC power 299.

As a non-limiting example, the presence detector 280 may be a motion detector utilized to sense the initial presence of a device to be charged that is inserted into the coverage area of the transmitter. After detection, the transmitter is turned on and the RF power received by the device is used to toggle a switch on the Rx device in a pre-determined manner, which in turn results in changes to the driving point impedance of the transmitter.

As another non-limiting example, the presence detector 280 may be a detector capable of detecting a human, for example, by infrared detection, motion detection, or other suitable means. In some exemplary embodiments, there may be regulations limiting the amount of power that a transmit antenna may transmit at a specific frequency. In some cases, these regulations are meant to protect humans from electromagnetic radiation. However, there may be environments where transmit antennas are placed in areas not occupied by humans, or occupied infrequently by humans, such as, for example, garages, factory floors, shops, and the like. If these environments are free from humans, it may be permissible to increase the power output of the transmit antennas above the normal power restrictions regulations. In other words, the controller 214 may adjust the power output of the transmit antenna 204 to a regulatory level or lower in response to human presence and adjust the power output of the transmit antenna 204 to a level above the regulatory level when a human is outside a regulatory distance from the electromagnetic field of the transmit antenna 204.

In many of the examples below, only one guest device is shown being charged. In practice, a multiplicity of the devices can be charged from a near-field generated by each host.

In exemplary embodiments, a method by which the Tx circuit does not remain on indefinitely may be used. In this case, the Tx circuit may be programmed to shut off after a user-determined amount of time. This feature prevents the Tx circuit, notably the power amplifier, from running long after the wireless devices in its perimeter are fully charged. This event may be due to the failure of the circuit to detect the signal sent from either the repeater or the Rx coil that a device is fully charged. To prevent the Tx circuit from automatically shutting down if another device is placed in its perimeter, the Tx circuit automatic shut off feature may be activated only after a set period of lack of motion detected in its perimeter. The user may be able to determine the inactivity time interval, and change it as desired. As a non-limiting example, the time interval may be longer than that needed to fully charge a specific type of wireless device under the assumption of the device being initially fully discharged.

Exemplary embodiments of the invention include using surfaces as the charging stations or "hosts," housing totally, or partially, the transmit antenna and other circuitry necessary for wireless transfer of power to other often smaller devices, equipment, or machines referred to as "guests." As non-limiting examples, these charging stations or hosts could be a window, a wall, and so on. The charging system, which can be at least partially embedded in the aforementioned examples, may either be a retrofit to existing apparatus, or made as part of its initial design and manufacturing.

Electrically small antennas have low efficiency, often no more than a few percent as explained by the theory of small antennas. The smaller the electric size of an antenna, the lower is its efficiency. The wireless power transfer can become a viable technique replacing wired connection to the electric grid in industrial, commercial, and household applications if power can be sent over meaningful distances to the devices that are in the receiving end of such power transfer system. While this distance is application dependent, a few tens of a centimeter to a few meters can be deemed a suitable range for most applications. Generally, this range reduces the effective frequency for the electric power in the interval between 5 MHz to 100 MHz.

Figure 20:
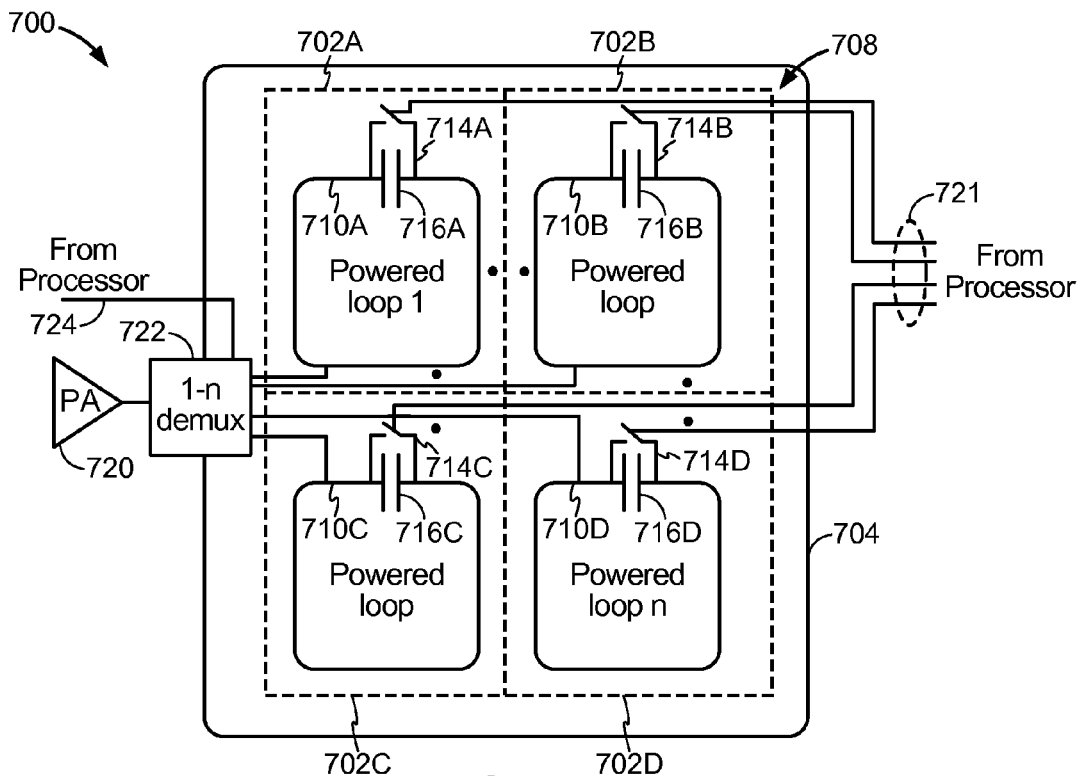
FIG. 20 is a simplified block diagram of an enlarged area wireless charging apparatus, in accordance with an exemplary embodiment of the present invention.
Figure 21:
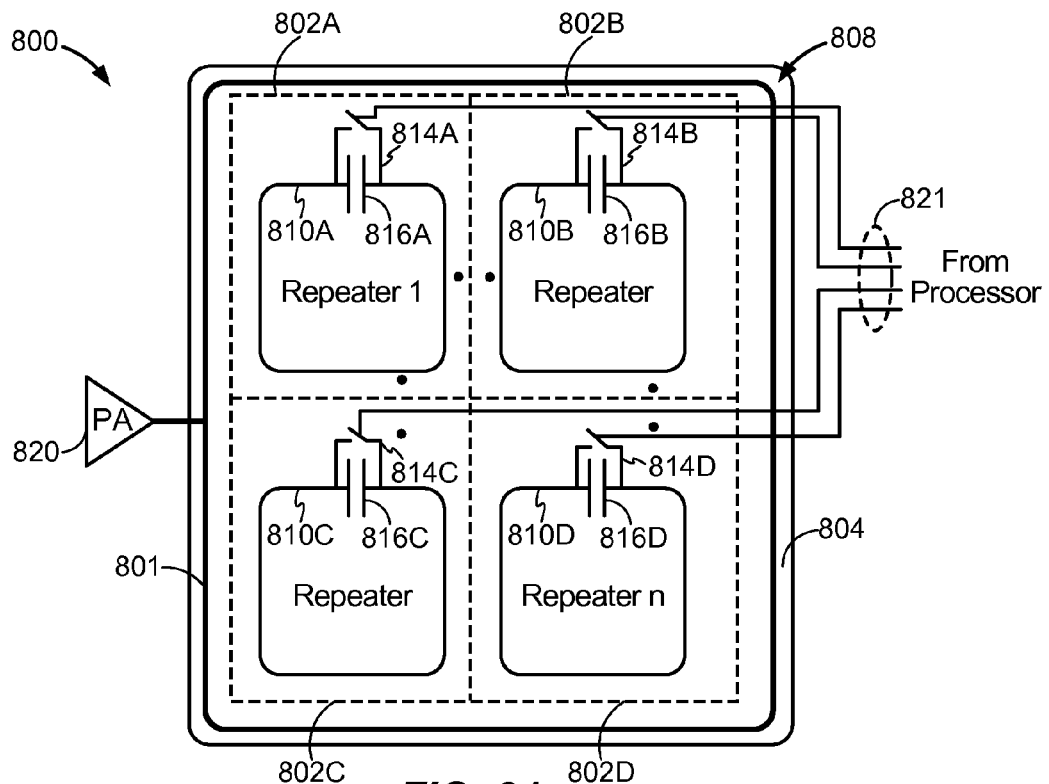
FIG. 21 is a simplified block diagram of an enlarged area wireless charging apparatus, in accordance with another exemplary embodiment of the present invention.

FIGS. 20 and 21 are plan views of block diagrams of an enlarged area wireless charging apparatus, in accordance with exemplary embodiments. As stated, locating a receiver in a near-field coupling mode region of a transmitter for engaging the receiver in wireless charging may be unduly burdensome by requiring accurate positioning of the receiver in the transmit antenna's near-field coupling mode region. Furthermore, locating a receiver in the near-field coupling mode region of a fixed-location transmit antenna may also be inaccessible by a user of a device coupled to the receiver especially when multiple receivers are respectively coupled to multiple user accessible devices (e.g., laptops, PDAs, wireless devices) where users need concurrent physical access to the devices. For example, a single transmit antenna exhibits a finite near-field coupling mode region. Accordingly, a user of a device charging through a receiver in the transmit antenna's near-field coupling mode region may require a considerable user access space that would be prohibitive or at least inconvenient for another user of another device to also wirelessly charge within the same transmit antenna's near-field coupling mode region and also require separate user access space. For example, two adjacent users of wireless chargeable devices seated at a conference table configured with a single transmit antenna may be inconvenienced or prohibited from accessing their respective devices due to the local nature of the transmitters near-field coupling mode region and the considerable user access space required to interact with the respective devices. Additionally, requiring a specific wireless charging device and its user to be specifically located may also inconvenience a user of the device.

Referring to FIG. 20, an exemplary embodiment of an enlarged area wireless charging apparatus 700 provides for placement of a plurality of adjacently located transmit antenna circuits 702A-702D to define an enlarged wireless charging area 708. By way of example and not limitation, a transmit antenna circuit includes a transmit antenna 710 having a diameter or side dimension, for example, of around 30-40 centimeters for providing uniform coupling to an receive antenna (not shown) that is associated with or fits in an electronic device (e.g., wireless device, handset, PDA, laptop, etc.). By considering the transmit antenna circuit 702 as a unit or cell of the enlarged area wireless charging apparatus 700, stacking or adjacently tiling these transmit antenna circuits 702A-702D next to each other on substantially a single planar surface 704 (e.g., on a table top) allows for increasing or enlarging the charging area. The enlarged wireless charging area 708 results in an increased charging region for one or more devices.

The enlarged area wireless charging apparatus 700 further includes a transmit power amplifier 720 for providing the driving signal to transmit antennas 710. In configurations where the near-field coupling mode region of one transmit antenna 710 interferes with the near-field coupling mode regions of other transmit antennas 710, the interfering adjacent transmit antennas 710 are "cloaked" to allow improved wireless charging efficiency of the activated transmit antenna 710.

The sequencing of activation of transmit antennas 710 in enlarged area wireless charging apparatus 700 may occur according to a time-domain based sequence. The output of transmit power amplifier 720 is coupled to a multiplexer 722 which time-multiplexes, according to control signal 724 from the transmitter processor, the output signal from the transmit power amplifier 720 to each of the transmit antennas 710.

In order to inhibit inducing resonance in adjacent inactive transmit antenna 710 when the power amplifier 720 is driving the active transmit antenna, the inactive antennas may be "cloaked" by altering the resonant frequency of that transmit antenna by, for example, activating the cloaking circuit 714. By way of implementation, concurrent operation of directly or nearly adjacent transmit antenna circuits 702 may result in interfering effects between concurrently activated and physically nearby or adjacent other transmit antenna circuits 702. Accordingly, transmit antenna circuit 702 may further include a transmitter cloaking circuit 714 for altering the resonant frequency of transmit antennas 710.

The transmitter cloaking circuit may be configured as a switching means (e.g. a switch) for shorting-out or altering the value of reactive elements, for example capacitor 716, of the transmit antenna 710. The switching means may be controlled by control signals 721 from the transmitter's processor. In operation, one of the transmit antennas 710 is activated and allowed to resonate while other of transmit antennas 710 are inhibited from resonating, and therefore inhibited from adjacently interfering with the activated transmit antenna 710. Accordingly, by shorting-out or altering the capacitance of a transmit antenna 710, the resonant frequency of transmit antenna 710 is altered to prevent resonant coupling from other transmit antennas 710. Other techniques for altering the resonant frequency are also contemplated.

In another exemplary embodiment, each of the transmit antenna circuits 702 can determine the presence or absence of receivers within their respective near-field coupling mode regions with the transmitter processor choosing to activate ones of the transmit antenna circuits 702 when receivers are present and ready for wireless charging or forego activating ones of the transmit antenna circuits 702 when receivers are not present or not ready for wireless charging in the respective near-field coupling mode regions. The detection of present or ready receivers may occur according to the receiver detection signaling protocol described herein or may occur according to physical sensing of receivers such as motion sensing, pressure sensing, image sensing or other sensing techniques for determining the presence of a receiver within a transmit antenna's near-field coupling mode region. Furthermore, preferential activation of one or more transmit antenna circuits by providing an enhanced proportional duty cycle to at least one of the plurality of antenna circuits is also contemplated to be within the scope of the present invention.

Referring to FIG. 21, an exemplary embodiment of an enlarged area wireless charging apparatus 800 provides for placement of a plurality of adjacently located repeater antenna circuits 802A-802D inside of a transmit antenna 801 defining an enlarged wireless charging area 808. Transmit antenna 801, when driven by transmit power amplifier 820, induces resonant coupling to each of the repeater antennas 810A-810D. By way of example and not limitation, a repeater antenna 810 having a diameter or side dimension, for example, of around 30-40 centimeters provides uniform coupling to a receive antenna (not shown) that is associated with or affixed to an electronic device. By considering the repeater antenna circuit 802 as a unit or cell of the enlarged area wireless charging apparatus 800, stacking or adjacently tiling these repeater antenna circuits 802A-802D next to each other on substantially a single planar surface 804 (e.g., on a table top) allows for increasing or enlarging the charging area. The enlarged wireless charging area 808 results in an increased charging space for one or more devices.

The enlarged area wireless charging apparatus 800 includes transmit power amplifier 820 for providing the driving signal to transmit antenna 801. In configurations where the near-field coupling mode region of one repeater antenna 810 interferes with the near-field coupling mode regions of other repeater antennas 810, the interfering adjacent repeater antennas 810 are "cloaked" to allow improved wireless charging efficiency of the activated repeater antenna 810.

The sequencing of activation of repeater antennas 810 in enlarged area wireless charging apparatus 800 may occur according to a time-domain based sequence. The output of transmit power amplifier 820 is generally constantly coupled (except during receiver signaling as described herein) to transmit antenna 801. In the present exemplary embodiment, the repeater antennas 810 are time-multiplexed according to control signals 821 from the transmitter processor. By way of implementation, concurrent operation of directly or nearly adjacent repeater antenna circuits 802 may result in interfering effects between concurrently activated and physically nearby or adjacent other repeater antennas circuits 802. Accordingly, repeater antenna circuit 802 my further include a repeater cloaking circuit 814 for altering the resonant frequency of repeater antennas 810.

The repeater cloaking circuit may be configured as a switching means (e.g. a switch) for shorting-out or altering the value of reactive elements, for example capacitor 816, of the repeater antenna 810. The switching means may be controlled by control signals 821 from the transmitter's processor. In operation, one of the repeater antennas 810 is activated and allowed to resonate while other of repeater antennas 810 are inhibited from resonating, and therefore adjacently interfering with the activated repeater antenna 810. Accordingly, by shorting-out or altering the capacitance of a repeater antenna 810, the resonant frequency of repeater antenna 810 is altered to prevent resonant coupling from other repeater antennas 810. Other techniques for altering the resonant frequency are also contemplated.

In another exemplary embodiment, each of the repeater antenna circuits 802 can determine the presence or absence of receivers within their respective near-field coupling mode regions with the transmitter processor choosing to activate ones of the repeater antenna circuits 802 when receivers are present and ready for wireless charging or forego activating ones of the repeater antenna circuits 802 when receivers are not present or not ready for wireless charging in the respective near-field coupling mode regions. The detection of present or ready receivers may occur according to the receiver detection signaling protocol described herein or may occur according to physical sensing of receivers such as motion sensing, pressure sensing, image sensing or other sensing techniques for determining a receiver to be within a repeater antenna's near-field coupling mode region.

The various exemplary embodiments of the enlarged area wireless charging apparatus 700 and 800 may further include time domain multiplexing of the input signal being coupled to transmit/repeater antennas 710, 810 based upon asymmetrically allocating activation time periods to the transmit/repeater antennas based upon factors such as priority charging of certain receivers, varying quantities of receivers in different antennas' near-field coupling mode regions, power requirements of specific devices coupled to the receivers as well as other factors.

It is known that electrically small antennas have low efficiency, often no more than a few percent as explained by the theory of small antennas, known by those of skill in the art. Generally, the smaller the electric size of an antenna, the lower is its efficiency. Accordingly, wireless power transfer can become a viable technique replacing wired connection to the electric grid in industrial, commercial, and household applications if power can be sent over meaningful distances to the devices that are in the receiving end of such power transfer system. While this distance is application dependent, a few tens of a centimeter to a few meters, for example, can be deemed a suitable range for most applications. Generally, this range reduces the effective frequency for the electric power in the interval, for example, between 5 MHz to 100 MHz.

As stated, efficient transfer of energy between the transmitter and receiver occurs during matched or nearly matched resonance between the transmitter and the receiver. However, even when resonance between the transmitter and receiver are not matched, energy may be transferred at a lower efficiency. Transfer of energy occurs by coupling energy from the near-field of the transmitting antenna to the receiving antenna residing in the neighborhood where this near-field is established rather than propagating the energy from the transmitting antenna into free space.

Exemplary embodiments of the invention include coupling power between two antennas that are in the near-fields of each other. As stated, the near-field is an area around the antenna in which electromagnetic fields exist but may not propagate or radiate away from the antenna. They are typically confined to a volume that is near the physical volume of the antenna. In the exemplary embodiments of the invention, magnetic type antennas such as single and multi-turn loop antennas are used for both transmit (Tx) and receive (Rx) antenna systems since magnetic near-field amplitudes tend to be higher for magnetic type antennas in comparison to the electric near-fields of an electric-type antenna (e.g., a small dipole). This allows for potentially higher coupling between the pair. Furthermore, "electric" antennas (e.g., dipoles and monopoles) or a combination of magnetic and electric antennas is also contemplated.

The Tx antenna can be operated at a frequency that is low enough and with an antenna size that is large enough to achieve good coupling (e.g., >−4 dB) to a small Rx antenna at significantly larger distances than allowed by far field and inductive approaches mentioned earlier. If the Tx antenna is sized correctly, high coupling levels (e.g., −2 to −4 dB) can be achieved when the Rx antenna on a host device is placed within a coupling-mode region (i.e., in the near-field) of the driven Tx loop antenna.

FIGS. 20 and 21 illustrate multiple loops in a charging area that is substantially planar. However, exemplary embodiments of the present invention are not so limited. Three-dimensional spaces with multiple antennas may be used.

Exemplary embodiments of the invention include using an apparatus as a charging stations or "host," housing totally, or partially, transmit antennas and other circuitry necessary for wireless transfer of power to other often smaller devices, equipment, or machines referred to as "guests." These charging stations or hosts could be any apparatus having a plurality of surfaces. As non-limiting examples, these charging stations or hosts could be a toolbox, a bag, a container configured to hold a solution, an autoclave, a cabinet, a chest, and so on. The transmit antennas, which can be at least partially embedded in the aforementioned examples, may either be a retrofit to existing apparatus, or made as part of its initial design and manufacturing.

FIGS. 22A-31 illustrate various exemplary embodiments of charging systems including apparatuses having transmit antennas oriented in multiple directions. Multi-dimensional orientation of transmit antennas may increase the power that can be delivered to one or more receive antennas positioned in various orientations in respect to the multiple dimensions of the transmit antennas. The charging systems may be configured so that any number of the transmit antennas can be used at once to wirelessly transmit power to one or more receive antennas positioned within an apparatus. Although various exemplary embodiments depicted below may illustrate transmit antennas oriented in three planes (i.e., three-dimensional wireless charging), embodiments of the present invention are not so limited. Rather, embodiments of the present invention are directed to multi-dimensional wireless charging, wherein transmit antennas may be oriented in any number of planes.

In the exemplary embodiments described herein, messaging between a receiver and a transmitter may be performed by the techniques described in above with respect to FIGS. 13A-15D. In addition, more sophisticated messaging means may be employed, such as the means described in U.S. patent application Ser. No. 12/249,816, entitled "SIGNALING CHARGING IN WIRELESS POWER ENVIRONMENT" filed on Oct. 10, 2008, the contents of which is hereby incorporated herein in its entirety by reference.

Figure 22A:
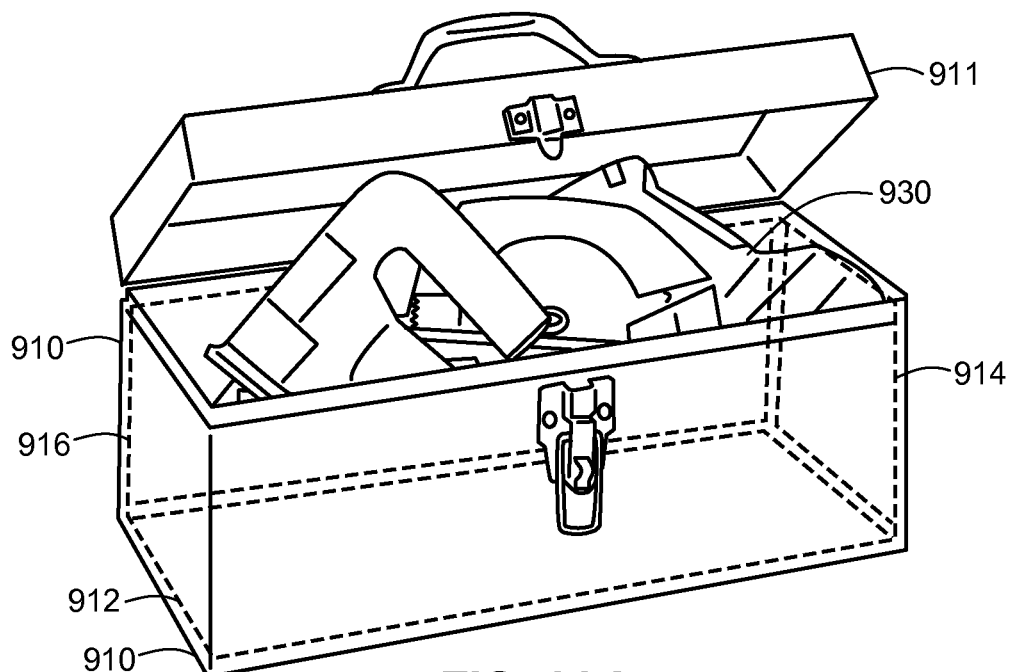
FIGS. 22A and 22B illustrate a charging system including a plurality of transmit antennas coupled to a charging apparatus and oriented in multiple planes, according to an exemplary embodiment of the present invention.
Figure 22B:
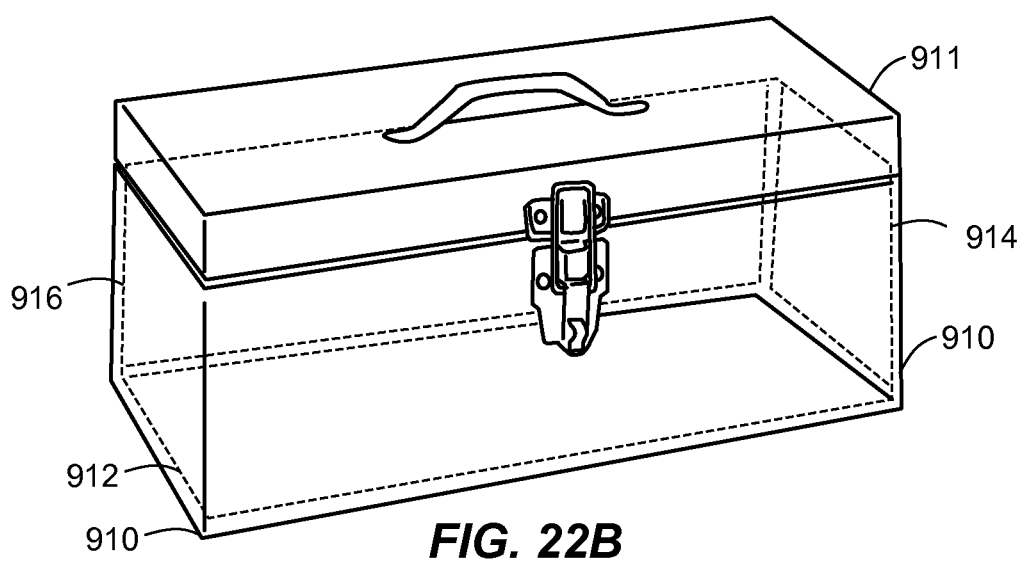

With reference to FIGS. 22A and 22B, a multi-dimensional wireless charging apparatus 910 is shown in which a plurality of transmit antennas (i.e., transmit antenna 912, transmit antenna 914, and transmit antenna 916) are coupled to surfaces along a plurality of axes. FIG. 22A illustrates apparatus 910 with a lid 911 open to show a plurality of chargeable devices 930 disposed therein. FIG. 22B illustrates apparatus 910 with lid 911 closed. It is noted that transmit antenna 912, transmit antenna 914, and transmit antenna 916 may each be coupled to apparatus 910 in a manner so as to prevent the antennas from being shorted by a material of apparatus 910, its contents, or any combination thereof. As an example, each of transmit antenna 912, transmit antenna 914, and transmit antenna 916 may be coated with an insulating material and attached to a surface of apparatus 910. Furthermore, for example only, apparatus 910 may comprise a non-conductive material.

As illustrated in each of FIG. 22A and FIG. 22B, wireless charging apparatus 910 includes transmit antennas coupled to three sides. Specifically, a first-orientation transmit antenna 912 is coupled to a bottom of apparatus 910. A second-orientation transmit antenna 914 is coupled to a first side of apparatus 910 and a third-orientation transmit antenna 916 is coupled to a second side of apparatus 910 and is substantially orthogonal to the first-orientation transmit antenna 912. Any one of the three transmit antennas, any pair of them, or all three at once can be used to wirelessly provide power to one or more receive antennas positioned within apparatus 910 and coupled to a chargeable device. A means such as that discussed above with respect to FIGS. 20 and 21 may be used for selecting and multiplexing between the differently oriented transmit antennas.

Figure 23A:
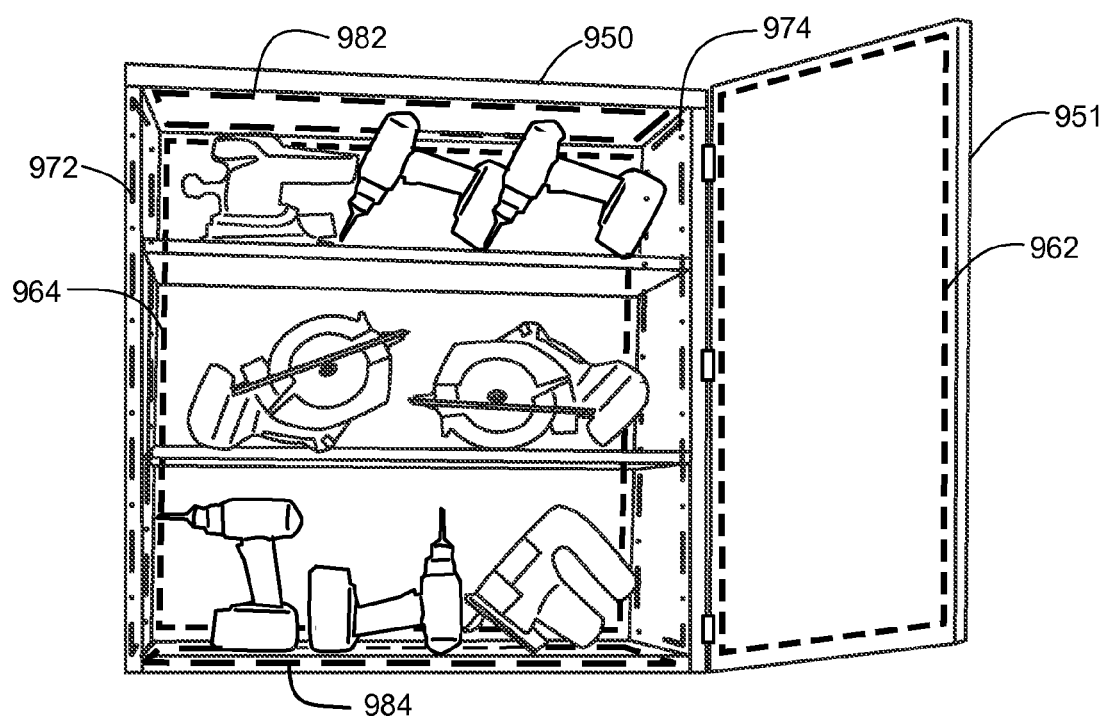
FIGS. 23A and 23B illustrate another charging system including a plurality of transmit antennas coupled to a chargeable apparatus and oriented in multiple planes, according to an exemplary embodiment of the present invention.
Figure 23B:
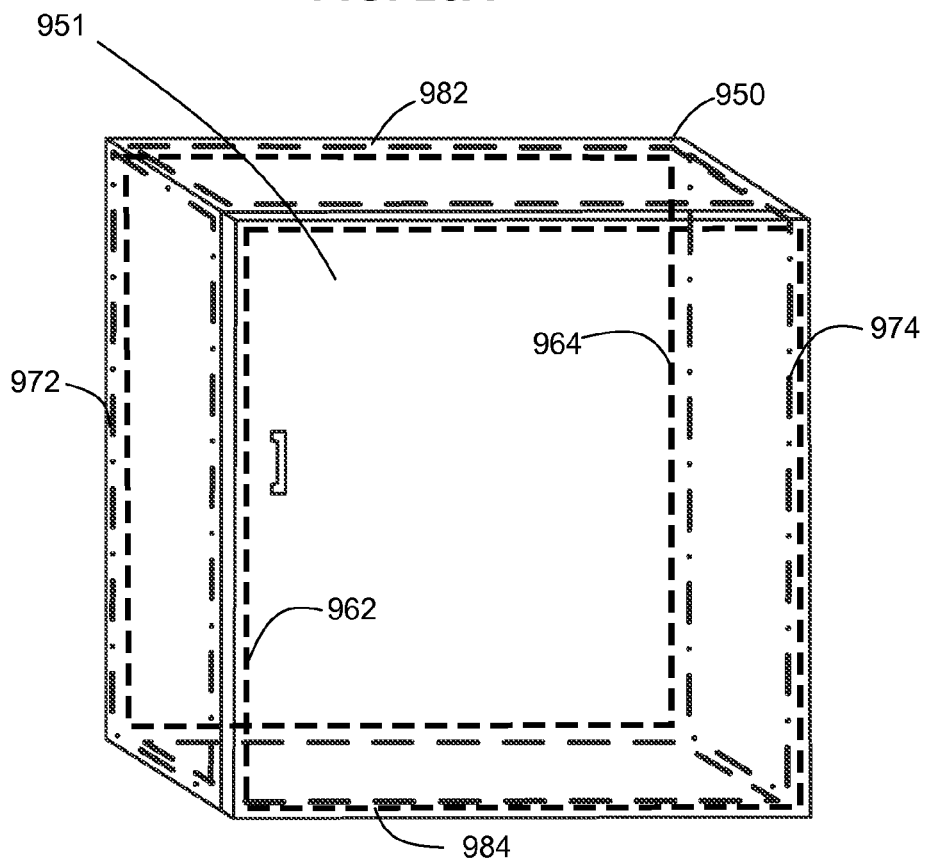

FIGS. 23A and 23B illustrate an exemplary embodiment of a cabinet 950 bearing transmit antennas oriented in multiple directions with transmit antennas in opposite panels. FIG. 23A shows cabinet 950 with an open door 951 and FIG. 23B shows cabinet 950 with door 951 closed. Transmit antennas 972 and 974 are on opposing sides (i.e., the left and the right respectively) of cabinet 950. Transmit antennas 962 and 964 are on opposing sides (i.e., the door and the back respectively) of cabinet 950. Transmit antennas 982 and 984 are on opposing sides (i.e., the top and the bottom respectively) of the cabinet 950. It is noted that for an apparatus having differing surface lengths (e.g., a rectangular apparatus), different sizes of transmit antennas may be compensated for by respective variations in tank capacitors, as will be understood by a person having ordinary skill in the art. Further, it is noted that each transmit antenna may be coupled to cabinet 950 in a manner so as to prevent the transmit antennas from being shorted by a material of apparatus cabinet 950, its contents, or any combination thereof. As an example, each may be coated with an insulating material and attached to a surface of cabinet 950. Furthermore, for example only, cabinet 950 may comprise a non-conductive material.

Figure 24:
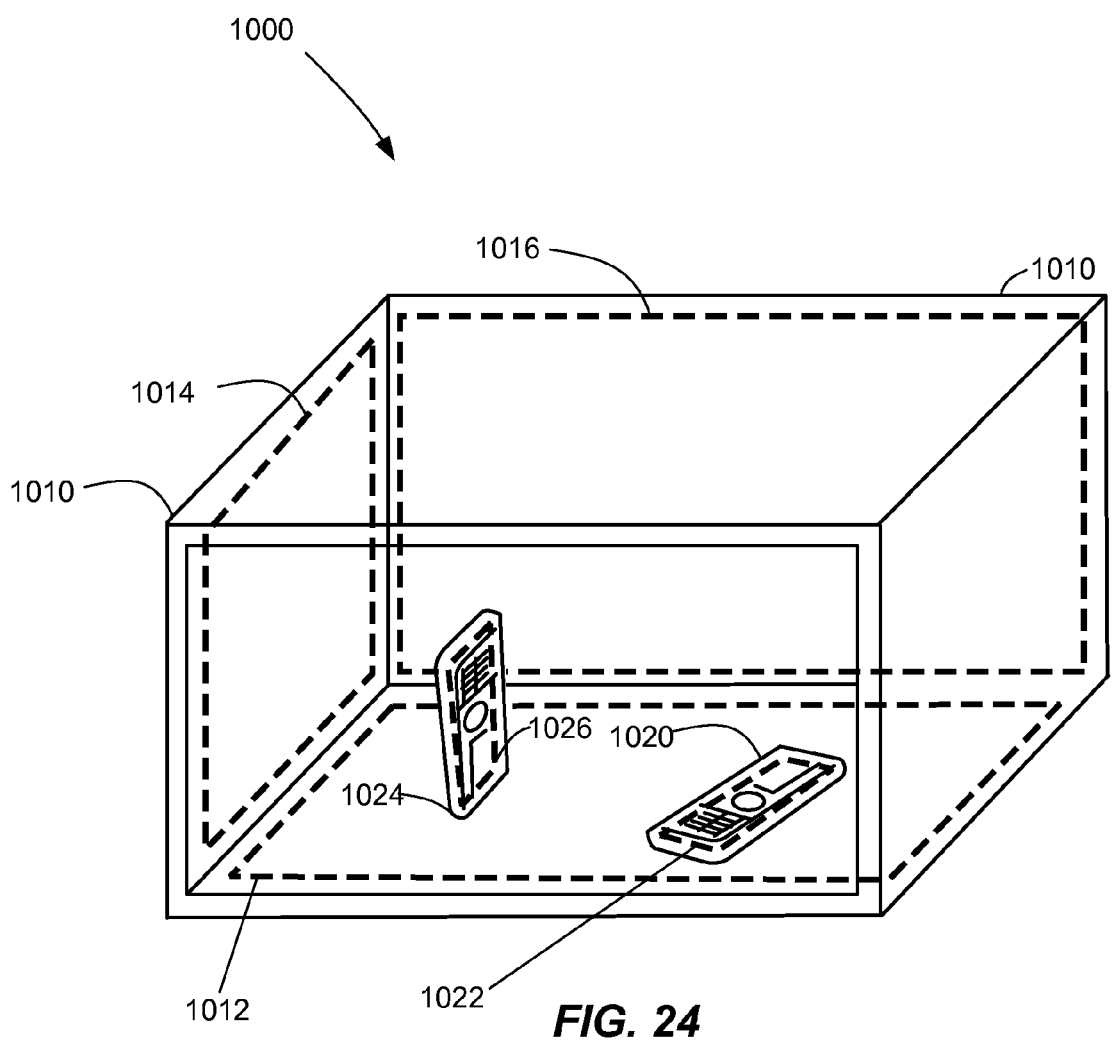
FIG. 24 illustrates a charging system including a plurality of transmit antennas oriented in multiple planes, according to an exemplary embodiment of the present invention.
Figure 25:
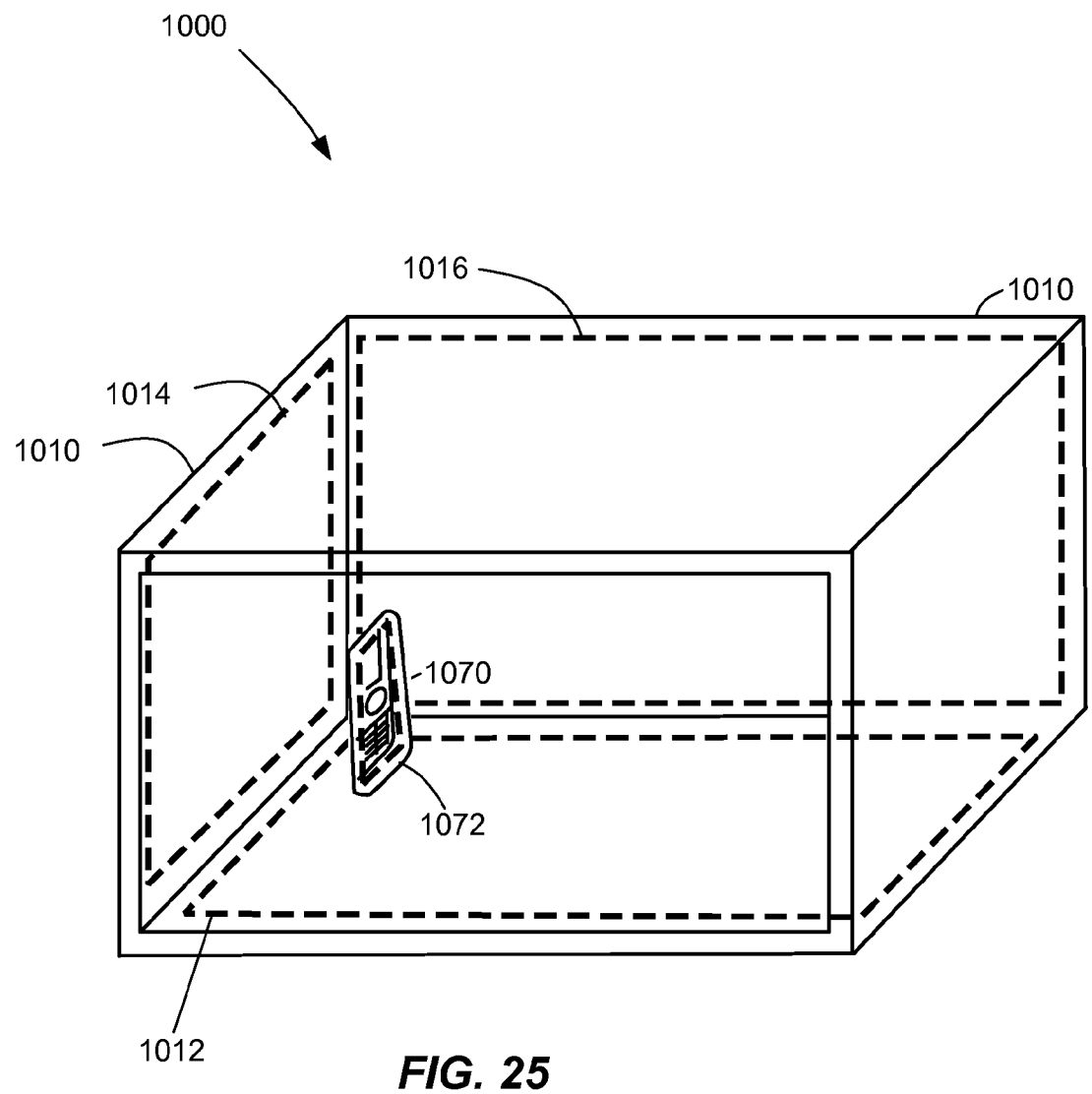
FIG. 25 illustrates another charging system including a plurality of transmit antennas oriented in multiple planes, according to an exemplary embodiment of the present invention.
Figure 26:
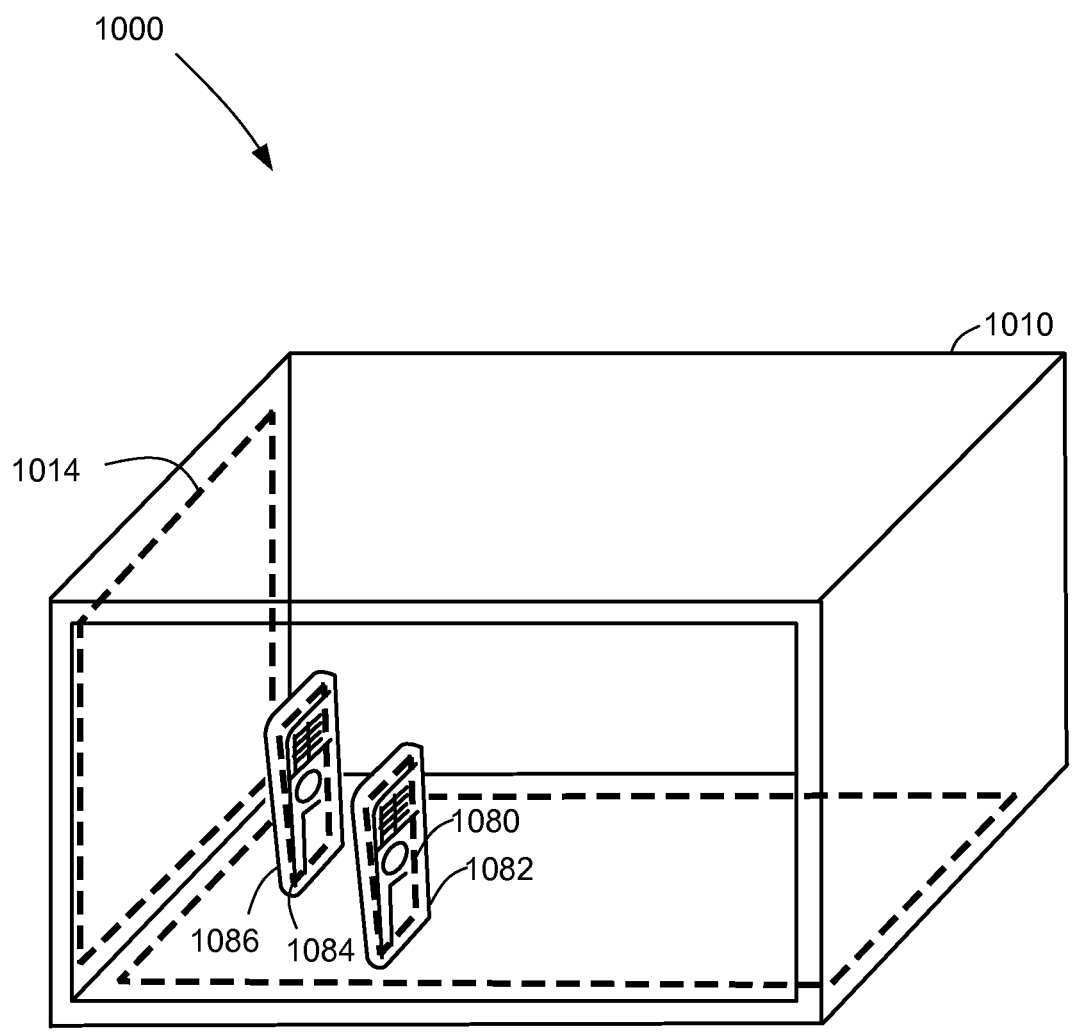
FIG. 26 illustrates another charging system including a plurality of transmit antennas oriented in multiple planes, according to an exemplary embodiment of the present invention.

FIG. 24 illustrates a charging system 1000, in accordance with an exemplary embodiment of the present invention. Charging system 1000 includes a charging apparatus 1010 having transmit antennas 1012, 1014, and 1016 oriented in multiple directions. As mentioned above, charging apparatus 1010 may comprise any apparatus having a plurality of surfaces, such as, for example only, a toolbox, a bag, or a cabinet. As depicted, a plurality of chargeable devices 1020 and 1024 having respective receive antennas 1022 and 1026 coupled thereto are positioned within charging apparatus 1010. Although charging system 1000 includes three transmit antennas coupled to charging apparatus 1010 and two chargeable devices positioned therein, embodiments of the present invention are not so limited. Rather, a charging system including a charging apparatus having any number of transmit antennas coupled thereto and any number of chargeable devices positioned therein is within the scope of the present invention.

According to one exemplary embodiment of the present invention, a charging system having a plurality of transmit antennas oriented in multiple planes may be configured to sequentially transmit power from each transmit antenna. More specifically, the charging system may be configured to sequentially transmit power from each transmit antenna in either a random or a predetermined order continuously until either each chargeable device within the charging apparatus is fully charged or until each chargeable device has been removed from the charging apparatus. As an example, with reference to FIG. 24, charging system 1000 may be configured to transmit power from transmit antenna 1012 for a first time duration, transmit power from transmit antenna 1014 for a second time duration, and transmit power from transmit antenna 1016 for a third time duration. This process may be repeated indefinitely until each of chargeable device 1020 and chargeable device 1024 are fully charged or until each of chargeable device 1020 and chargeable device 1024 are removed from charging apparatus 1010. Stated another way, this process may be repeated so long as charging apparatus 1010 includes at least one chargeable device therein and at least one chargeable device therein requires charging. It is noted that the first time duration, the second time duration, and the third time duration may be substantially equal to one another, or the time durations may vary in any suitable manner.

According to another exemplary embodiment of the present invention, a charging system may be configured to determine an optimal selection of one or more transmit antennas for charging each chargeable device positioned within an associated charging apparatus. More specifically, in the example illustrated in FIG. 24, charging system 1000 may be configured to define, for each of receive antenna 1026 and receive antenna 1022, an optimal selection of either a single transmit antenna (i.e., transmit antenna 1012, transmit antenna 1014, or transmit antenna 1016) or any possible combination of transmit antennas (i.e., transmit antenna 1012 and transmit antenna 1014, transmit antenna 1012 and transmit antenna 1014, transmit antenna 1014 and transmit antenna 1016, or transmit antenna 1012, transmit antenna 1014, and transmit antenna 1016) that may lead to the highest power received by the receive antenna and an associated chargeable device. In determining whether a plurality (i.e., a combination) of transmit antennas provides optimal charging for a chargeable device, power levels of each of the plurality of transmit antennas may be varied to further establish an optimal amount of power received by a chargeable device from the combination of transmit antennas. A method of determining an optimal selection of one or more transmit antennas for charging a chargeable device may also be referred to herein as a "single device calibration process."

A method of determining an optimal selection of one or more transmit antennas for charging a chargeable device (i.e., a single device calibration process), in accordance with an exemplary embodiment of the present invention, will now be described. After identification of a receive antenna coupled to a chargeable device and positioned within a charging apparatus, an associated charging system may be configured to sequentially transmit power to the receive antenna from each transmit antenna coupled to the charging apparatus. Furthermore, the charging system may be configured to sequentially transmit power to the receive antenna from each possible combination of transmit antennas. As noted above, during transmission of power to a receive antenna from a combination of transmit antennas, power levels of the transmit antennas may be varied to further determine an optimal amount of power received by a receive antenna from a combination of transmit antennas.

After sequentially transmitting power to the receive antenna from each transmit antenna individually and each possible combination of transmit antennas, the charging system may be configured to determine which one or more transmit antennas provide optimal charging for the chargeable device that is coupled to the receive antenna. It is noted that during a calibration process of a receive antenna and an associated chargeable device positioned within a charging apparatus, one or more other receive antennas positioned within the charging apparatus may be "cloaked" to prevent coupling between the one or more other receive antennas and any other receive or transmit antennas coupled to or within an associated charging apparatus.

With reference to FIG. 24, an example of a single device calibration process will now be described. After identification of receive antenna 1022, receive antenna 1026 may be "cloaked" to prevent coupling between either receive antenna 1026 and any transmit antenna (i.e., transmit antennas 1012, 1014, or 1016) or receive antenna 1026 and receive antenna 1022. Transmit antenna 1012 may then transmit power to receive antenna 1022 and an amount of power received by receive antenna 1022 may be determined. Thereafter, transmit antenna 1014 may transmit power to receive antenna 1022 and an amount of power received by receive antenna 1022 may be determined. Subsequently, transmit antenna 1016 may transmit power to receive antenna 1022 and an amount of power received by receive antenna 1022 may be determined.

Furthermore, after each individual transmit antenna sequentially transmits power to receive antenna 1022, transmit antenna 1012 and transmit antenna 1014 may simultaneously transmit power to receive antenna 1022 and an amount of power received by receive antenna 1022 may be determined. During transmission of power from transmit antenna 1012 and transmit antenna 1014, power levels of each of transmit antenna 1012 and transmit antenna 1014 may be varied to determine an optimal amount of power received by receive antenna 1022 from the combination of transmit antenna 1012 and transmit antenna 1014. Transmit antenna 1012 and transmit antenna 1016 may then simultaneously transmit power to receive antenna 1022 and an amount of power received by receive antenna 1022 may be determined. During transmission of power from transmit antenna 1012 and transmit antenna 1016, power levels of each of transmit antenna 1012 and transmit antenna 1016 may be varied to determine an optimal amount of power received by receive antenna 1022 from the combination of transmit antenna 1012 and transmit antenna 1016. Subsequently, transmit antenna 1014 and transmit antenna 1016 may simultaneously transmit power to receive antenna 1022 and an amount of power received by receive antenna 1022 may be determined. During transmission of power from transmit antenna 1014 and transmit antenna 1016, power levels of each of transmit antenna 1014 and transmit antenna 1016 may be varied to determine an optimal amount of power received by receive antenna 1022 from the combination of transmit antenna 1014 and transmit antenna 1016.

Additionally, transmit antenna 1014, transmit antenna 1016, and transmit antenna 1012 may simultaneously transmit power to receive antenna 1022 and an amount of power received by receive antenna 1022 may be determined. During transmission of power from transmit antenna 1012, transmit antenna 1014, and transmit antenna 1016, power levels of each of transmit antenna 1012, transmit antenna 1014, and transmit antenna 1016 may be varied to determine an optimal amount of power received by receive antenna 1022 from the combination of transmit antenna 1012, transmit antenna 1014, and transmit antenna 1016. It is noted that an amount of power received by receive antenna 1022 may be determined by any known and suitable method. For example, according to one exemplary embodiment, one or more transmit antennas may sense an amount of power received by receive antenna 1022 by sensing an impedance between the one or more transmit antennas and receive antenna 1022. According to another exemplary embodiment, upon receipt of power from one or more transmit antennas, receive antenna 1022 may be configured to convey a signal back to the one or more transmit antennas indicative of an amount of power received.

After sequentially receiving power from each transmit antenna and each possible combination of transmit antennas at various power levels, charging system 1000 may be configured to determine which one or more transmit antennas provide optimal charging for chargeable device 1020, which is coupled to receive antenna 1022. Furthermore, as noted above, this calibration process may be repeated for each identified receive antenna positioned within apparatus 1010. Accordingly, after performing a calibration process for chargeable device 1020, charging system 1000 may be configured to perform another calibration process to determine an optimal selection of one or more transmit antennas for chargeable device 1024. In this example, due to the parallel nature of the orientations, it may be determined that transmit antenna 1014 provides optimal charging for chargeable device 1024 and transmit antenna 1012 provides optimal charging for chargeable device 1020. Furthermore, because a chargeable device and its associated receive antenna may change positions within a charging apparatus, charging system 1000 may be configured to repeat a calibration process periodically for each chargeable device, upon detection of a change in an amount of power received by a receive antenna and an associated chargeable device, or any combination thereof.

In addition to defining an optimal selection of one or more transmit antennas for charging each chargeable device positioned within charging apparatus 1010, charging system 1000 may be configured to define an optimal selection of one or more transmit antennas for concurrently charging a plurality of chargeable devices positioned within charging apparatus 1010. More specifically, with reference to FIG. 24, charging system 100 may be configured to define an optimal selection of either a single transmit antenna (i.e., transmit antenna 1012, transmit antenna 1014, or transmit antenna 1016) or any possible combination of transmit antennas (i.e., transmit antenna 1012 and transmit antenna 1014, transmit antenna 1012 and transmit antenna 1014, transmit antenna 1014 and transmit antenna 1016, or transmit antenna 1012, transmit antenna 1014, and transmit antenna 1016) that may lead to the highest total power received by both receive antenna 1026 and receive antenna 1022. In determining whether a plurality (i.e., a combination) of transmit antennas provides optimal charging for a plurality of chargeable devices, power levels of each of the plurality of transmit antennas may be varied to further establish an optimal total amount of power received by the chargeable devices from the combination of transmit antennas. A method of determining an optimal selection of one or more transmit antennas for charging a plurality of chargeable devices may also be referred to herein as a "multiple device calibration process."

A method of determining an optimal selection of one or more transmit antennas for charging a plurality of chargeable devices (i.e., a multiple device calibration process), in accordance with an exemplary embodiment of the present invention, will now be described. After identification of a plurality of receive antennas, each coupled to a chargeable device, an associated charging system may be configured to sequentially transmit power to the receive antennas from each transmit antenna coupled to the charging apparatus. Furthermore, the charging system may be configured to sequentially transmit power to the receive antennas from each possible combination of transmit antennas. As noted above, during transmission of power to a plurality of receive antennas from a combination of transmit antennas, power levels of the transmit antennas may be varied to further determine an optimal total amount of power received by the receive antennas from a combination of transmit antennas. After sequentially transmitting power to the receive antennas from each transmit antenna individually and each possible combination of transmit antennas at various power levels, the charging system may be configured to determine which one or more transmit antennas provide optimal charging for the plurality of chargeable devices, which are each coupled to a receive antenna.

With reference to FIG. 24, an example of a multiple device calibration process will now be described. After identification of receive antenna 1022 and receive antenna 1026, transmit antenna 1012 may transmit power to receive antenna 1022 and receive antenna 1026 and a total amount of power received by receive antenna 1022 and receive antenna 1026 may be determined. Thereafter, transmit antenna 1014 may transmit power to receive antenna 1022 and receive antenna 1026 and a total amount of power received by receive antenna 1022 and receive antenna 1026 may be determined. Subsequently, transmit antenna 1016 may transmit power to receive antenna 1022 and receive antenna 1026 and a total amount of power received by receive antenna 1022 and receive antenna 1026 may be determined.

Furthermore, after each individual transmit antenna sequentially transmits power to receive antenna 1022 and receive antenna 1026, transmit antenna 1012 and transmit antenna 1014 may simultaneously transmit power to receive antenna 1022 and receive antenna 1026 and a total amount of power received by receive antenna 1022 and receive antenna 1026 may be determined. During transmission of power from transmit antenna 1012 and transmit antenna 1014, power levels of each of transmit antenna 1012 and transmit antenna 1014 may be varied to determine an optimal total amount of power received by receive antenna 1022 and receive antenna 1026 from the combination of transmit antenna 1012 and transmit antenna 1014. Transmit antenna 1012 and transmit antenna 1016 may then simultaneously transmit power to receive antenna 1022 and receive antenna 1026 and a total amount of power received by receive antenna 1022 and receive antenna 1026 may be determined. During transmission of power from transmit antenna 1012 and transmit antenna 1016, power levels of each of transmit antenna 1012 and transmit antenna 1016 may be varied to determine an optimal total amount of power received by receive antenna 1022 and receive antenna 1026 from the combination of transmit antenna 1012 and transmit antenna 1016. Subsequently, transmit antenna 1014 and transmit antenna 1016 may simultaneously transmit power to receive antenna 1022 and receive antenna 1026 and a total amount of power received by receive antenna 1022 and receive antenna 1026 may be determined. During transmission of power from transmit antenna 1014 and transmit antenna 1016, power levels of each of transmit antenna 1014 and transmit antenna 1016 may be varied to determine an optimal total amount of power received by receive antenna 1022 and receive antenna 1026 from the combination of transmit antenna 1014 and transmit antenna 1016.

Additionally, transmit antenna 1014, transmit antenna 1016, and transmit antenna 1012 may simultaneously transmit power to receive antenna 1022 and receive antenna 1026 and a total amount of power received by receive antenna 1022 and receive antenna 1026 may be determined. During transmission of power from transmit antenna 1012, transmit antenna 1014, and transmit antenna 1016, power levels of each of transmit antenna 1012, transmit antenna 1014, and transmit antenna 1016 may be varied to determine an optimal total amount of power received by receive antenna 1022 and receive antenna 1026 from the combination of transmit antenna 1012, transmit antenna 1014, and transmit antenna 1016. It is noted that a total amount of power received by receive antenna 1022 and receive antenna 1026 may be determined by any known and suitable method. For example, according to one exemplary embodiment, one or more transmit antennas may sense an amount of power received by receive antenna 1022 and receive antenna 1026 by sensing an impedance between the one or more transmit antennas and the receive antennas 1022 and 1026. According to another exemplary embodiment, upon receipt of power from one or more transmit antennas, receive antenna 1022 and receive antenna 1026 may be configured to convey a signal back to the one or more transmit antennas indicative of an amount of power received.

After sequentially receiving power from each transmit antenna and each possible combination of transmit antennas at various power levels, charging system 1000 may be configured to determine which one or more transmit antennas provide optimal charging for chargeable device 1020, which is coupled to receive antenna 1022, and chargeable device 1024, which is coupled to receive antenna 1026. Furthermore, because chargeable devices and their associated receive antennas may change positions within a charging apparatus, charging system 1000 may be configured to repeat a calibration process periodically, upon detection of a change in an amount of power received by a receive antenna and an associated chargeable device, or any combination thereof.

In accordance with various exemplary embodiments of the present invention and, as described more fully below, charging system 1000 may be configured to charge one or more chargeable devices simultaneously with one or more transmit antennas, charge one or more chargeable devices independently of one or more other chargeable devices in accordance with assigned time periods, or any suitable combination thereof.

Due to the inherent isolation between transmit antennas oriented in differing planes, it may be possible to simultaneously charge one or more chargeable devices with two or more transmit antennas. For example, with continued reference to FIG. 24, transmit antenna 1014 may transmit power to receive antenna 1026, which is substantially parallel to transmit antenna 1014. Furthermore, transmit antenna 1012, which is substantially parallel to receive antenna 1022 and substantially perpendicular to transmit antenna 1014, may simultaneously transmit power to receive antenna 1022. It is noted that an amount of power transmitted from one or more transmit antennas (e.g., transmit antenna 1012 and/or transmit antenna 1014) may be adjusted to further optimize an amount of power received by one or more receive antennas (e.g., receive antenna 1022 or receive antenna 1026). For example, if chargeable device 1024 requires more power than chargeable device 1020, during simultaneous charging of chargeable device 1020 and chargeable device 1024, an amount of power transmitted from transmit antenna 1014 may be increased and an amount of power transmitted from transmit antenna 1012 may be decreased.

According to another exemplary embodiment, a charging system may be configured to simultaneously transmit power from two or more transmit antennas to a receive antenna coupled to a chargeable device. For example, with reference to FIG. 25, a receive antenna 1070 that is coupled to a chargeable device 1072 may be oriented in a manner within charging apparatus 1010 so as optimal charging may be provided by simultaneously transmitting power from each of transmit antenna 1012 and transmit antenna 1016. Further, an amount of power transmitted from one or more transmit antennas (e.g., transmit antenna 1012 and/or transmit antenna 1014) may be adjusted to further optimize an amount of power received by a receive antenna (e.g., receive antenna 1070). For example, an amount of power transmitted by transmit antenna 1012 may be increased and an amount of power transmitted by transmit antenna 1014 may be decreased to optimize an amount of power received by receive antenna 1070. It is noted that enabling an amount power transmitted from one or more transmit antennas to be adjusted may allow for reduction of efficiency losses due to the polarization mismatch between the one or more transmit antennas and an arbitrarily placed receive antenna.

It is further noted that in various exemplary embodiments, the frequency of operations may be sufficiently low such the reasonably-sized, adjacent transmit antennas are within the near-field regions of each other. This may allow for higher coupling levels (−1.5 to −3 dB) than would be possible if the antennas were spaced farther apart. Further, electromagnetic fields radiated by substantially orthogonal and adjacent transmit antennas may be orthogonally polarized, which may improve the isolation between the adjacent antennas and, thus power lost due to unwanted coupling may be reduced.

Figure 27:
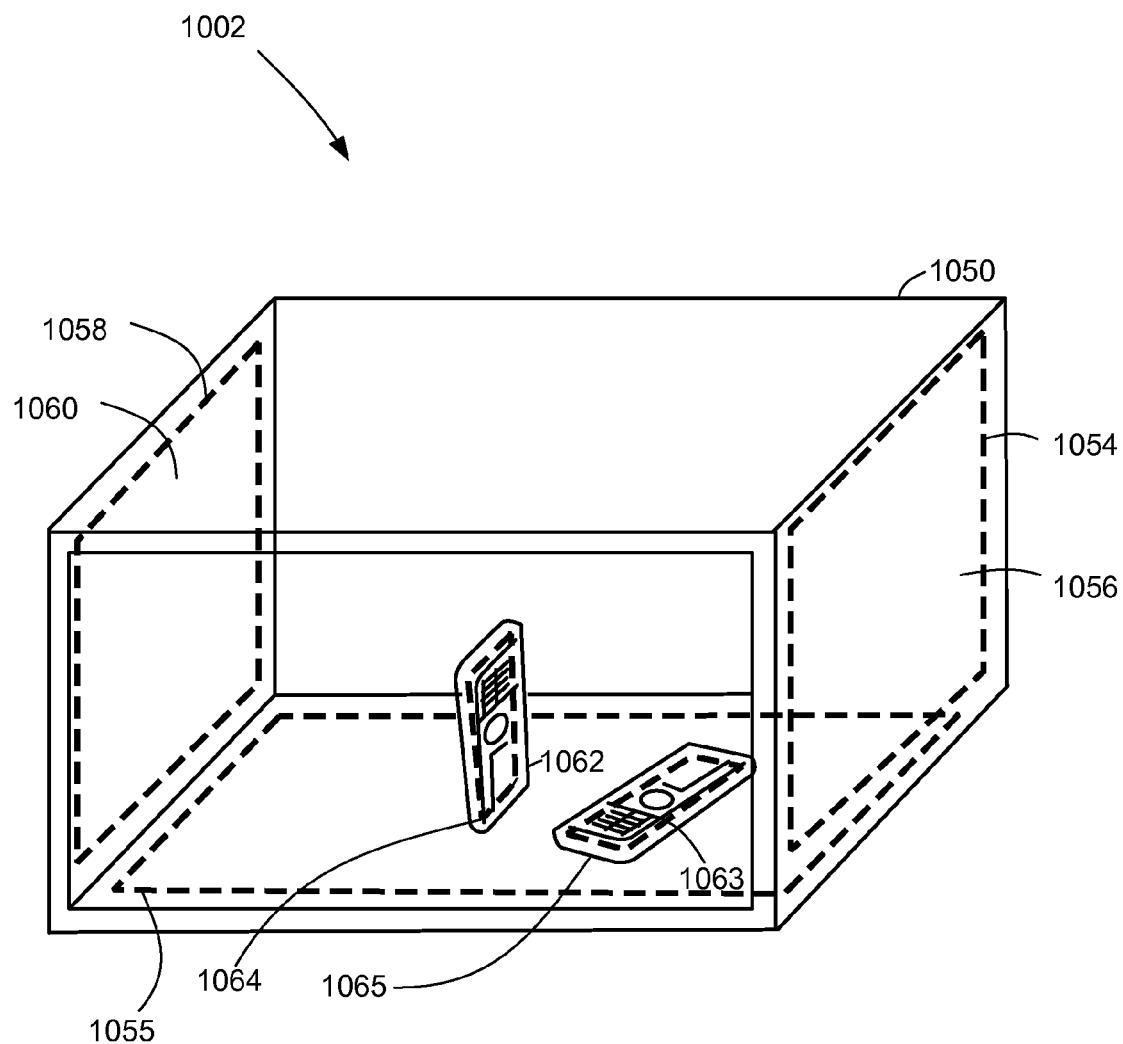
FIG. 27 illustrates yet another charging system including a plurality of transmit antennas oriented in multiple planes, according to an exemplary embodiment of the present invention.
Figure 28:
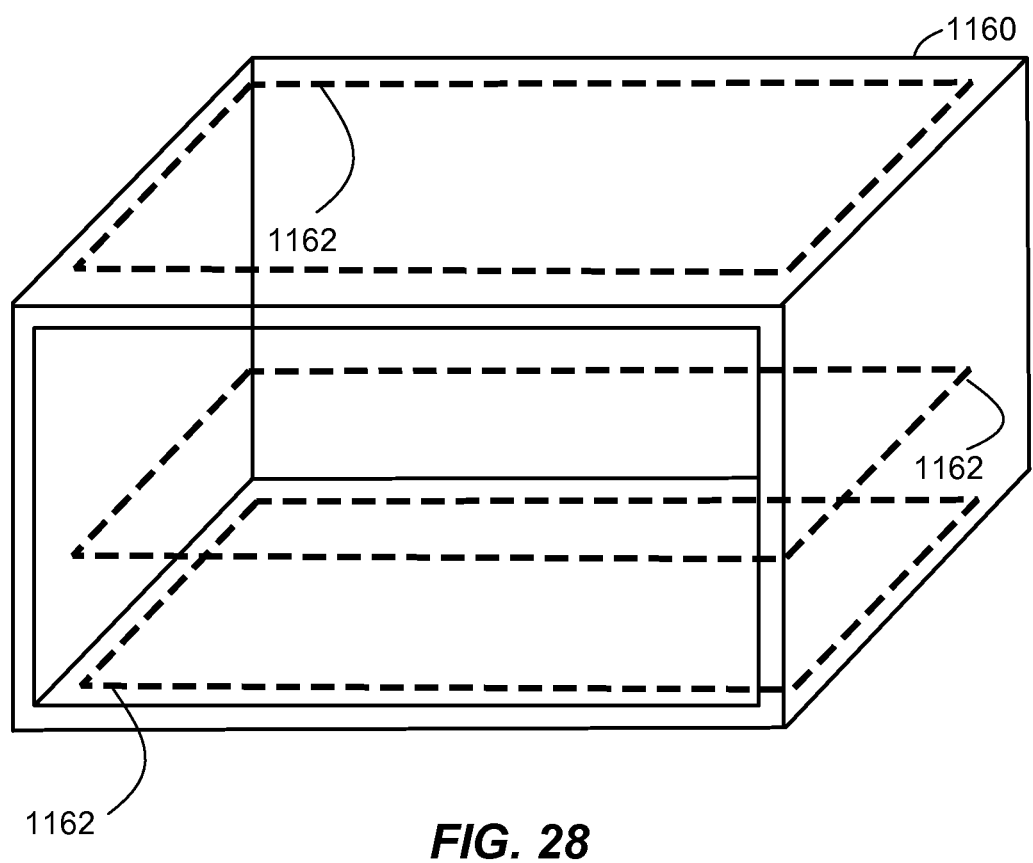
FIG. 28 illustrates another charging system including a plurality of parallel transmit antennas, according to an exemplary embodiment of the present invention.

In a relatively small wireless charging apparatus, only one transmit antenna in each dimension may be required. On the other hand, a relatively large wireless charging apparatus may include parallel surfaces that are sufficiently spaced from one another so as to prevent interference between the transmit antennas respectively coupled thereto. In this case, a transmit antenna may be embedded in each of the parallel surface so that one or more chargeable devices positioned between the parallel surfaces and in proper alignment may receive power from both transmit antennas. For example, with reference to FIG. 27, a charging system 1002 comprises a charging apparatus 1050 including a first transmit antenna 1054 embedded in a first surface 1056 and a second transmit antenna 1058 embedded in a second surface 1060, wherein second surface 1060 is substantially parallel to and sufficiently spaced from first surface 1056 so as to avoid interference between the transmit antennas coupled thereto. Accordingly, a receive antenna 1062 coupled to a chargeable device 1064 may simultaneously receive wireless power from each of transmit antenna 1054 and transmit antenna 1058. Although FIG. 27 depicts only two parallel antennas, embodiments of the present invention are not so limited. Rather, a charging system may include any number of parallel antennas, wherein the parallel antennas may be configured to simultaneously transmit power to one or more chargeable devices, independently transmit power to one or more chargeable devices, or any combination thereof. For example, with reference to FIG. 28, a charging apparatus 1160 having a plurality of parallel transmit antennas 1162 is depicted.

Furthermore, in accordance with another exemplary embodiment, a charging system may be configured to simultaneously transmit power from one transmit antenna to a plurality of chargeable devices. For example, with reference to FIG. 26, power transmitted by transmit antenna 1014 may be received by each of a receive antenna 1080 and a receive antenna 1084, each of which is substantially parallel with transmit antenna 1014.

Moreover, for a charging apparatus including a plurality of chargeable devices positioned therein, an associated charging system may be configured to assign each chargeable device positioned within the charging apparatus a time period for charging. As an example, with reference again to FIG. 24, charging system 1000 may be configured to assign receive antenna 1022 a first time period for receiving power and receive antenna 1026 a second time period for receiving power. For example only, charging system 1000 may be configured to assign each device positioned within charging apparatus 1010 *a* time period of duration 1/N*T, wherein N represents of number of chargeable devices positioned within the charging apparatus and T represents a total charging period. It is noted that defined time periods do not need to be equal in duration. Accordingly, as another example, charging system 1000 may be configured to assign each chargeable device a time period, wherein a duration of a time period assigned to a chargeable device may be dependent on an amount of power needed to fully charge the chargeable device. For example, if chargeable device 1024 requires more power than device 1020, chargeable device 1024 may be assigned a time period having a longer duration than a time period assigned to device 1020.

It is noted that one or more receive antennas may receive power from one or more transmit antennas during a defined time period. For example, with reference again to FIG. 26, according to one exemplary embodiment, chargeable device 1082 and chargeable device 1086 may each receive power during a common time period. According to another exemplary embodiment, chargeable device 1082 and chargeable device 1086 may receive power during separate time periods. As another example, with reference to FIG. 27, chargeable device 1064 may receive power from each of transmit antenna 1058 and transmit antenna 1054 during a first time period and a chargeable device 1065 may receive power from a transmit antenna 1055 during a second time period.

It is further noted that a time period duration may be determined by any suitable manner. Specifically, a time period duration may be at least partially dependent on a duration of a total charging period, a number of chargeable devices positioned within an associated charging apparatus, a power level of each chargeable device positioned within the associated charging apparatus, or any combination thereof. Further, during a charging time period for charging of one or more chargeable device positioned within a charging apparatus, one or more other receive antennas positioned within the charging apparatus may be "cloaked" to prevent coupling between the one or more other receive antennas and any other receive or transmit antennas coupled to or within an associated charging apparatus.

Figure 29:
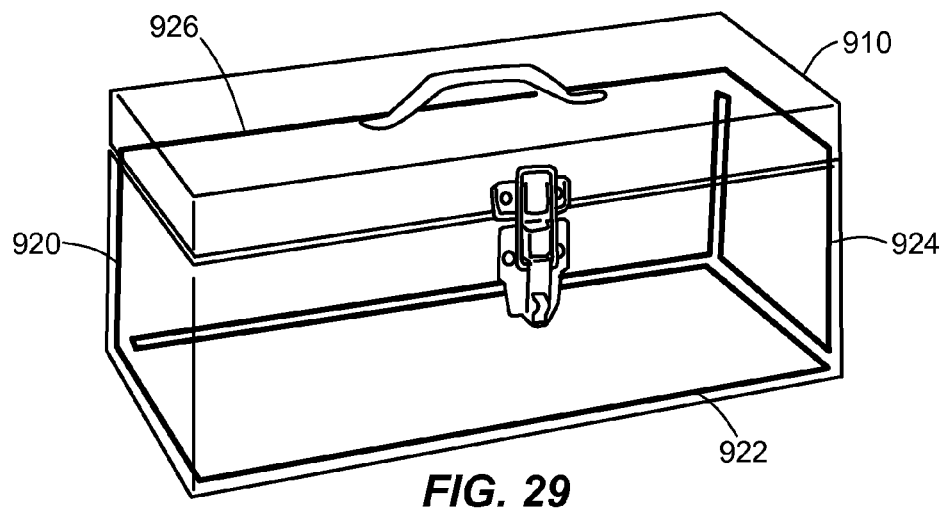
FIG. 29 illustrates a continuous loop transmit antenna including multiple facets in substantially orthogonal directions, in accordance with an exemplary embodiment of the present invention.
Figure 30:
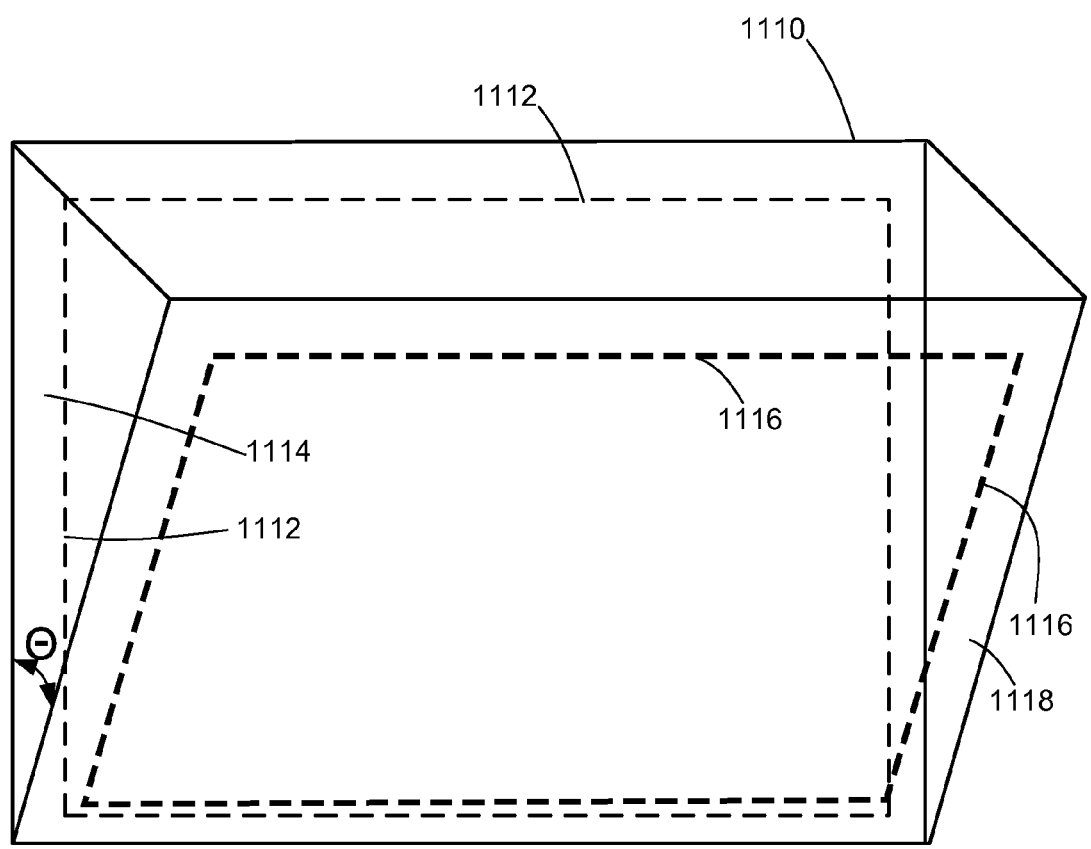
FIG. 30 illustrates another charging system including a plurality of transmit antennas oriented in multiple planes, according to an exemplary embodiment of the present invention.
Figure 31:
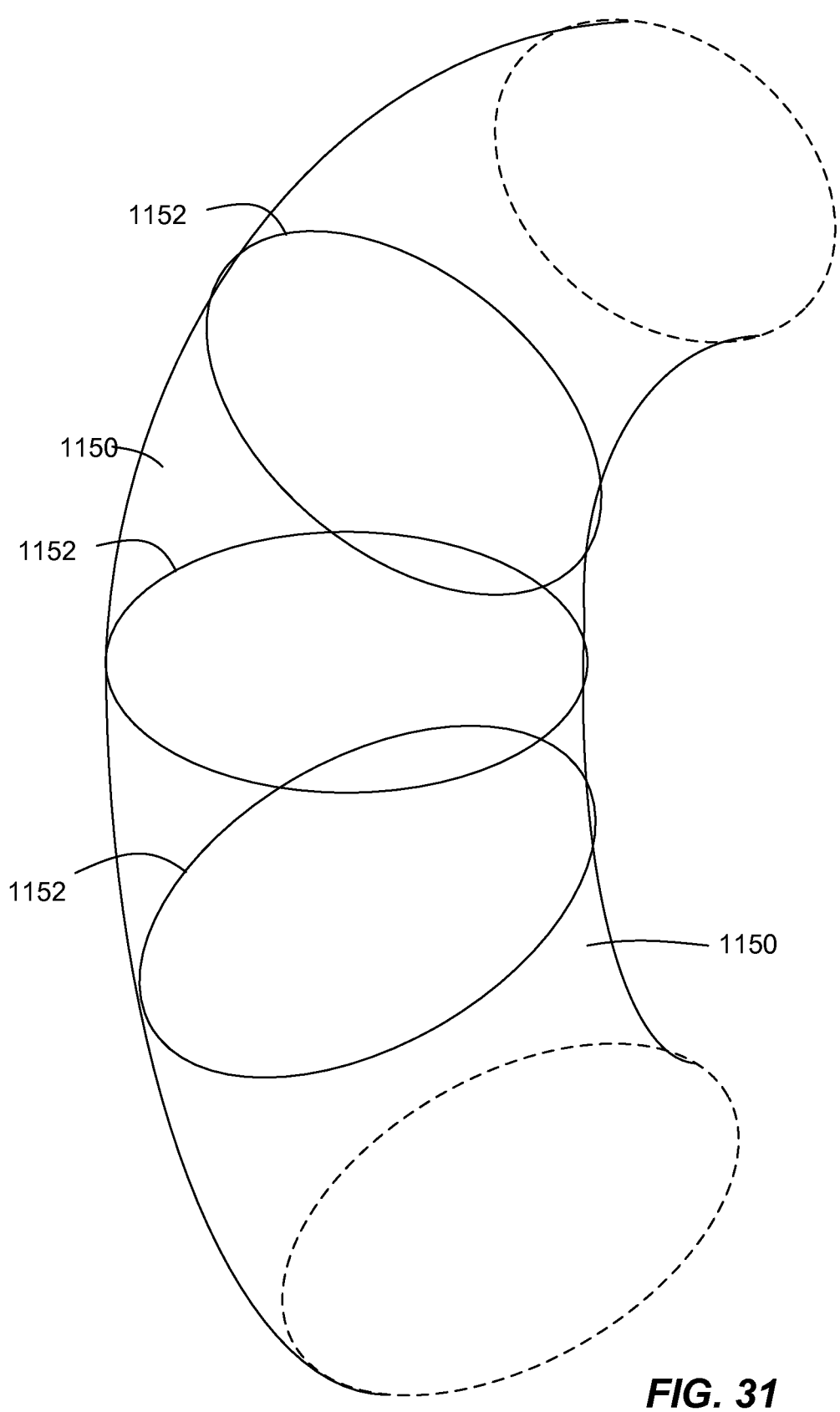
FIG. 31 illustrates yet another charging system including a plurality of transmit antennas oriented in multiple planes, in accordance with an exemplary embodiment of the present invention.

FIG. 29 illustrates an alternate configuration of a continuous loop transmit antenna 920 that includes multiple facets in substantially orthogonal directions. In the exemplary embodiment of FIG. 29, continuous loop transmit antenna 920 includes a first facet 922 along a bottom of a box 913, a second facet 924 along a side of box 913, and a third facet 926 along a back of box 913.

Although FIGS. 22A-29 illustrate transmit antennas embedded in approximately orthogonal surfaces, embodiments of the invention are not so limited. Rather, transmit antennas may be embedded in adjacent surfaces of an apparatus that are separated by an acute angle. For example, with reference to FIG. 31, a charging apparatus 1150 having a plurality of transmit antennas 1152 is depicted, wherein each transmit antenna is neither parallel nor orthogonal to every other transmit antenna. As another example, with reference to FIG. 30, a charging apparatus 1110 having a plurality of transmit antennas is depicted. A first-orientation transmit antenna 1112 is disposed on a first side 1114 of charging apparatus 1110 and a second-orientation transmit antenna 1116 is disposed on a second side 1118 of charging apparatus 1110, wherein first-orientation transmit antenna 1112 and second-orientation transmit antenna 1116 are separated by angle Θ, which may be, for example, forty-five degrees or more.

Figure 32:
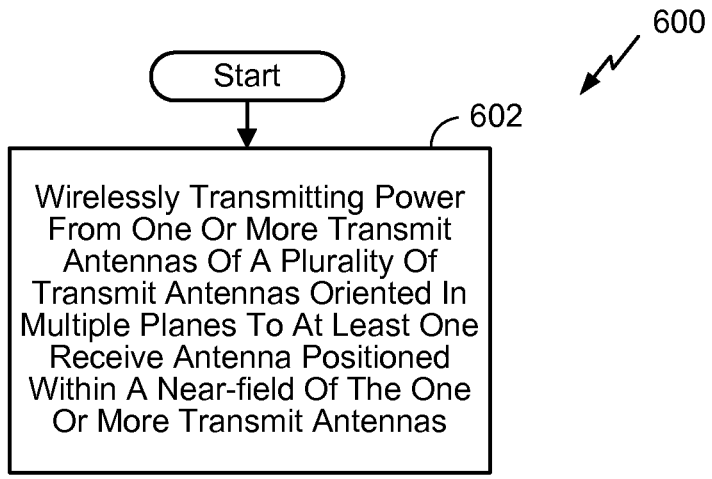
FIG. 32 is a flowchart illustrating a method, in accordance with an exemplary embodiment of the present invention.

FIG. 32 is a flowchart illustrating a method 600, in accordance with one or more exemplary embodiments. Method 600 may include wirelessly transmitting power from one or more transmit antennas of a plurality of transmit antennas oriented in multiple planes to at least one receive antenna positioned within a near-field of the one or more transmit antennas (depicted by numeral 602).

Figure 33:
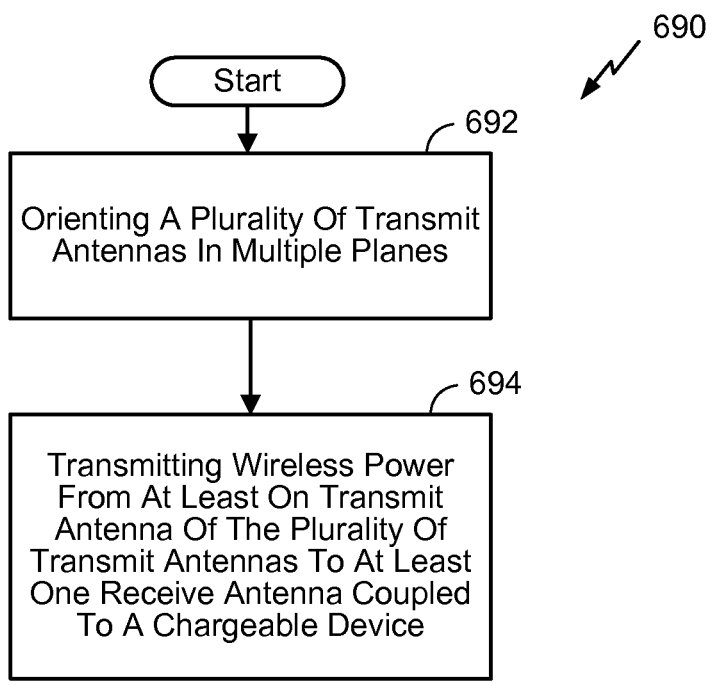
FIG. 33 is a flowchart illustrating another method, according to an exemplary embodiment of the present invention.

FIG. 33 is a flowchart illustrating another method 690, according to one or more exemplary embodiments. Method 690 may include orienting a plurality of transmit antennas in multiple planes (depicted by numeral 692). Furthermore, method 690 may include transmitting wireless power from at least one transmit antenna of the plurality of transmit antennas to at least one receive antenna coupled to a chargeable device (depicted by numeral 694).

Various exemplary embodiments of the present invention as described herein may enable one or more chargeable devices positioned within a charging apparatus and oriented in various planes to receive power from one or more transmit antennas coupled to the charging apparatus and oriented in multiple planes. Furthermore, various exemplary embodiments of the present invention may enable for defining an optimal selection of one or more transmit antennas for charging each chargeable device positioned within a charging apparatus. Additionally, various exemplary embodiments of the present invention enable for defining an optimal charging scheme for charging a plurality of devices within a charging apparatus. More specifically, various exemplary embodiments of the present invention enable for defining optimal charging schemes by assigning and varying time periods for charging one or more chargeable devices. Further, power levels of each transmit antenna may be varied. Accordingly, an amount of power delivered to each chargeable device may be increased and, further, the efficiency of a charging system as a whole may be increased.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the exemplary embodiments shown herein but is to be accorded the widest scope consistent with the principles and novel features disclosed herein.

What is claimed is:

1. A wireless charging system, comprising:
a first loop antenna having a portion defining a first plane, the first loop antenna being coupled to a first surface that is parallel with the first plane; and
a second loop antenna having a portion defining a second plane, the second loop antenna being coupled to a second surface that is parallel with the second plane, the second plane different than the first plane, and the first and second loop antennas configured to simultaneously wirelessly transmit power at a level sufficient to charge or power a first chargeable device and a second chargeable device based on a combination of power transmitted from the first loop antenna and the second loop antenna; and
a controller configured to determine a total amount of power received by a combination of the first chargeable device and the second chargeable device and to adjust power levels of the first and second loop antennas based on the total amount of power received by the combination of the first chargeable device and the second chargeable device from the first loop antenna and the second loop antenna to increase the total amount of power received by the combination of the first chargeable device and the second chargeable device from the combination of power transmitted from the first loop antenna and the second loop antenna.

2. The wireless charging system of claim 1, wherein the first plane is oriented substantially parallel to the second plane.

3. The wireless charging system of claim 1, wherein the first plane is oriented substantially orthogonal to the second plane.

4. The wireless charging system of claim 1, wherein the first plane is oriented in between a parallel orientation and an orthogonal orientation with the second plane.

5. The wireless charging system of claim 1, further comprising a container, and wherein a bottom of the container comprises the first surface and a side of the container comprises the second surface.

6. The wireless charging system of claim 1, further comprising a container, wherein a top of the container comprises the first surface, and wherein a bottom of the container comprises the second surface.

7. The wireless charging system of claim 1, wherein the controller is further configured to identify power levels of the first loop antenna and the second loop antenna for transmitting power to the first chargeable device.

8. The wireless charging system of claim 1, wherein the controller is further configured to receive a signal indicating an amount of power received by the chargeable device.

9. The wireless charging system of claim 1, wherein each of the first and second chargeable devices are charged according to an assigned time period.

10. The wireless charging system of claim 1, wherein the controller is further configured to adjust power levels of the first and second loop antennas during a first time period based on the amount of power received by the first chargeable device and to adjust power levels of the first and second loop antennas during a second time period based on the amount of power received by the second chargeable device.

11. The wireless charging system of claim 1, wherein the first plane is separated from the second plane by an acute angle.

12. A wireless charging system, the system comprising:
a first means for wirelessly transmitting power to charge a first chargeable device and a second chargeable device, the first transmitting means having a portion defining a first plane and the first transmitting means being coupled to a first surface that is parallel with the first plane;
a second means for wirelessly transmitting power to charge the first chargeable device and the second chargeable device, the second transmitting means having a portion defining a second plane and the second transmitting means being coupled to a second surface that is parallel with the second plane, the second plane different than the first plane, the first and second transmitting means configured to simultaneously wirelessly transmit power at a level sufficient to charge or power the first chargeable device and the second chargeable device based on a combination of power transmitted from the first and second transmitting means;
means for determining a total amount of power received by a combination of the first chargeable device and the second chargeable device; and
means for adjusting power levels of the first and second transmitting means based on the total amount of power received by the combination of the first chargeable device and the second chargeable device from the first and second transmitting means to increase the total amount of power received by the combination of the first chargeable device and the second chargeable device from the combination of power transmitted from the first and second transmitting means.

13. The wireless charging system of claim 1, wherein the first loop antenna has a different size than the second loop antenna.

14. The wireless charging system of claim 1, wherein the first chargeable device is one of a plurality of chargeable devices, and wherein the first and second loop antennas are configured to simultaneously wirelessly transmit power at a level sufficient to charge the plurality of chargeable devices based on the combination of power transmitted from the first loop antenna and the second loop antenna, wherein at least one of the plurality of chargeable devices is oriented differently from another of the plurality of chargeable devices.

15. The wireless charging system of claim 1, wherein the first loop antenna and the second loop antenna are configured to radiate orthogonally polarized electromagnetic fields.

16. The wireless charging system of claim 1, wherein the controller is further configured to sense an impedance between the first and second loop antennas and a receive antenna of the first chargeable device.

17. A method for wireless power transfer, comprising:
simultaneously wirelessly transmitting power via a first loop antenna and a second loop antenna at a level sufficient to charge or power a first chargeable device and a second chargeable device based on a combination of power transmitted from the first loop antenna and the second loop antenna, the first loop antenna having a portion defining a first plane and the first loop antenna being coupled to a first surface that is parallel with the first plane, and the second loop antenna having a portion defining a second plane and the second loop antenna being coupled to a second surface that is parallel with the second plane, the second plane different than the first plane;
determining a total amount of power received by a combination of the first chargeable device and the second chargeable device; and
adjusting power levels of the first and second loop antennas based on the total amount of power received by the combination of the first chargeable device and the second chargeable device from the first loop antenna and the second loop antenna to increase the total amount of power received by the combination of the first chargeable device and the second chargeable device from the combination of the power transmitted from the first loop antenna and the second loop antenna.

18. The method of claim 17, wherein the first plane is oriented substantially parallel to the second plane.

19. The method of claim 17, wherein the first plane is oriented substantially orthogonal to the second plane.

20. The method of claim 17, further comprising:
sequentially transmitting power to the first chargeable device from each of the first and second loop antennas; and
identifying power levels of the first loop antenna and the second loop antenna for subsequently wirelessly transmitting power to the first chargeable device based on the amount of power received by the first chargeable device.

21. The method of claim 17, further comprising:
wirelessly transmitting power via a third loop antenna to charge the first chargeable device;
sequentially transmitting power to the first chargeable device from each possible combination of the first, second, and third loop antennas; and
identifying power levels of the first, second, and third loop antennas for subsequently wirelessly transmitting power to the first chargeable device based on the amount of power received by the first chargeable device.

22. The method of claim 17, wherein adjusting power levels of the first and second loop antennas to adjust the amount of power transmitted to the first chargeable device comprises adjusting power levels of the first and second loop antennas during a first time period based on the amount of power received by the first chargeable device and wherein adjusting power levels of the first and second loop antennas to adjust the amount of power transmitted to the second chargeable device comprises adjusting power levels of the first and second loop antennas during a second time period based on the amount of power received by the second chargeable device.

23. The method of claim 17, wherein simultaneously transmitting power comprises simultaneously transmitting power to the first chargeable device for a time period having a duration that is directly proportional to a value defining a total charging time period and inversely proportional to a value defining a number of chargeable devices positioned to receive power from the first and second loop antennas.

24. The method of claim 17, wherein simultaneously transmitting power comprises simultaneously wirelessly transmitting power to the first chargeable device positioned between the first plane and the second plane.

25. The method of claim 17, further comprising varying a duration of a time period for wirelessly transmitting power from the first or second loop antennas to the first chargeable device.

26. The wireless charging system of claim 12, further comprising means for varying a duration of a time period for wirelessly transmitting power from the first and second means for wirelessly transmitting power to the first chargeable device.

27. The wireless charging system of claim 12, wherein the first plane is oriented substantially parallel to the second plane.

28. The wireless charging system of claim 12, wherein the first plane is oriented substantially orthogonal to the second plane.

29. The wireless charging system of claim 12, further comprising means for identifying power levels of the first transmitting means and the second transmitting means for subsequently wirelessly transmitting power to the first chargeable device based on the amount of power received by the first chargeable device.

30. The wireless charging system of claim 12, further comprising:
- a third means for wirelessly transmitting power to charge the first chargeable device, the third transmitting means having a portion defining a third plane and the third transmitting means being coupled to a third surface that is parallel with the third plane; and
- means for identifying power levels of the first, second, and third transmitting means for subsequently wirelessly transmitting power to the first chargeable device based on an amount of power received by the first chargeable device.

31. The wireless charging system of claim 12, wherein the adjusting means is configured to adjust power levels of the first and second transmitting means during a first time period based on the amount of power received by the first chargeable device and the adjusting means is configured to adjust power levels of the first and second transmitting means during a second time period based on the amount of power received by the second chargeable device.

32. The wireless charging system of claim 12, wherein the first means for wirelessly transmitting power comprises first means for transmitting power during a first time duration, and wherein the second means for wirelessly transmitting power comprises second means for transmitting power during a second time duration.

33. The wireless charging system of claim 12, wherein the first means for wirelessly transmitting power comprises first means for transmitting power to the first chargeable device for a time period having a duration that is directly proportional to a value defining a total charging time period and inversely proportional to a value defining a number of chargeable devices positioned to receive power from the first and second transmitting means.

34. The wireless charging system of claim 12, wherein the first and second means for wirelessly transmitting power comprises means for wirelessly transmitting power to the first chargeable device positioned between the first plane and the second plane.

\* \* \* \* \*